US012588603B2

(12) United States Patent　　　(10) Patent No.:　US 12,588,603 B2
Pointek　　　(45) Date of Patent:　　Mar. 31, 2026

(54) INTERENGAGEABLE CONTAINERS AND METHODS

(71) Applicant: Dominic J. Pointek, Coatesville, PA (US)

(72) Inventor: Dominic J. Pointek, Coatesville, PA (US)

( * ) Notice: Subject to any disclaimer, the term of this patent is extended or adjusted under 35 U.S.C. 154(b) by 417 days.

(21) Appl. No.: 17/520,624

(22) Filed: Nov. 5, 2021

(65) Prior Publication Data

US 2022/0369571 A1　Nov. 24, 2022

Related U.S. Application Data

(60) Provisional application No. 63/204,951, filed on Nov. 5, 2020.

(51) Int. Cl.
A01G 9/02　　　(2018.01)
B65D 21/02　　(2006.01)
B65D 25/06　　(2006.01)
B65D 25/08　　(2006.01)

(52) U.S. Cl.
CPC ............. *A01G 9/028* (2013.01); *A01G 9/027* (2013.01); *B65D 25/06* (2013.01); *B65D 25/08* (2013.01)

(58) Field of Classification Search
CPC ........ A01G 9/023; A01G 9/045; A01G 9/028; A01G 9/02; A01G 9/027; A01G 9/026; B65D 21/0233; B65D 21/02; B65D 5/2047; B65D 5/2095; B65D 21/00; B65D 5/001; B65D 5/002; B65D 5/0025; B65D 5/003; B65D 5/0035; B65D 5/42; B65D 25/06
See application file for complete search history.

(56) References Cited

U.S. PATENT DOCUMENTS

| | | | | |
|---|---|---|---|---|
| 2,944,694 A | * | 7/1960 | Kinsey | A47G 23/06 |
| | | | | 220/23.88 |
| 3,739,939 A | * | 6/1973 | Koenig | B65D 21/0233 |
| | | | | 206/520 |
| 3,852,912 A | * | 12/1974 | Diller | A01G 9/028 |
| | | | | 47/84 |
| 4,788,792 A | * | 12/1988 | Womick | A01G 9/028 |
| | | | | 47/41.12 |
| 2009/0145797 A1 | * | 6/2009 | Steinmeyer | B65D 21/0233 |
| | | | | 206/505 |
| 2015/0121755 A1 | * | 5/2015 | Caird | A01G 9/028 |
| | | | | 47/66.7 |

(Continued)

FOREIGN PATENT DOCUMENTS

| | | | | | |
|---|---|---|---|---|---|
| DE | 2433036 A1 | * | 1/1976 | | |
| FR | 2773970 A1 | * | 7/1999 | ............. | A01G 9/027 |
| KR | 20080004941 A | * | 1/2008 | | |

*Primary Examiner* — Kristen C Hayes
(74) *Attorney, Agent, or Firm* — Ryder, Mazzeo & Konieczny, LLC; Joseph M. Konieczny, Sr.

(57)　　　　ABSTRACT

An interengageable container and method including a bottom container and at least two top containers, each container including: (1) a bottom portion having outer edges; at least four tapered sidewalls attached to, and rising outwards of, the bottom portion, each of the least four tapered sidewalls having (a) a top edge parallel to each other and extending laterally outward of (b) a respective outer edge of the bottom portion from which they are attached at (c) respective lower edges, and (d) inner corners at each intersection of adjacent ones of the at least four tapered sidewalls.

13 Claims, 90 Drawing Sheets

(56)         References Cited

U.S. PATENT DOCUMENTS

| | | | | |
|---|---|---|---|---|
| 2018/0265252 | A1* | 9/2018 | Diep | ................... B65D 21/0233 |
| 2019/0233164 | A1* | 8/2019 | Blitzer | ............... B65D 21/0233 |
| 2021/0076575 | A1* | 3/2021 | Farchione | .............. A01G 9/021 |
| 2022/0144475 | A1* | 5/2022 | Kearns | .................... B65D 85/50 |
| 2022/0144490 | A1* | 5/2022 | Brink | ................... B65D 5/2047 |

* cited by examiner

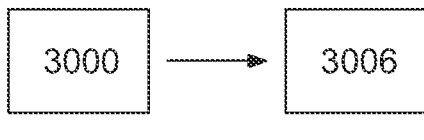
FIG. 112
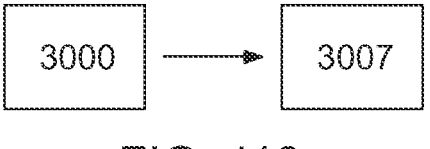
FIG. 113
FIG. 114

INTERENGAGEABLE CONTAINERS AND METHODS

CROSS REFERENCE TO RELATED APPLICATIONS

This application is related to, claims priority under and claims the benefit of the earliest available filing date from provisional application of Dominic J. Pointek, Ser. No. 63/204,951 filed on Nov. 5, 2020.

FIELD

The present invention generally relates to assemblies and methods to hold and arrange containers, that may include and hold or secure live vegetation, in a variety of configurations that may be interengageable, and may facilitate watering and maintenance of any live vegetation therein.

BACKGROUND

Live vegetation is used and maintained both inside offices and homes and outside for landscaping and have become useful and desirable for esthetic and environmental purposes in both commercial and residential structures. Such vegetation may include flowers, green plants, trees, bushes, herbs, etc., and there are many stacking support structures to provide height to the vegetation and various levels of select vegetation. Many people grow plants and place them in their homes and offices, as well at outside their homes and offices, for their beauty and practicality. Green plants absorb carbon dioxide and clean and replenish oxygen and may improve the mood and outlook of those seeing the vegetation growing and thriving near them.

There are support structures come in a variety of specific structures. For example, see U.S. Pat. No. 7,043,877 to Jensen issued May 16, 2006 that discloses a stackable planter comprising a plurality of planter trays having planter cups at a periphery for holding soil and plants. See U.S. Pat. No. 7,712,255 B1 to Klessig issued May 11, 2010 that discloses: [a] nesting planter arrangement having a plurality of open planting units each of a successive smaller size from the bottom planter unit to the top planter unit and in which each planter unit other than the base planter unit rests on a portion of the planter unit upon which it rests in the planting position . . . " (Abstract). Further see U.S. Patent Application Publication No. US 2013/0291436 A1 to Stockman et al. published Nov. 7, 2013 that discloses a stackable plant pot assembly. Also see U.S. Patent Application Publication No. US 2015/0128494 A1 to Peterson et al. published May 14, 2015 that discloses a "stackable plant container module . . . adapted such that a plurality of plant container modules will nest together for storage and/or shipping while allowing the plant container modules to be stacked vertically into a multi-level plant tower." (Abstract)

It is an object of the present invention to provide an improved assembly to hold and arrange containers.

Other objects may appear hereafter.

SUMMARY

The present invention seeks to provide an improved interengageable container assembly and method having a bottom-most interengageable container including a support structure below the top edge of the sidewalls and above the bottom portion post structures at its corners to retain at least two interengageable containers within the bottom-most interengageable container.

In addition, the present invention seeks to provide an improved container assembly for self-watering planters. Each individual interengageable container component can be used independently to hold, for example, plants or be assembled with other components to form a complex interengageable container unit. Each assembled unit may comprise a plurality of smaller interengageable container components held in place within a larger interengageable container component(s).

In one exemplary embodiment of the present invention, an interengageable container component comprises four isosceles trapezoidal sidewalls and a rectangular (e.g., a square) bottom surface. The interior of each sidewall may be fashioned with a support structure(s) having an upper terminus(es) within a common plane which may be the point of contact for any components nested above. A hole, plugged or unplugged, may be in the bottom surface of each component to permit or prevent fluid exchange between respective components.

In other exemplary embodiments of the present invention, a plurality of components is assembled to form a complex interengageable container unit. Smaller components are nested and held together within a larger component by geometric correspondence and mutual lateral support. The interior lengths of the outer top edges of a larger component may be the same, doubled, tripled, quadrupled, or quintupled in comparison to the exterior lengths of the outer top edges of a smaller component. In the larger component, the hole may be plugged, thus creating a reservoir, and allowing for fluid exchange between smaller components that are suspended above the bottom surface of the larger component. Additionally, the hole of a smaller component may be plugged to prevent fluid exchange between components.

In other exemplary embodiments of the present invention, a supplemental interengageable container component is added with other components to make alternative units and allows for additional variations of interengageable container component arrangements within the units. The supplemental component comprises four outer isosceles trapezoidal sidewalls, four inner isosceles trapezoidal sidewalls, and a square bottom surface hollowed between the interior compartment of the inner sidewalls. Four spacing walls create four respective chambers, each containing a hole.

The present invention also seeks to provide an improved interengageable container assembly having a bottom-most interengageable container and least two removable interengageable containers within the bottom-most interengageable container that are suspended above the bottom of the bottom-most interchangeable container by mutual lateral support.

All of the containers located within the bottom-most container are removable.

In one exemplary embodiment of the present invention, an interengageable container including: (1) a bottom portion having outer edges; at least four tapered sidewalls attached to, and rising outwards of, the bottom portion, each of the least four tapered sidewalls having (a) a top edge parallel to each other and extending laterally outward of (b) a respective outer edge of the bottom portion from which they are attached at (c) respective lower edges, and (d) inner corners at each intersection of adjacent ones of the at least four tapered sidewalls; and (2) a support structure (30) spaced below the top edge, the support structure each having an upper surface lying within a common plane that is spaced apart from, and parallel to, bottom portion.

In another exemplary embodiment of the present invention, an interengageable container including: a bottom portion having outer edges; at least four isosceles-trapezoid-shaped tapered sidewalls attached to, and rising outwards of, the bottom portion, each of the least four isosceles-trapezoid-shaped tapered sidewalls having (a) a top edge parallel to each other and extending laterally outward of (b) a respective outer edge of the bottom portion from which they are attached at (c) respective lower edges, (d) inner corners at each intersection of adjacent ones of the at least four isosceles-trapezoid-shaped tapered sidewalls; and (e) a support structure on the at least four isosceles-trapezoid shaped tapered sidewalls spaced below the top edge, the support structure having an upper surface lying within a common plane that is spaced apart from, and parallel to, bottom portion. The support structure including at least one of i) a rib structure at each inner corner extending from the bottom portion to an upper surface having a height above the bottom portion, ii) tab structures having an upper surface at a height above the bottom portion, iii) a pair of tab structures with each tab structure of each pair of tab structures is positioned proximate opposite sides of respective inner corners, iv) a tab structure (1330) at about the midway point of the at least four isosceles-trapezoid-shaped tapered sidewalls, v) pairs of tab structures with each tab structure of each pair of tab structures positioned on other side of a midway point on each of the at least four isosceles-trapezoid-shaped tapered sidewalls, between the inner corners, vi) tab structures on the sidewalls positioned about one-quarter distance between the intersections of the at least four isosceles-trapezoid-shaped tapered sidewalls, between the inner corners, and vii) a continuous horizontal ridge structure along the at least four isosceles-trapezoid-shaped tapered sidewalls.

In yet another exemplary embodiment of the present invention, an interengageable container assembly includes: (A) a bottom-most interengageable container having a bottom portion defining outer edges, and a support structure on each of at least four isosceles-trapezoid-shaped tapered side walls; and (B) at least two adjacent upper interengageable containers nested within the bottom-most interengageable container and contacting the support structure. The at least two adjacent upper interengageable containers each including i) a bottom portion defining outer edges, ii) at least four isosceles-trapezoid-shaped tapered sidewalls attached to, and rising outwards of, the bottom portion, each of the least four upper interengageable container tapered isosceles-trapezoid-shaped sidewalls having (a) an upper interengageable container top edge parallel to, and substantially flush with one another, and extending laterally outward of (b) a respective outer edge (42) of the respective upper interengageable container bottom portion from which they are attached at (c) respective upper interengageable container lower edges, (d) upper interengageable container inner corners at each intersection of adjacent ones of the at least four tapered isosceles-trapezoid-shaped upper interengageable container sidewalls, adjacent respective top edges of the at least two adjacent upper interengageable containers contact each other along a length of each adjacent respective top edge; and (e) upper interengageable container bottom outer corners at the upper interengageable container bottom portion with at least one upper interengageable container bottom outer corner configured to contact a respective one of the upper surfaces of the bottom-most interengageable support structure.

BRIEF DESCRIPTION OF THE DRAWINGS

The present invention will be more clearly understood from the following description taken in conjunction with the accompanying drawings in which like reference numerals, or alternate reference numbers, designate similar or corresponding elements, regions and portions and in which:

Figure 80:
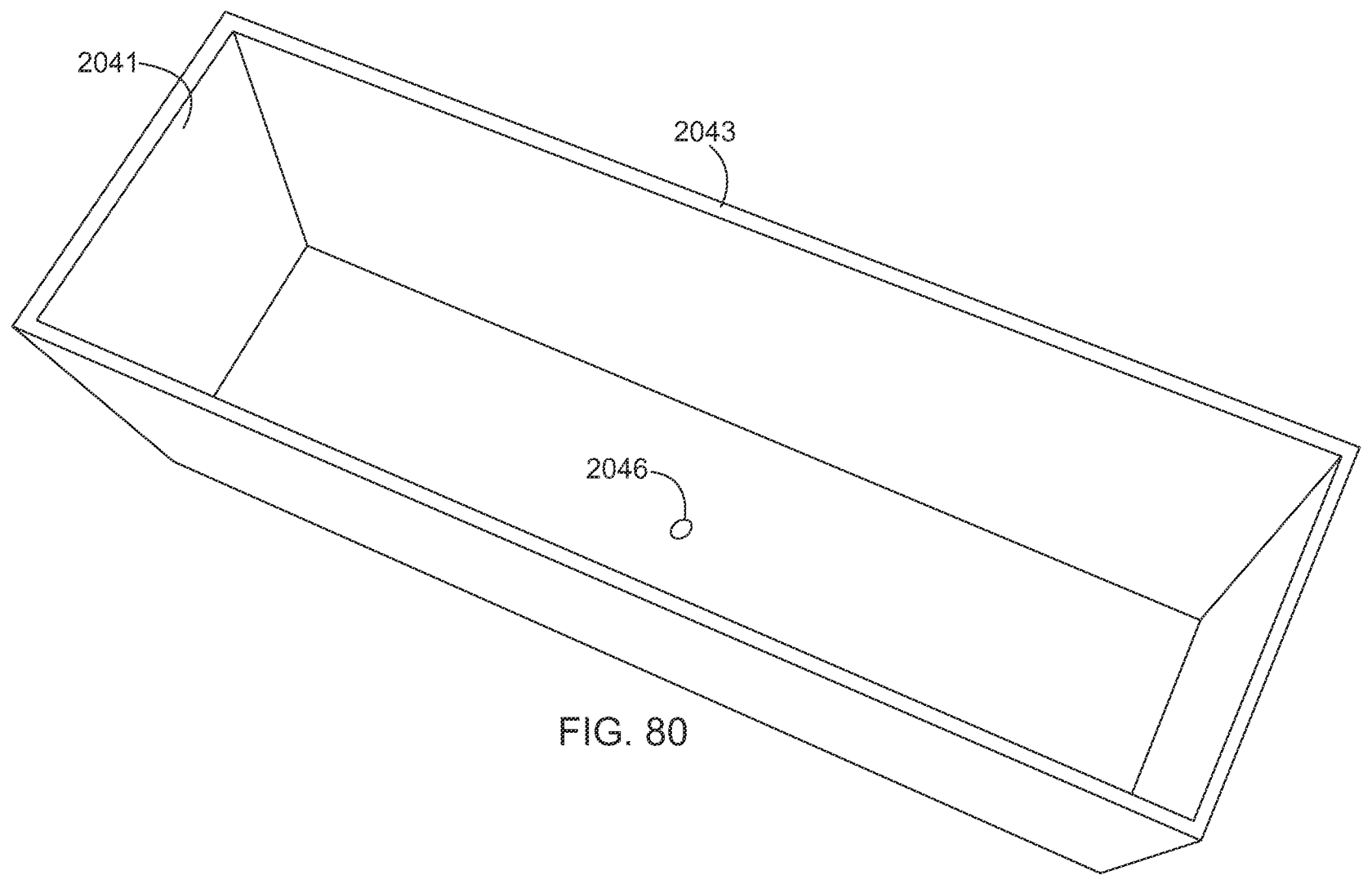

FIG. 80 is a perspective view of a rectangular interengageable container component in accordance with the exemplary embodiment of the present invention.

FIG. 112 is a flow chart of a method of the current invention.

FIG. 113 is a flow chart of a method of the current invention.

FIG. 114 is a flow chart of a method of the current invention.

FIG. 119 is a flow chart of a method of the current invention.

FIG. 120 is a flow chart of a method of the current invention.

FIG. 121 is a flow chart of a method of the current invention.

FIG. 122 is a flow chart of a method of the current invention.

FIG. 123 is a flow chart of a method of the current invention.

DETAILED DESCRIPTION OF THE PREFERRED EMBODIMENTS

Figure 1:
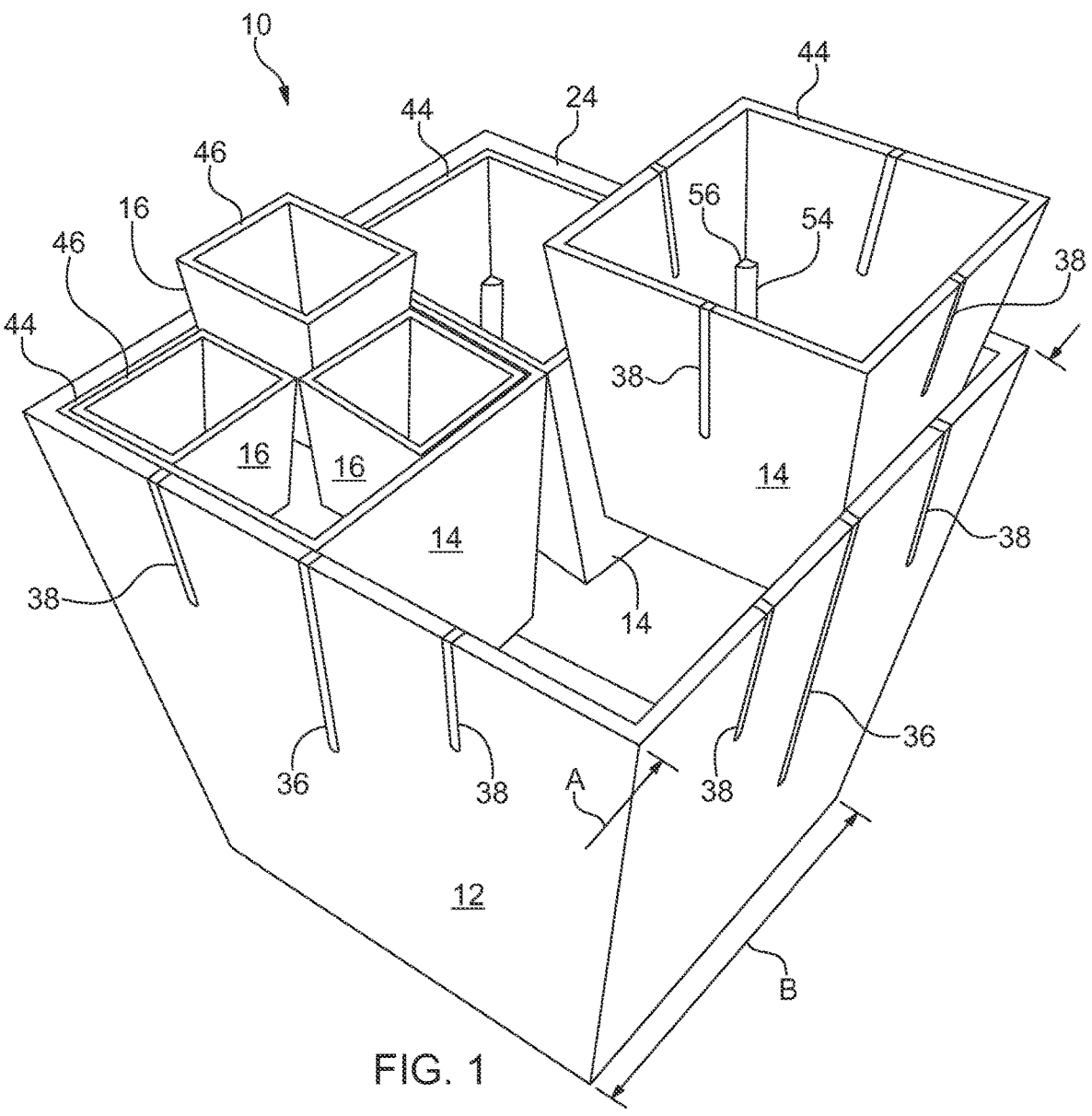
FIG. 1 is a perspective view of an interengageable container assembly in accordance with an exemplary embodiment of the present invention.

The term "about" when referring to a numerical range or value is a convenience and is to be interpreted as, for example, plus or minus 10% of that value or range. For example, "from about 100 to 1000" is to be interpreted as within the range of 90 to 1100 and "about 1000" is to be interpreted as from 900 to 1100.

The relative terms vertical and horizontal, for example, in the specification refer to the position of the interengageable container assembly and its components if placed on a horizontal surface.

Unless otherwise described, like structures in differing embodiments/FIGS. have similar/the same functionality and characteristics even if the terms used to describe them differ.

All of the containers located within the bottom-most container are removable.

The terms small, medium, large, and extra-large refer to the sizes of components relative to one another when assembled within an interengageable container unit. For example, a small component implies that it is the only component or the smallest component within the unit, a medium component implies that there is one size smaller within the unit, a large component implies that there two sizes smaller within the unit, and an extra-large component implies that there are three smaller sizes within the unit.

The terms primary, secondary, and tertiary refer to the levels of complexity of interengageable container units. For example, a primary unit implies that there are two respective sizes of components assembled to form the unit, a secondary unit implies that there are three respective sizes of components assembled to form the unit, and a large unit implies that there are four respective sizes of components assembled to form the unit. Additionally, the terms primary, secondary, tertiary, quaternary, and quinary refer to the sizes of volumes of reservoirs relative to one another within a component and/or units. For example, a primary reservoir implies that it is the only reservoir or the smallest reservoir within the unit, a secondary reservoir implies that there is one size smaller within the unit, a tertiary reservoir implies that there are two smaller sizes within the unit, a quaternary reservoir implies that there are three smaller sizes within the unit, and a quinary reservoir implies that there are four smaller sizes within the unit.

Reference is now made to FIGS. 1-15.

The interengageable container assembly of the present invention may include interengageable containers constructed to contact one another and nest within the respective larger interengageable container within which they are placed (e.g., see FIGS. 5, 7, 9B and 11). When multiple interengageable containers are placed within respective larger interengageable containers, the mouths of the smaller interengageable containers may fill the mouths of the larger interengageable containers in tessellated patterns.

In some embodiments, each interengageable container includes a support structure spaced below the top edge of the sidewalls and above the bottom portion of the interengageable container so that the bottom portions of smaller interengageable containers placed therein may contact, and be supported by, the support structure while the upper lips/top edges of the smaller interengageable containers may contact adjacent other smaller interengageable containers placed within the larger container to maintain the position of the smaller interengageable containers providing mutual lateral support. The support structure may comprise several different physical structures including: (1) rib structures/corner supports at the intersections of the sidewalls of the interengageable container and that may extend to the bottom inner interior base; (2) tab structures at the intersections of the sidewalls (i.e. the corners) of the interengageable container that are spaced above the bottom portion of the interengageable container; (3) at least a pair of tab structures at either side of the intersections of the sidewalls (i.e. the corners) of the interengageable container that are spaced above the bottom portion of the interengageable container; (4) tab structures on the sidewalls positioned proximate the midway point between the intersections of the sidewalls (i.e. the corners) of the interengageable container; (5) a pair of spaced apart tab structures at either side of the proximate midway point between the intersections of the sidewalls (i.e. the corners) of the interengageable container; (6) tab structures on the sidewalls positioned about one-quarter distance between the intersections of the sidewalls (i.e. the corners) of the interengageable container; and (7) a continuous horizontal ridge structure along the sidewalls and spaced above the bottom portion of the interengageable container. In any instance, the support structure is positioned so that the bottom portions of smaller interengageable containers that are positioned within the interengageable container are supported by the support structure and the upper lips/top edges of the smaller interengageable containers contact and are generally at least about flush with the upper lips/top edges of the interengageable container within which they are placed (nested).

An interengageable container may include a grate, or the like, sized to be suspended/supported by the support structure, so that smaller interengageable containers may rest upon the inserted grate. This may obviate at least some need for lateral support of the smaller interengageable containers while resting upon the grate. The grates may be porous, and/or may include its own drain hole(s). The nested smaller interengageable containers are sized so that their upper lips/top edges contact adjacent smaller interengageable containers and contact the upper lips/top edges of the interengageable container within which they are placed. That is, depending upon the thickness of the grate, the nested smaller interengageable containers may have a lower overall height (or the support structure may be lower to account for the thickness of the grate) so that the nested containers would still contact the upper lips/top edges of the interengageable container within which they are placed.

The support structure may be positioned to permit smaller interengageable containers to sit above the bottom interior surface of the respective larger interengageable container(s)

during watering of any plants contained within the smaller interengageable containers. The hollow space below and between the outer walls of the smaller containers and the interior walls of the larger interengageable container(s) may act as a reservoir for sub-irrigation. In some embodiments. Water levels within the reservoir may be seen through (vertical) viewing ports of various lengths (e.g., see FIG. 7). Respective viewing ports of the different sized containers may be equal in length and width to one another to align when smaller interengageable containers are nested/supported within larger interengageable containers to permit viewing through multiple containers at one time (e.g., see FIG. 5). Relatively shorter viewing ports may be used to observe water levels in one size of interengageable containers and relatively longer viewing ports may be used to observe water levels in the larger interengageable container(s) (e.g., see FIG. 5).

In some embodiments, the upper lips/top edges of the smaller interengageable containers contact adjacent other smaller interengageable containers placed within the larger container to maintain the position of the smaller interengageable containers providing mutual lateral support. In these embodiments, the range of the angle between the base and the narrow end of each isosceles trapezoid sidewall is between about 94 and 139 degrees. In some embodiments the angle between the base and the narrow end of each isosceles trapezoid sidewall is about 98.13 degrees. In some embodiments the angle between the base and the narrow end of each isosceles trapezoid sidewall is 98.13 degrees.

Further, the interengageable containers may be containers constructed of four isosceles trapezoid sidewalls and a rectangular (i.e., including a square) base. The containers may also be constructed of, for example, six isosceles trapezoid sidewalls and a hexagonal base, etc. All four angles of each of the four isosceles trapezoids are equal to one another and the heights of the isosceles trapezoid sidewalls are equal. The narrower of the trapezoid sidewalls come together at right angles and attach to the base of the container and the open ends of the isosceles trapezoid sidewalls come together at right angles to form the opening of the interengageable container. Opposite isosceles trapezoid walls of the interengageable container are congruent. The wider length ("A") of each inner wall of the isosceles trapezoid sidewalls at the opening of the interengageable container, and the length ("B") of each isosceles trapezoid side wall at the bottom the interengageable container (e.g., see FIG. 1) may be a ratio where "A" is a whole number 2 or greater, and "B" is 1. The design of these interengageable containers using isosceles trapezoids sidewalls in conjunction with the ratio given will allow smaller, adjacent interengageable containers to be suspended with one another within a larger interengageable container independent of the need of support structures for such nested interengageable containers.

In some embodiments, each graduated size of interengageable container may double in wall thickness for additional durability.

In some embodiments, the size of the drainage holes may remain constant to allow one universal plug size. There may be more than the three sizes of interengageable containers shown in the figures that may nest within a larger respective container.

Figures 2, 3:
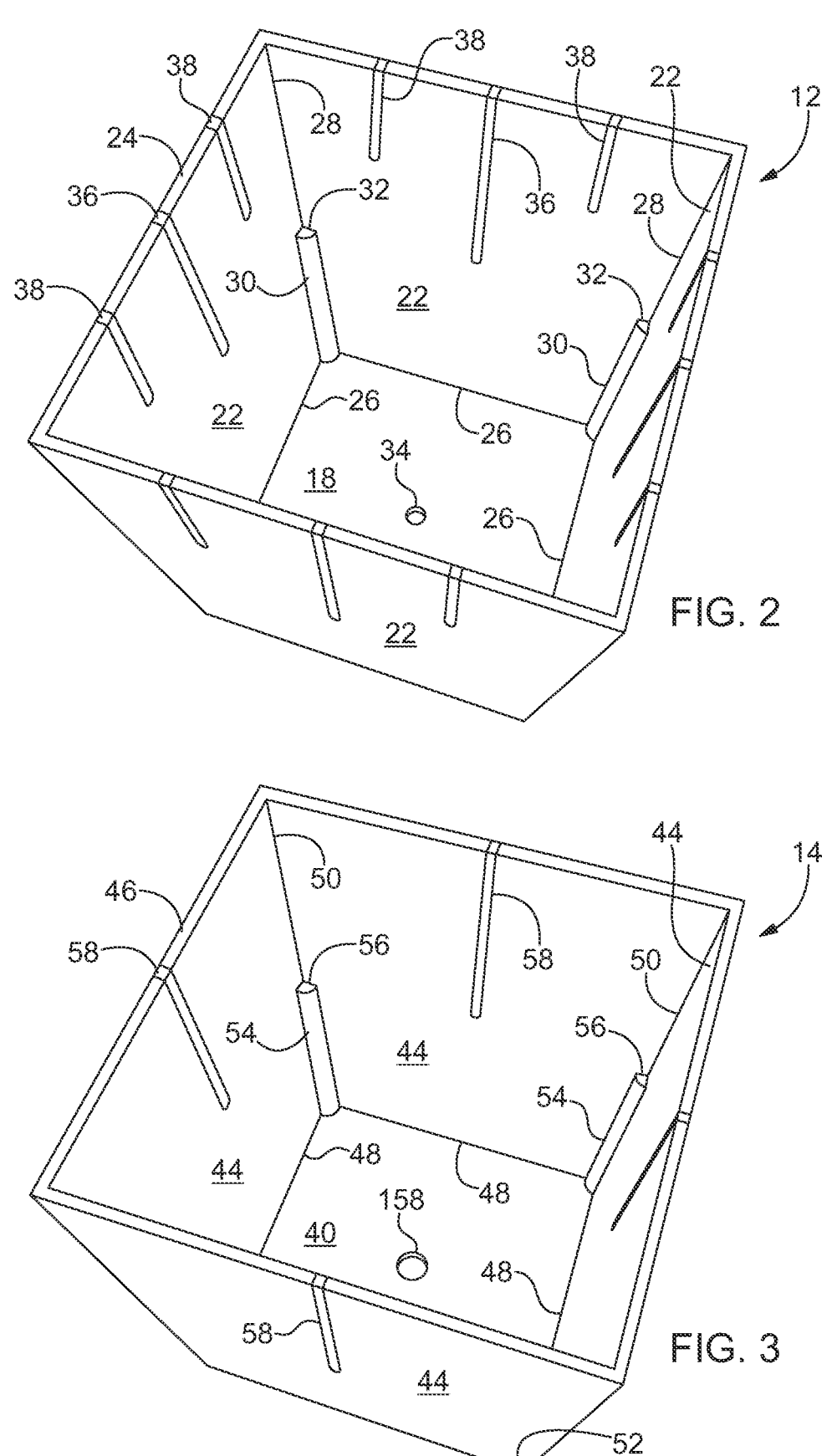
FIG. 2 is a perspective view of a bottom-most interengageable container in accordance with an exemplary embodiment of the present invention.
FIG. 3 is a perspective view of an intermediate interengageable container in accordance with an exemplary embodiment of the present invention.
Figure 10:
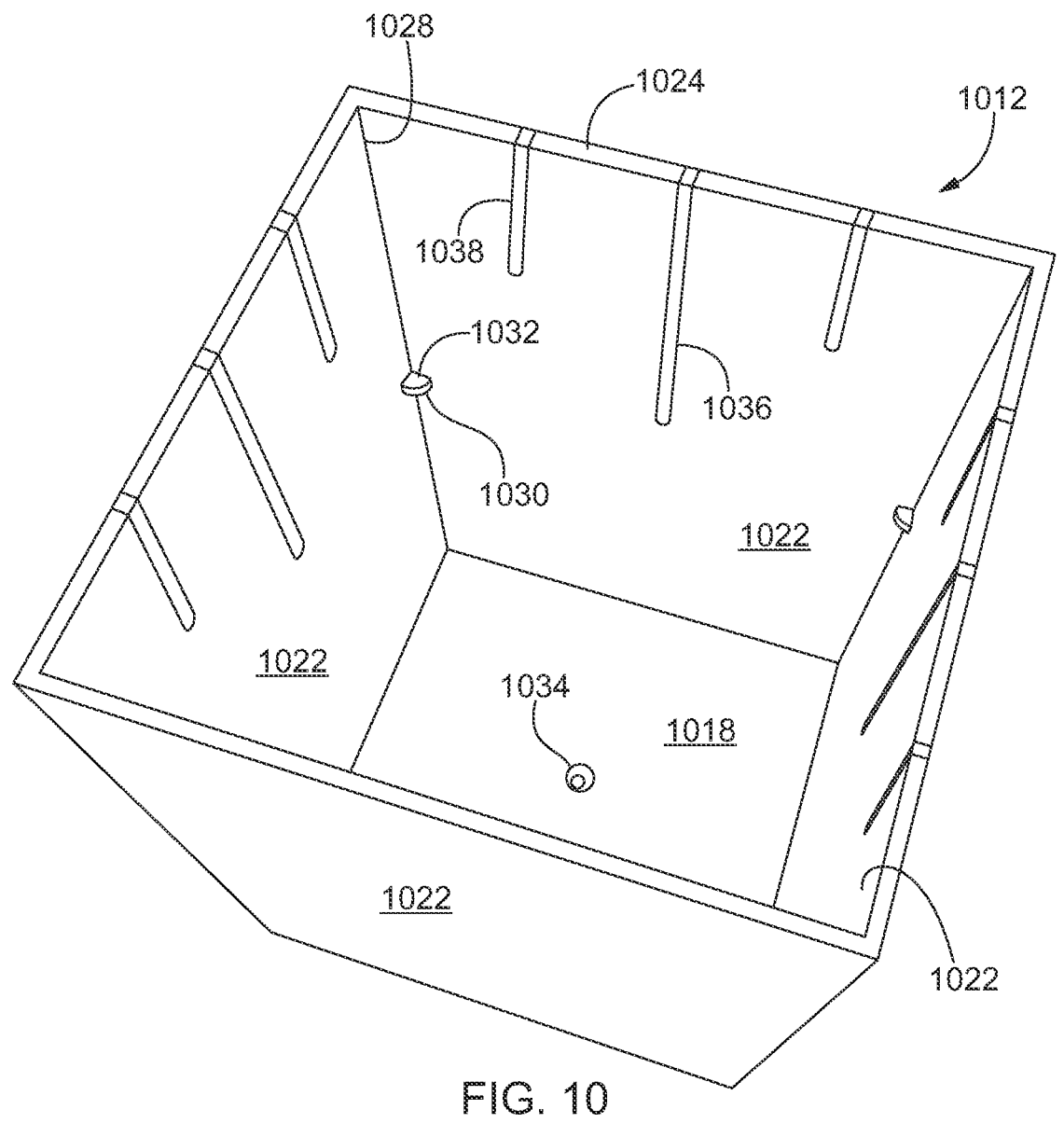
FIG. 10 is a perspective view of an interengageable container assembly in accordance with another exemplary embodiment of the present invention.
Figure 11:
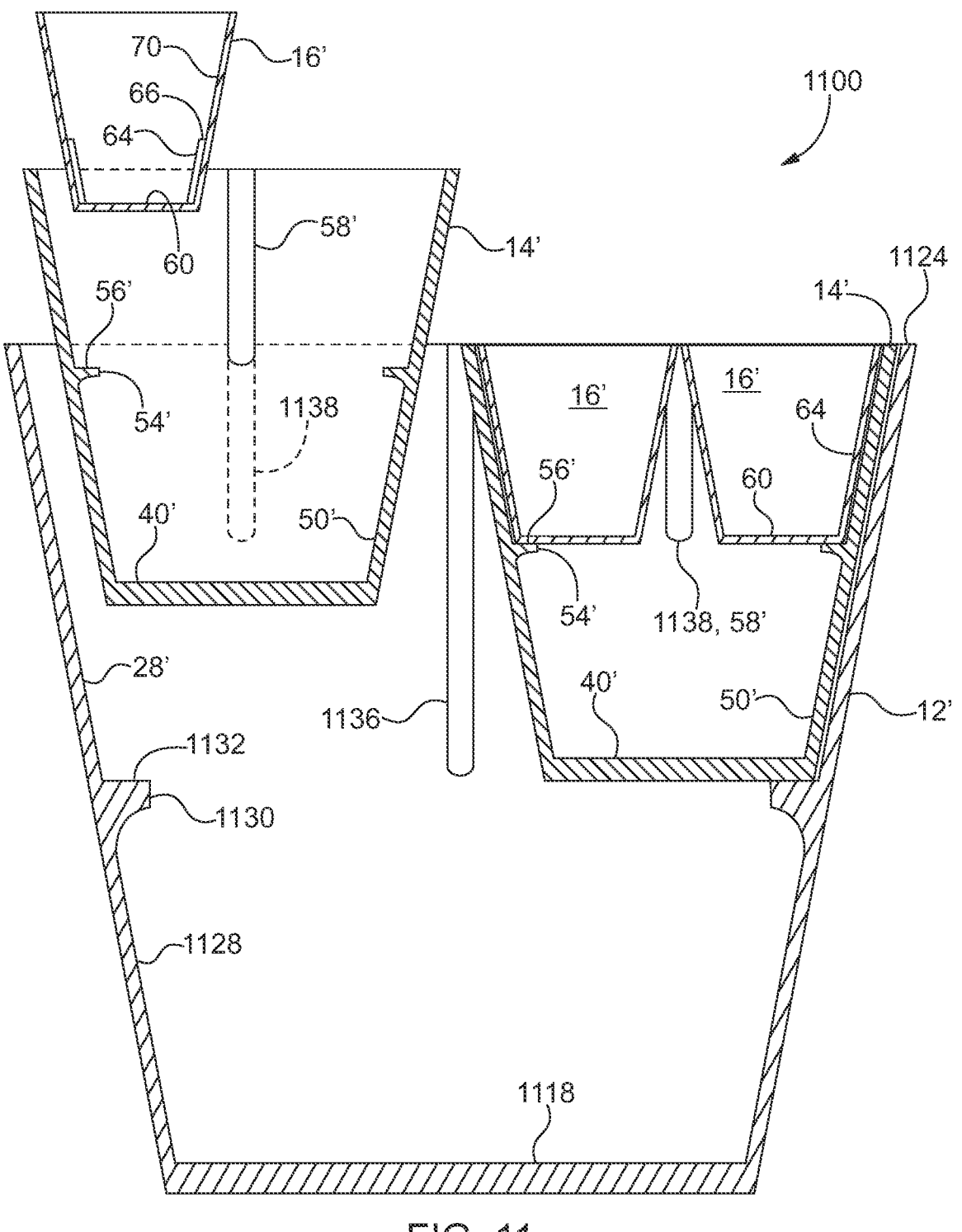
FIG. 11 is a partially disassembled sectional side view of an interengageable container assembly in accordance with yet another exemplary embodiment of the present invention.

Specifically, as illustrated in FIGS. 1-4 and, 10-11, in accordance with an exemplary embodiment of the present invention, interengageable container assembly 10 includes a plurality of interengageable containers 12, 14, 16 including bottom-most (largest) container 12, intermediate upper interengageable containers 14 nested within bottom-most container 12, and (smallest) upper-most interengageable containers 16 nested within select intermediate interengageable containers 14. Except for size, each Interengageable container 12, 14, 16 has a bottom, four isosceles trapezoid tapered sidewalls 22, 44, 64. In some embodiments, as illustrated, except for upper-most interengageable containers 16, rib structures 30, 54 with respective upper surfaces 32, 56 are included in the interengageable containers. As illustrated in FIGS. 2-3, for example, upper surfaces 32, 56 extend from respective upper surfaces 32, 56 to bottom portions 18, 40 along respective inner corners 28, 50, and as illustrated in FIGS. 10-11, for example, rib structures 1130, 54', resemble, for example, tabs 1130, 54' and are positioned at a predetermined height above respective bottom portions 1118, 40' along inner corners 1128, 50', 70' to permit nesting of interengageable containers 14', 16' within respective larger interengageable containers 12', 14'. It is noted that even smaller interengageable containers (not shown) may nest within (upper-most) interengageable container 16, 16' depending upon the actual physical sizes of interengageable containers 12', 14', 16' as would also apply to, for example, FIG. 1 if upper-most interengageable containers 16 also included rib structures 64, tabs 64, or the like at their respective corners 70, or if the upper-most interengageable containers 16 were of the material and sized to have mutual lateral support, as described in more detail herein.

As more clearly illustrated in FIG. 2, for example, bottom-most interengageable container 12 includes a bottom portion 18 having outer edges 20, and at least four isosceles trapezoid tapered sidewalls 22 attached to, and rising from and outwards of, the bottom portion 18. Each of the least four tapered sidewalls 22 having (a) a top edge 24 parallel to each other 24 and extending laterally outward of (b) a respective outer edge 20 of bottom portion 18 at (c) respective lower edges 26, (d) inner corners 28 at each intersection 28 of adjacent ones 22 of the at least four tapered sidewalls 22, and rib structures 30 at each of respective inner corners 28. Rib structures 30 each having an upper surface 32 lying within a common plane that is spaced apart from, and parallel to, bottom portion 18.

In some embodiments, long view ports 36 (relative to short view ports 38) may be positioned within sidewalls 22 at about the midway point between inner corners 28 to permit viewing of any water/fluid level within bottom-most container 12 and/or between/below any nested upper containers 14 (e.g., see FIGS. 5 and 11), and optional short (relative to long view ports 36) view ports 38 may be positioned within sidewalls 22 at about one-quarter length from each inner corner 28 to permit viewing of any water/fluid level within upper container(s) 14 nested within bottom-most container 12. View ports 36, 38 may extend from top edge 24 to a terminus point as found to be appropriate to permit viewing through the respective water/fluid level. Bottom-most container 12 may include drainage hole 34 in bottom portion 18 that may be plugged with a plug (not shown).

As more clearly illustrated in FIG. 3, for example, each upper interengageable container 14 includes a bottom portion 40 having outer edges 42, and at least four isosceles trapezoid tapered sidewalls 44 attached to, and rising outwards of, the bottom portion 40. Each of the least four upper interengageable container tapered sidewalls 44 having (a) an upper interengageable container top edge 46 parallel to each other and extending laterally outward of (b) a respective outer edge 42 of respective upper interengageable container bottom portion 40 at (c) respective upper interengageable container lower edges 48, (d) upper interengageable container inner corners 50 at each intersection of adjacent ones of the at least four tapered upper interengageable container sidewalls 44, and upper interengageable container bottom outer corners 52 at upper interengageable container bottom portion 40. At least one upper interengageable container bottom outer corner 52 adapted to contact a respective one of the upper surfaces 32 of bottom-most interengageable container rib structures 30. Upper container 14 is sized so that when contacting upper surface 32 of rib 30, top edge 46 of upper container 14 is generally at least about flush with top edge 24 of bottom-most container 12 when upper container 14 is contained within/nested within bottom-most container 12. Upper container 14 may include drainage hole 58 in bottom portion 40 that may otherwise be plugged with a plug (not shown).

In some embodiments upper view ports 58 may be positioned within upper container sidewalls 44 at about the midway point between inner corners 50 to align with respective bottom-most container 12 short view ports 38 to permit viewing of any water/fluid level within upper container 14 (e.g., see FIGS. 1, 5 and 11) when upper container 14 is nested within bottom-most container 12. Upper view ports 58 may extend from top edge 46 to a terminus point as found to be appropriate to permit viewing of the respective water/fluid level, which may be equal to the length of bottom-most container short view ports 38.

Figure 4:
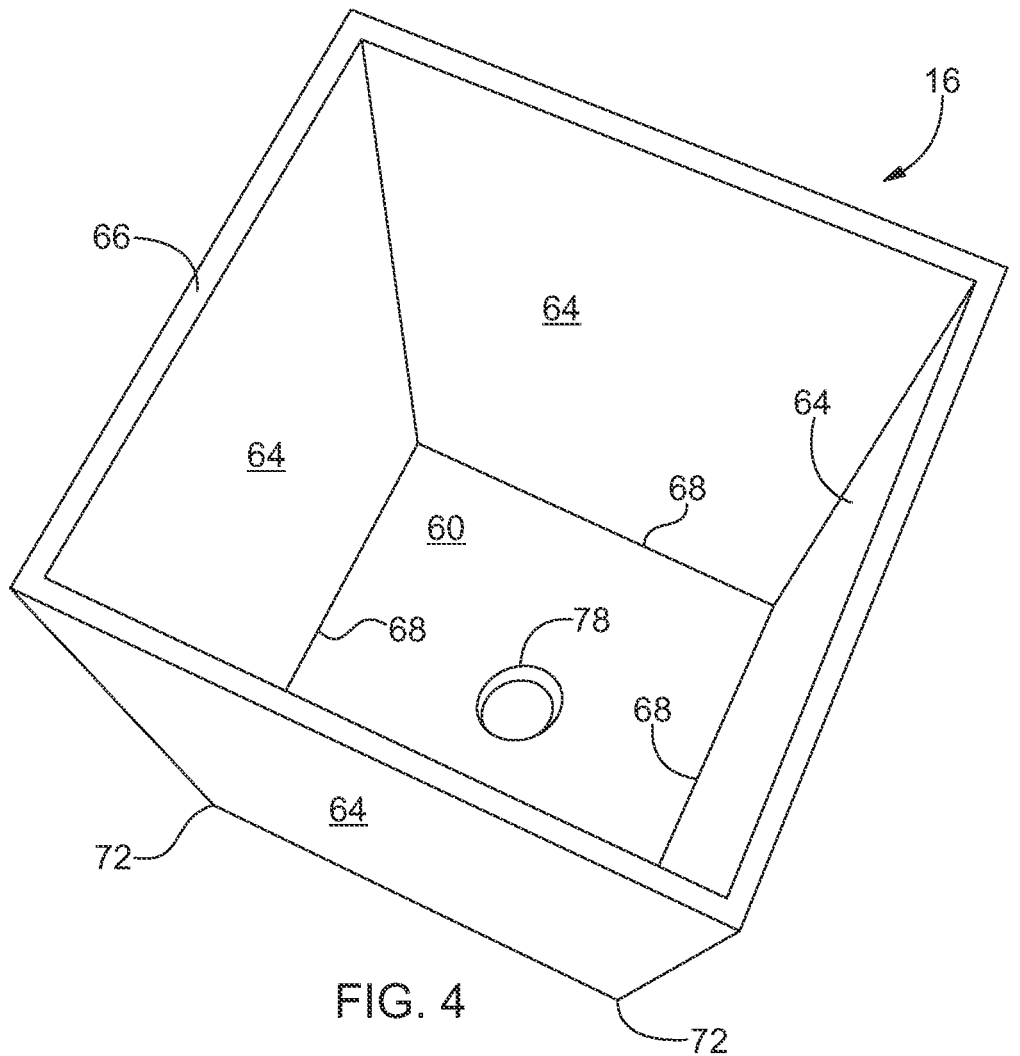
FIG. 4 is perspective view of an upper-most interengageable container in accordance with an exemplary embodiment of the present invention.

As more clearly illustrated in FIG. 4, for example, each upper-most interengageable container 16 includes a bottom portion 60 having outer edges 62, and at least four isosceles trapezoid tapered sidewalls 64 attached to, and rising from and outwards of, the bottom portion 60, each of the least four upper-most interengageable container tapered sidewalls 64 having (a) an upper-most interengageable container top edge 66 parallel to each other and extending laterally outward of (b) a respective outer edge 62 of respective upper-most interengageable container bottom portion 40 from which they are attached at (c) respective upper-most interengageable container lower edges 68, (d) upper-most interengageable container inner corners 70 at each intersection of adjacent ones of the at least four tapered upper-most interengageable container sidewalls 64, and upper-most interengageable container bottom outer corners 72 at upper-most interengageable container bottom portion 60. At least one upper interengageable container bottom outer corner 72 adapted to contact a respective one of the upper surfaces 56 of the upper interengageable container 14 rib structures 54. Upper-most container 16 is sized so that when contacting upper surface 56 of rib 54, top edge 66 of upper-most container 16 is generally at least about flush with top edge 46 of upper container 14, and top edge 24 of bottom-most container 12, when upper-most container 16 is nested within upper container 14, and upper container 14 is contained within/nested within bottom-most container 12. Upper-most container 16 may include drainage hole 78 in bottom portion 60 that may otherwise be plugged with a plug (not shown). It is noted that drainage holes 34, 58, 78 may be of the same size to permit a single plug/same size plugs (not shown) to plug any/all of drainage holes 34, 58, 78.

As more clearly shown in FIG. 1, upper lips/top edges 44, 46 of nested/to be nested interengageable respective upper and upper-most containers 14, 16 (will) contact adjacent other top edges 44, 46 of respective like-sized nested/to be nested interengageable respective upper and upper-most containers 14, 16 placed within respective larger interengageable respective bottom-most and upper containers 12, 14 to maintain the position of the smaller interengageable respective containers 14, 16 by providing mutual lateral support. Top edges 44, 46 of nested/to be nested interengageable respective upper and upper-most containers 14, 16 also (will) contact adjacent top edges 24, 44 of respective interengageable bottom-most and upper containers 12, 14 within which they are nested/to be nested. This construction of interengageable container assembly 10 also ensures: (1) proper alignment of any adjacent viewing port 38, 58 of nested upper containers 14 and larger bottom-most container 12 within which they are nested; and (2) such positioning of nested containers 14, 16 permit viewing of any fluid/liquid level in the larger bottom-most container 12 through long view ports 36/aligned long view ports 36, 58. In addition, view ports can be aligned in all of the removably interengageable containers with each other and with the bottom-most container.

Figure 5:
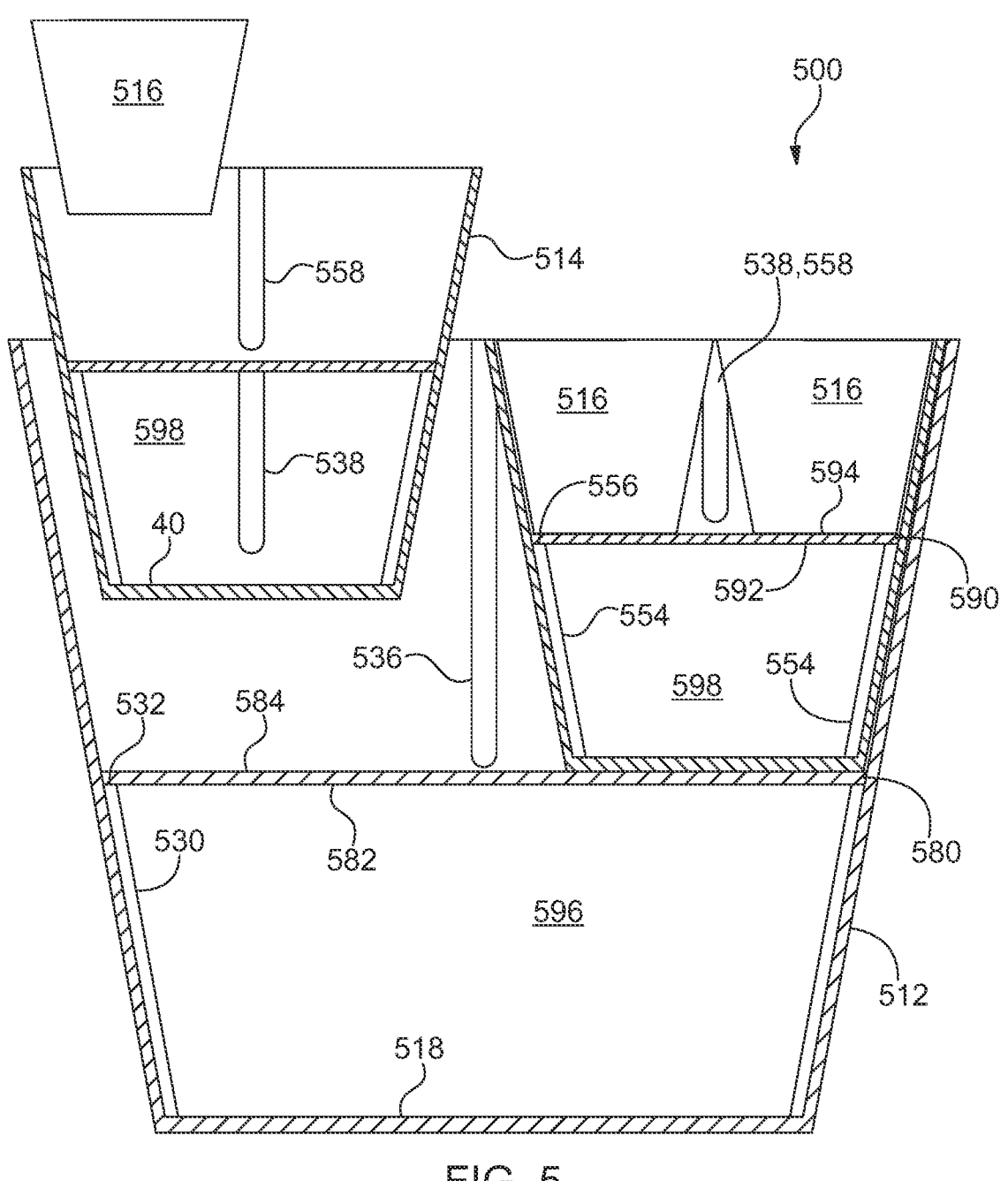
FIG. 5 is a partially disassembled sectional side view of an interengageable container assembly in accordance with an exemplary embodiment of the present invention.

As illustrated in FIG. 5, for example, an alternate exemplary embodiment of the present invention, interengageable container assembly 500, bottom-most grate 580 is placed over upper surfaces 532 of ribs 530 of bottom-most interengageable container 512 so that lower surface 582 of bottom-most grate 580 contacts upper surfaces 532 of ribs 530, to fully, or partially, form a platform for upper containers 514 to rest upon upper surface 584 of bottom-most grate 580, and likewise optional upper grate 590 is placed over upper surfaces 556 of ribs 554 of interengageable upper container 514 so that lower surface 592 of upper grate 590 contacts upper surfaces 556 of ribs 554, to fully, or partially, form a platform for upper-most containers 516 to rest upon the upper surface 594 of upper grate 590. It is noted that when using any bottom-most grate 580 and/or upper grate 590 they will raise the final heights of any respective nested containers 514, 516 by the thickness of bottom-most grate 580, and/or upper grate 590. This may be taken into account when determining the thickness of bottom-most grate 580, upper grate 590, the height of the upper surfaces 532, 556 of rib structures 530, 554, and/or the height of nesting containers 514, 516 placed/to be placed on respective bottom-most grate 580, and/of upper grate 590. For any grate nested containers 514, 516 on the same bottom-most grate 580 and/or upper grate 590, they will be supported by the grate, or those grate nested containers may not need lateral support, or as much lateral support, from the other grate-nested containers 514, 516 on the same grate. In some embodiments, drainage holes 534, 558 are blocked by using plugs (not shown), for example, to create bottom-most and upper reservoirs 96, 98 of water/liquid/fluid between bottom-most grate 580, upper grate 590 within respective bottom-most container 512 and upper containers 514. A space between bottom-most grate 580 and bottom portion 518 of bottom-most container 512 defines bottom-most reservoir 596, and a space between upper grate 590 and bottom portion 540 of upper container 514 defines upper reservoir 598.

Figure 6:
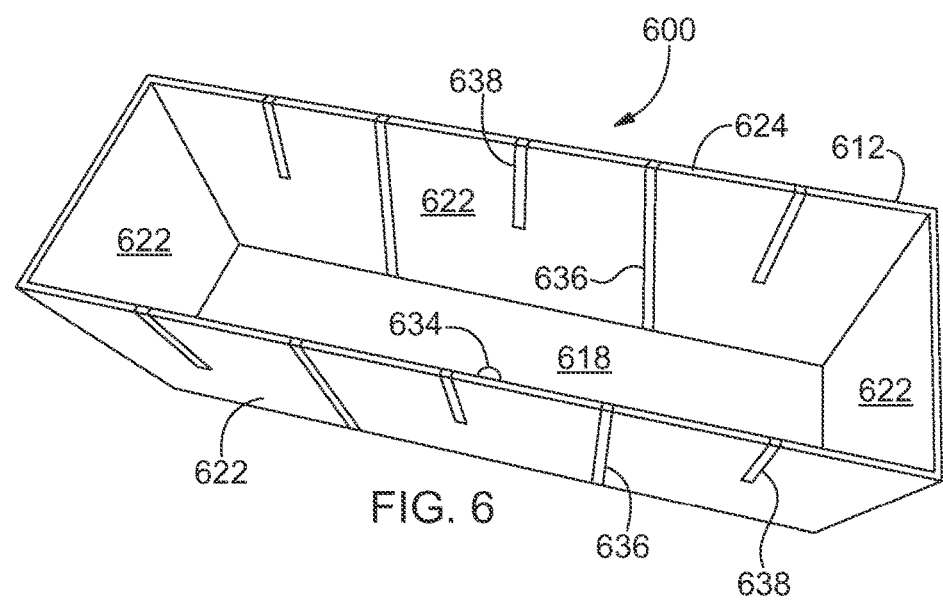
FIG. 6 is a perspective view of an interengageable container trough in accordance with an exemplary embodiment of the present invention.
Figure 7:
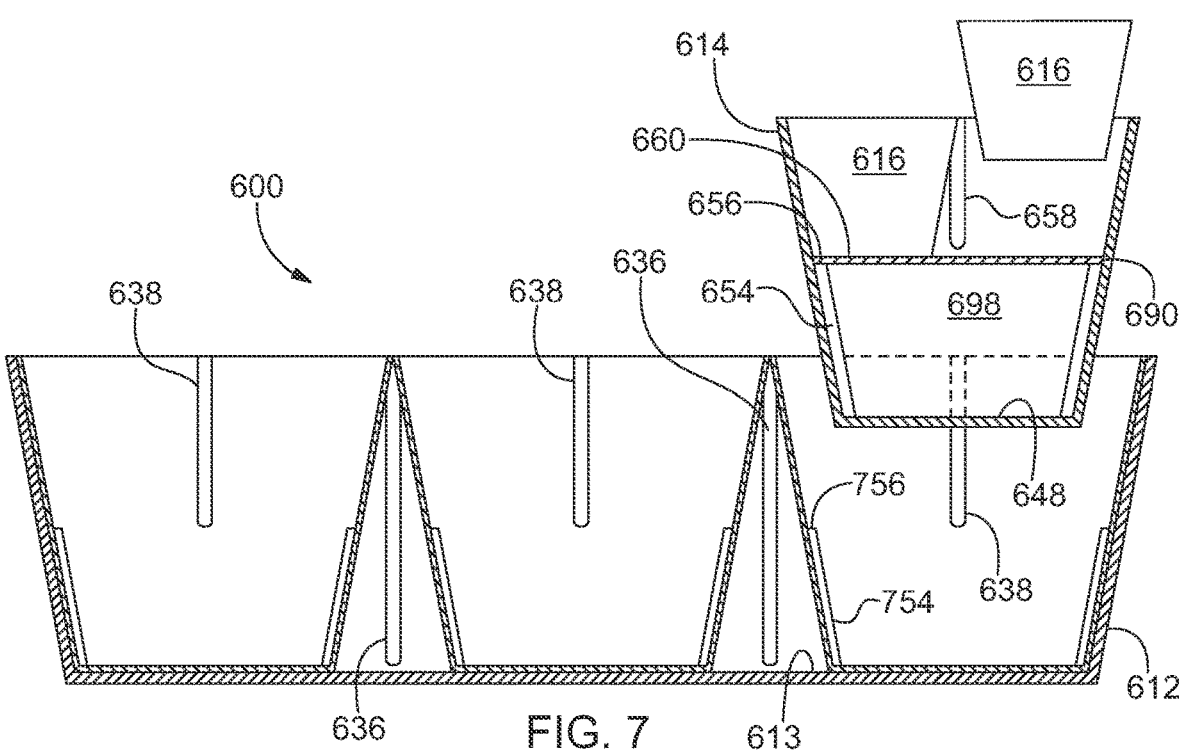
FIG. 7 is a partially disassembled sectional side view of an interengageable container assembly in accordance with an exemplary embodiment of the present invention.

As illustrated in FIGS. 6-7, in an alternate exemplary embodiment of the present invention, interengageable container assembly 600 includes rectangular-shaped, or trough-shaped, bottom-most interengageable container 612 adapted to nest upper interengageable container containers 614 which in turn in adapted to nest upper-most interengageable container containers 616. Bottom-most interengageable container 612 includes bottom portion 618, four isosceles trapezoid sidewalls 622 rising upwards from, and affixed to, bottom portion 618, drainage hole 618, long view ports 636 and short view ports 638 positioned to permit viewing of any liquid/fluid level within bottom-most interengageable container 612 and any nested upper interengageable containers 614. It is noted that in this assembly 600, respective long view ports 636, 638 may extend from top edge 624 of bottom-most interengageable container 602 to bottom portion 618 (as shown in FIG. 6, for example) or from top edge 624 to close to bottom portion 618 (as shown in FIG. 7, for example).

As illustrated in FIG. 7, for example, another exemplary embodiment of the present invention wherein upper interengageable containers 614 rest upon the upper surface of bottom portion 618 of bottom-most interengageable container 612. In upper interengageable container 614, lower surface 692 of optional upper grate 690 rests on upper surfaces 656 of rib structures 654 so that upper-most interengageable containers 616 rest upon upper surface 694 of upper grate 690. Upper reservoir 698 may be defined between upper grate 690 and bottom portion 640 or upper container 614.

Figure 8:
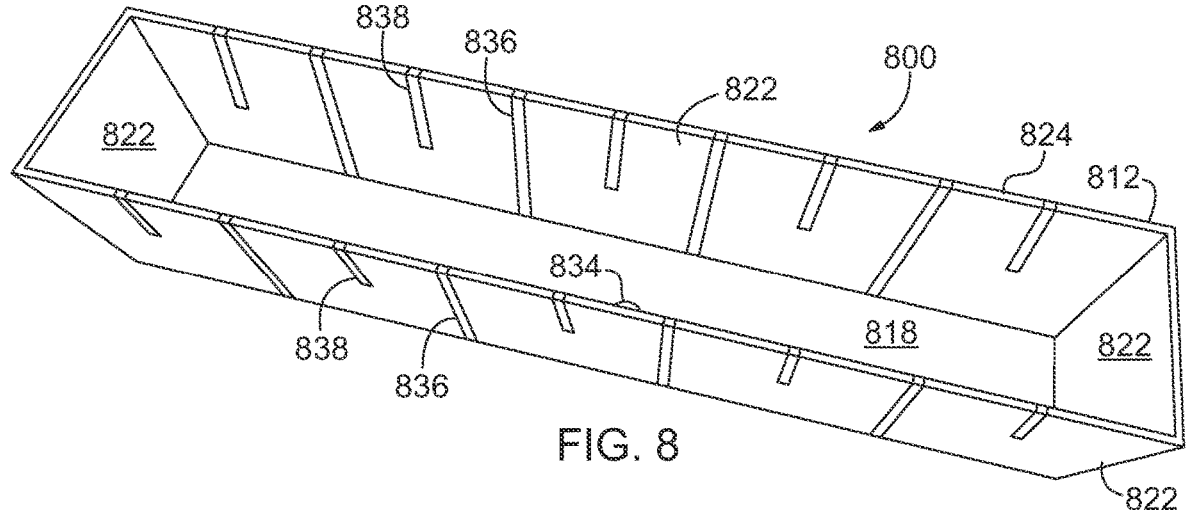
FIG. 8 is a perspective view of an interengageable container trough in accordance with an exemplary embodiment of the present invention.

FIG. 8 illustrates another exemplary embodiment of the present invention wherein a longer trough/interengageable container 800 compared to the one illustrated in FIGS. 6-7. Interengageable container 800 includes short viewing ports 838, long viewing ports 836, top edge 824, bottom portion 818 and four isosceles trapezoid tapered sidewalls 822 rising upwards from, and affixed to, bottom portion 818. Upper and upper-most interengageable containers may be nested in a similar manner as shown in, for example, the embodiment illustrated in FIG. 7.

Figure 9A:
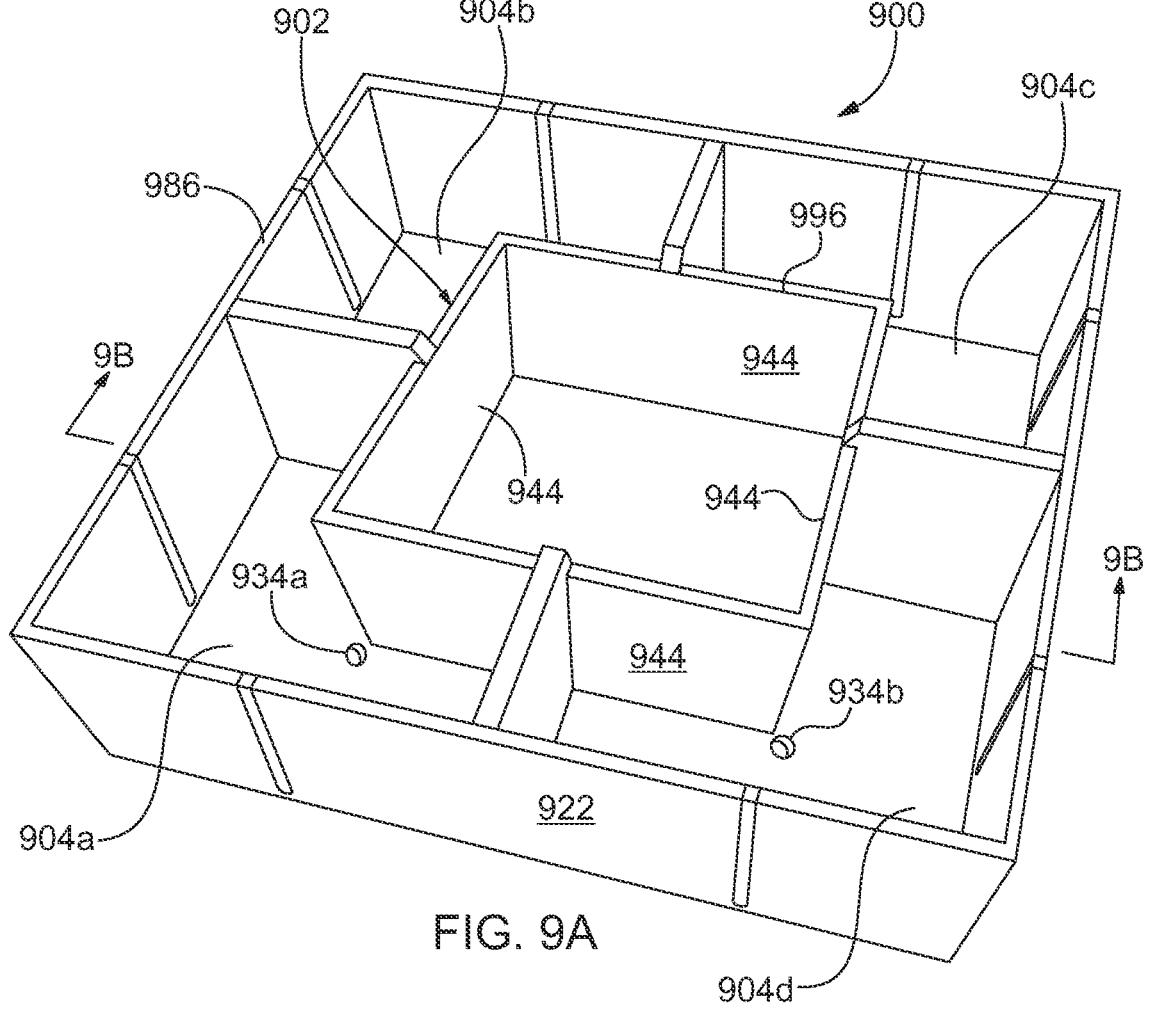
FIG. 9A is a perspective view of an insert interengageable container in accordance with another exemplary embodiment of the present invention.
Figure 9B:
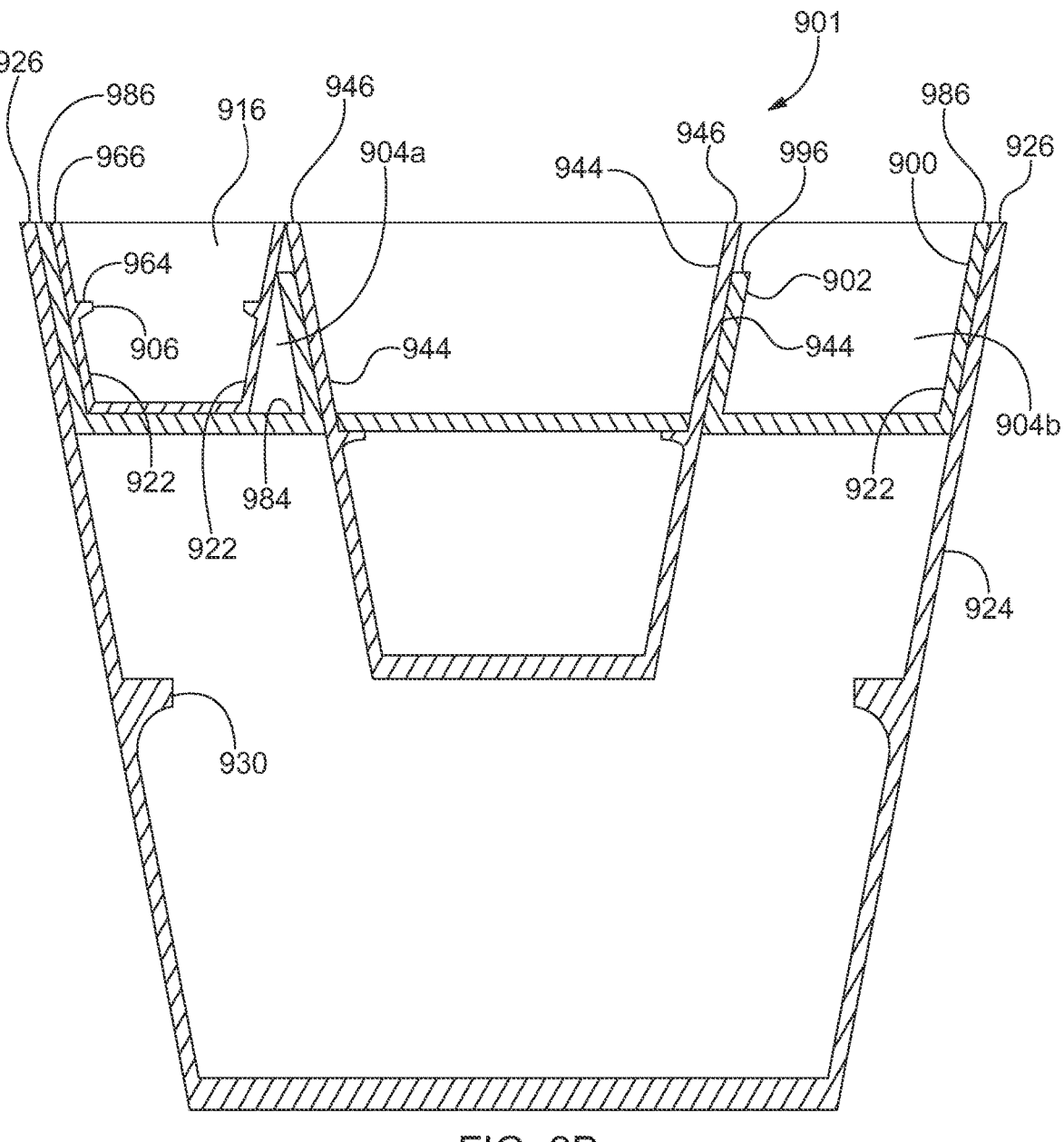
FIG. 9B is a partially disassembled sectional side view of the insert interengageable container of FIG. 9A along line 9B-9B nested within a larger interengageable container to form an interengageable container assembly in accordance with an exemplary embodiment of the present invention.

FIGS. 9A-9B illustrate another exemplary embodiment of the present invention. FIG. 9A illustrates insert 900 having outside tapered sidewalls 922 and center receiving sleeve 902 with inner tapered sidewalls 944. Insert 900 is adapted to receive, for example, (upper) interengageable container 914, separated by outer cradle 904 that is apportioned into four cradle portions 904A, 904B, 904C, 904D adapted to receive, for example, (upper-most) interengageable containers 916. Cradle portions 904A, 904B, 904C, 904D include respective drainage holes 934A, 934B, 934C, 934D (drainage holes 934B, 934C not shown) FIG. 9B illustrates insert 900 placed within (bottom-most) interengageable container 924 so that top edges 986 of insert 900 outer tapered sidewalls 922 are generally at least about flush with top edges 926 of (bottom-most) interengageable container 924.

Inner tapered sidewalls 944 of center receiving sleeve 902 are adapted for receipt of (upper) interengageable container 914 so that top edges 946 of (upper) interengageable container 914 are generally at least about flush with: (1) respective top edges 986 of outer tapered sidewalls 922 of insert 900; (2) respective top edges 926 of (bottom-most) interengageable container 924; and (3) respective top edges 966 of (upper-most) interengageable containers 916 received within respective receiving cradles 904A, 904B, 904C, 904D. As such, top edges 996 of center receiving tapered sleeve sidewalls 944 are lower than top edge 966 of outer tapered (upper-most) interengageable container sidewalls 922 to accommodate placement of (upper-most) interengageable containers 916 so that center receiving tapered sleeve sidewalls 944 contact inner sidewalls 922 below top edges 966.

Insert 900 nests within bottom-most container 924 of interengageable container assembly 901 illustrated in FIG. 9B, upper-most interengageable containers 916 nest within respective cradle portions 904A, 904B, 904C, 904D of insert 900, and upper interengageable container 914 nests within center receiving sleeve 902 of insert 900 for a upper surface interengageable container assembly 901.

It is noted that the (large) insert rests within the large container due to the narrowing base of the large container (trapezoidal sides). The medium container fits snugly within the receiving sleeve of the large insert due its size and narrowing base while small containers fit along the periphery. The large insert has drainage holes in the base that may be plugged, making the large insert a sub-irrigation system for the small containers. The medium container may still be sub-irrigated from the large container. Small containers still fit/nest within the medium container while resting on the medium container rib structures. However, only the lips (top edges) of the small containers fitting/nesting within the medium container (that is nested within the center receiving sleeve of the large insert) contact the respective lips (top edges) of the medium container. The lips (top edges) of any four clusters of three small containers in the periphery (in the receiving cradles) of the large insert would contact one another but wouldn't contact the lips of any four small containers held within the medium container (as the respective lips (top edges) of the medium container would intercede). It is contemplated that exemplary insert 900 could nest within bottom-most interengageable container 12, upper interengageable container 14, etc. based upon the sizes of the interengageable containers and the exemplary insert 900.

Figures 12, 13:
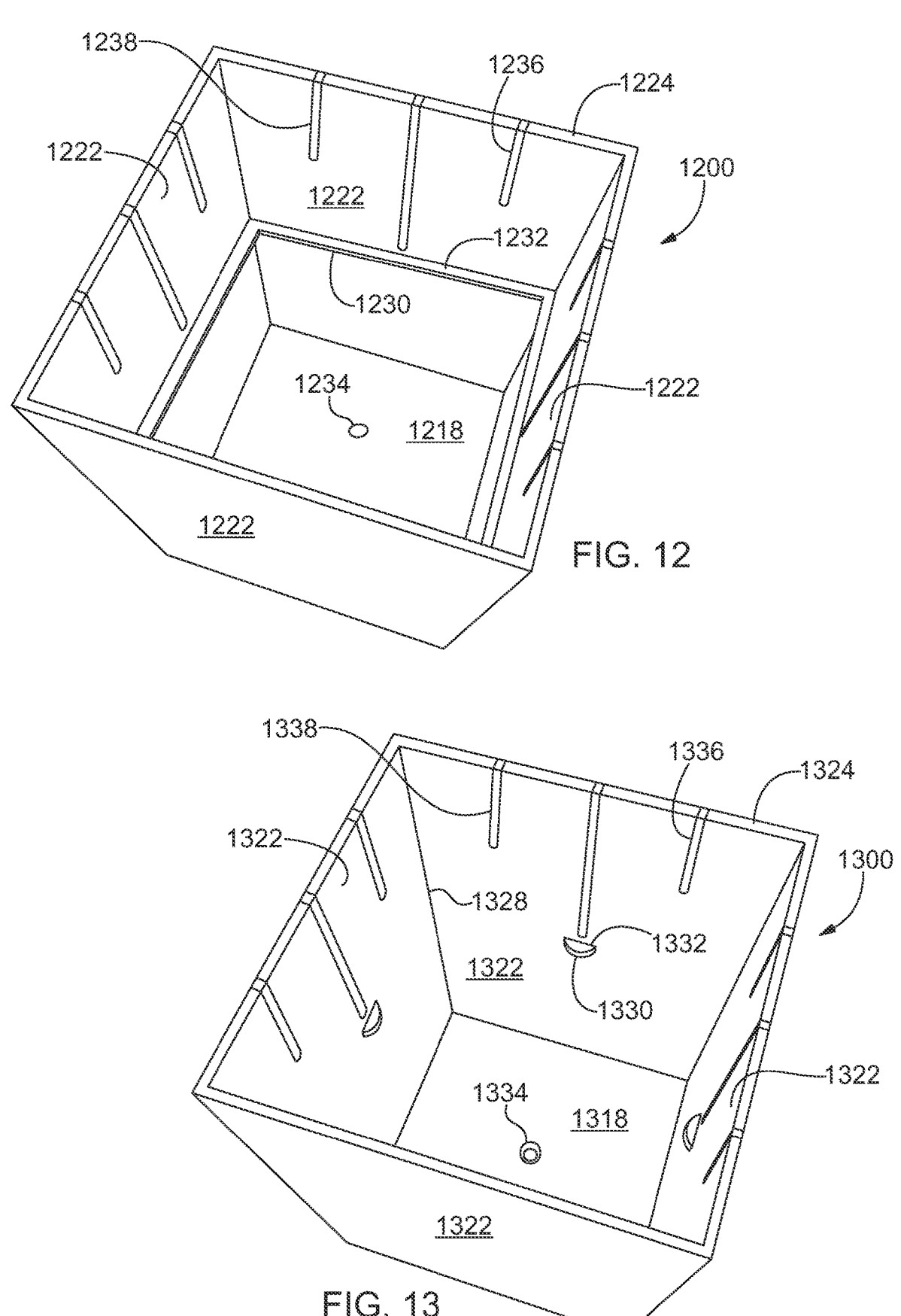
FIG. 12 is a perspective view of an interengageable container assembly in accordance with another exemplary embodiment of the present invention.
FIG. 13 is a perspective view of an interengageable container assembly in accordance with another exemplary embodiment of the present invention.

FIG. 12 illustrates another alternate exemplary embodiment of the present invention wherein support structure 1230 is continuous horizontal ridge 1230 about the tapered sidewalls 1222 of interengageable container 1200. Support structure ridge 1230 has continuous upper surface 1232 spaced apart from, and parallel to, bottom portion 1218, and spaced apart from, and at least about parallel to top edge 1224 of isosceles-trapezoid-shaped tapered sidewalls 1222. Support structure ridge 1230 is adapted to support the bottom of any smaller interengageable container placed/ nested within interengageable container 1200 so that the top edge of such smaller placed/nested smaller interengageable containers may be generally at least about flush with top edges 1224 of tapered sidewalls 1222.

FIG. 13 illustrates another alternate exemplary embodiment of the present invention wherein support structure 1330 is a series of tab structures 1330 positioned about the midpoint of tapered sidewalls 1322 of interengageable container 1300. Support structure tab structures 1330 each have upper surface 1332 spaced apart from, and parallel to, bottom portion 1318, and spaced apart from, and at least about parallel to top edge 1324 of isosceles-trapezoid-shaped tapered sidewalls 1322. Support structure tab structures 1330 are adapted to support the bottom of any smaller interengageable container(s) placed/nested within interengageable container 1300 so that the top edge of such smaller placed/nested smaller interengageable containers may be generally at least about flush with top edges 1324 of tapered sidewalls 1322, and at least generally at least about flush with the top edges of adjacent ones of the smaller placed/ nested smaller interengageable containers.

Figures 14, 15:
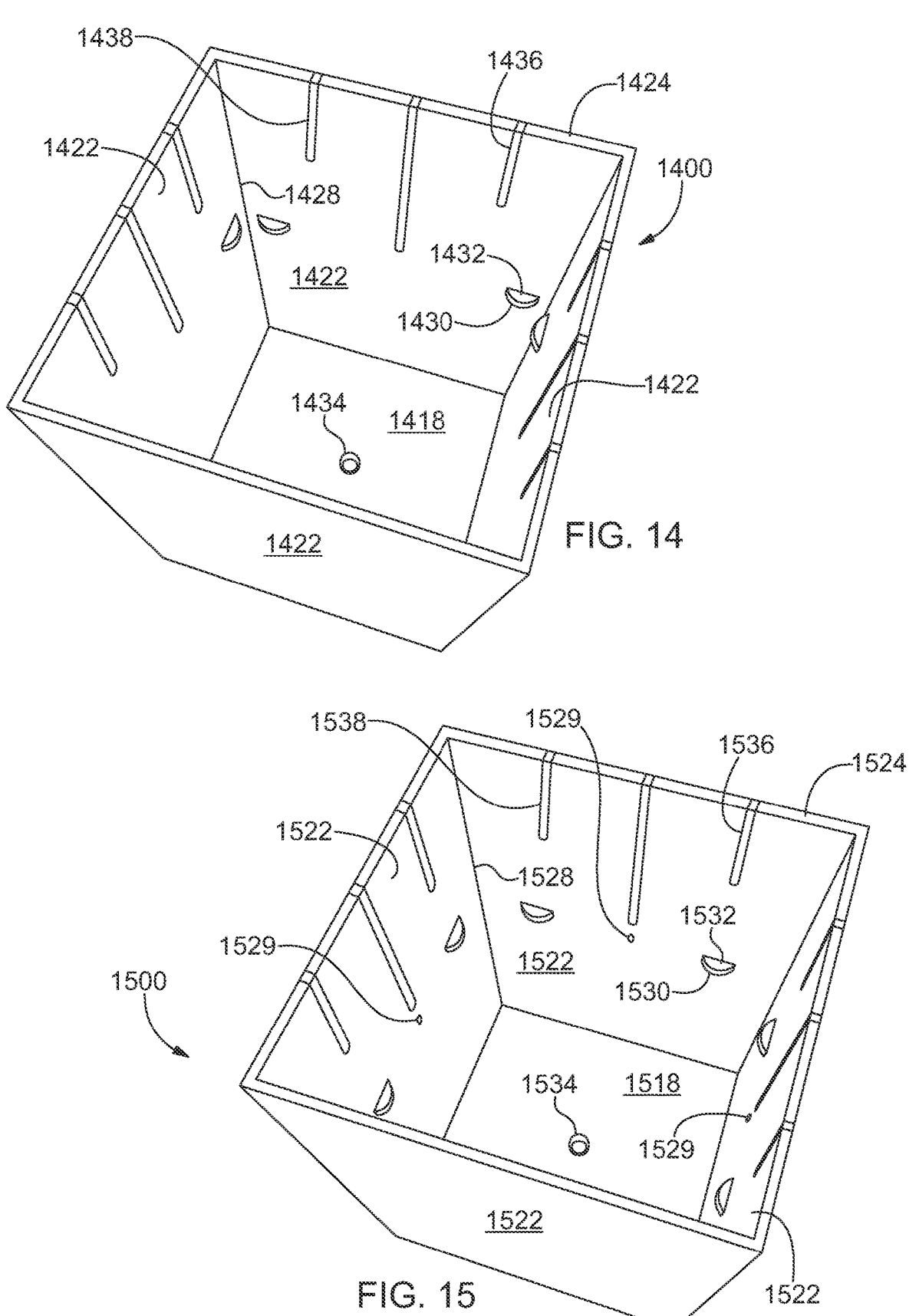
FIG. 14 is a perspective view of an interengageable container assembly in accordance with yet another exemplary embodiment of the present invention.
FIG. 15 is a perspective view of an interengageable container assembly in accordance with another exemplary embodiment of the present invention.
Figures 16, 17:
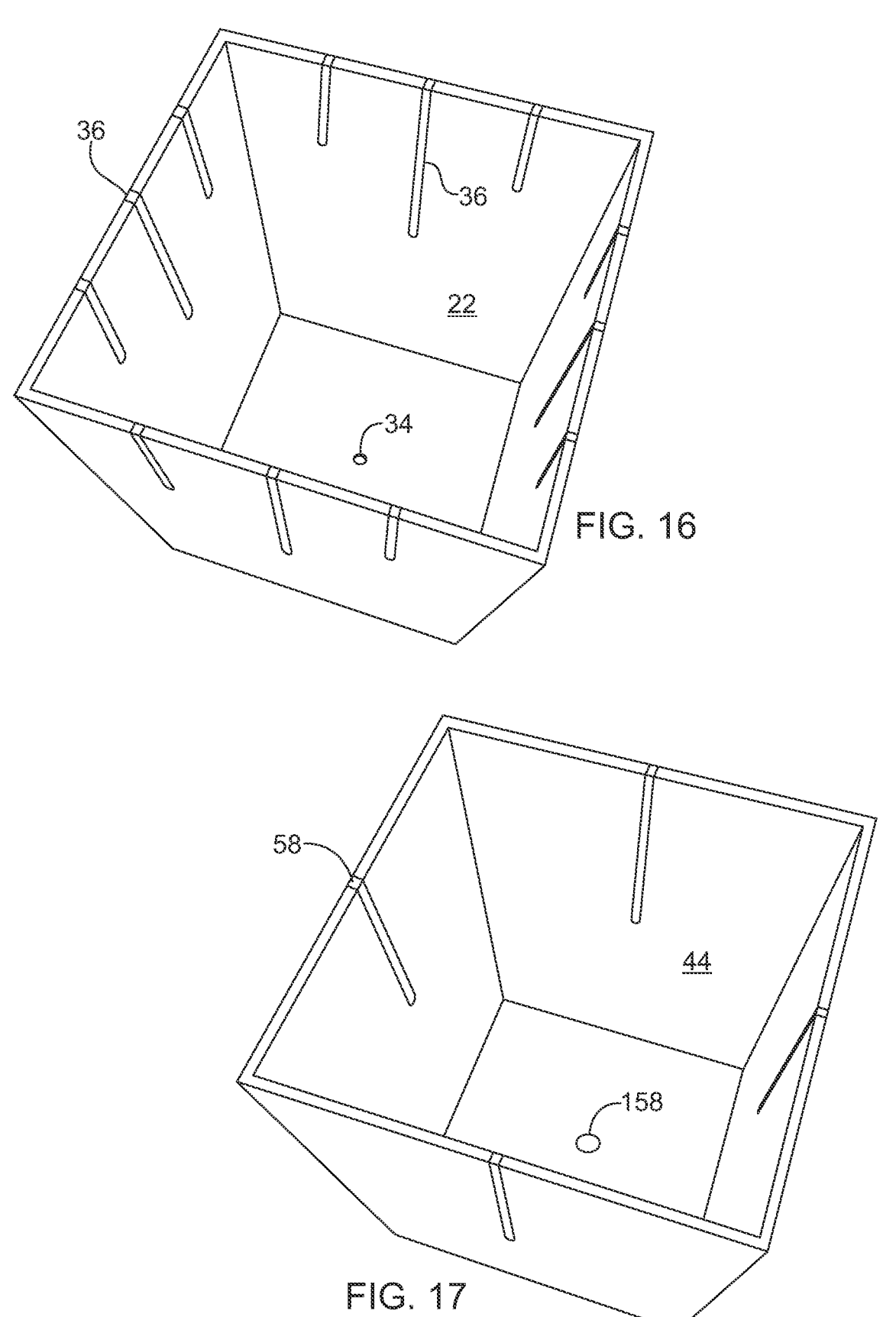
FIG. 16 is a perspective view of a bottom-most interengageable container in accordance with an exemplary embodiment of the present invention.
FIG. 17 is a perspective view of an intermediate interengageable container in accordance with an exemplary embodiment of the present invention.
Figure 18:
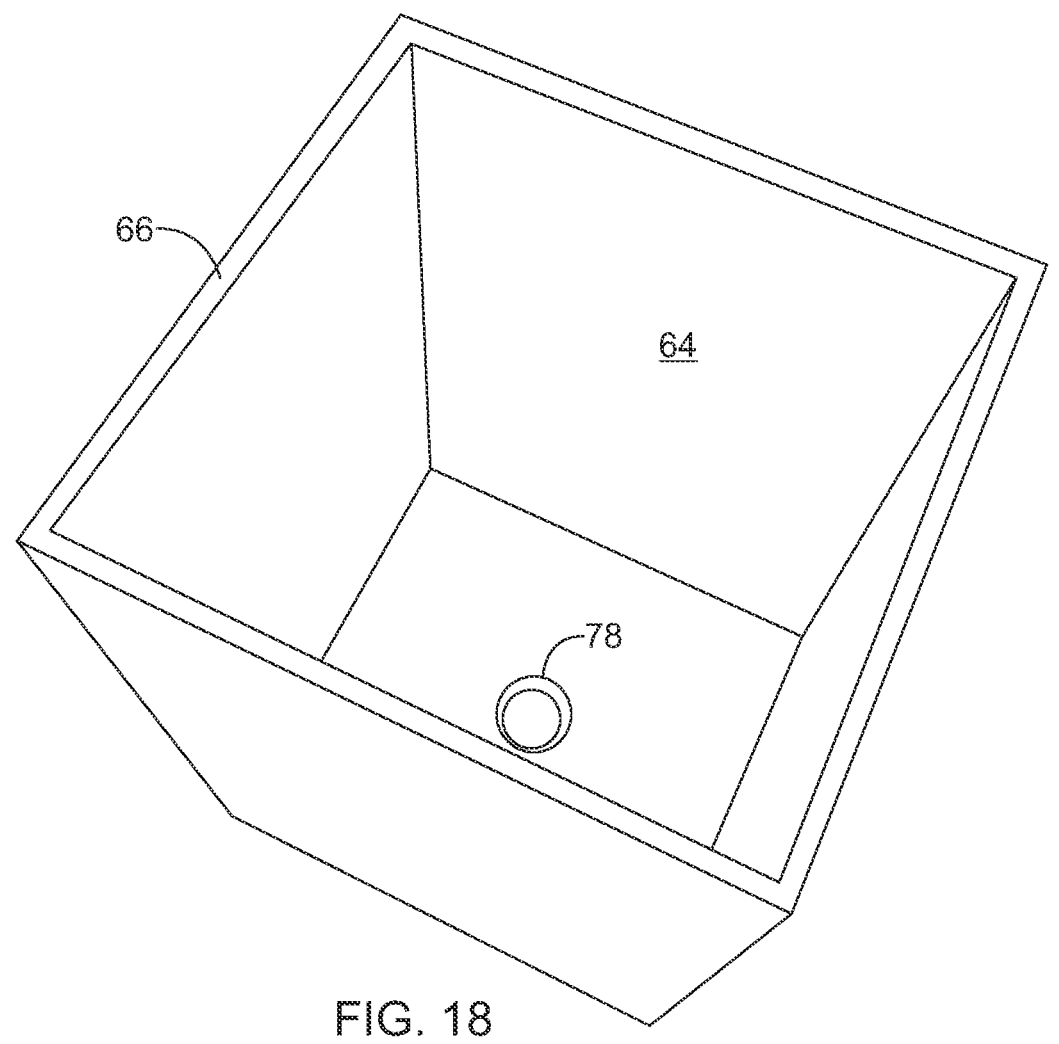
FIG. 18 is perspective view of an upper-most interengageable container in accordance with an exemplary embodiment of the present invention.
Figure 19:
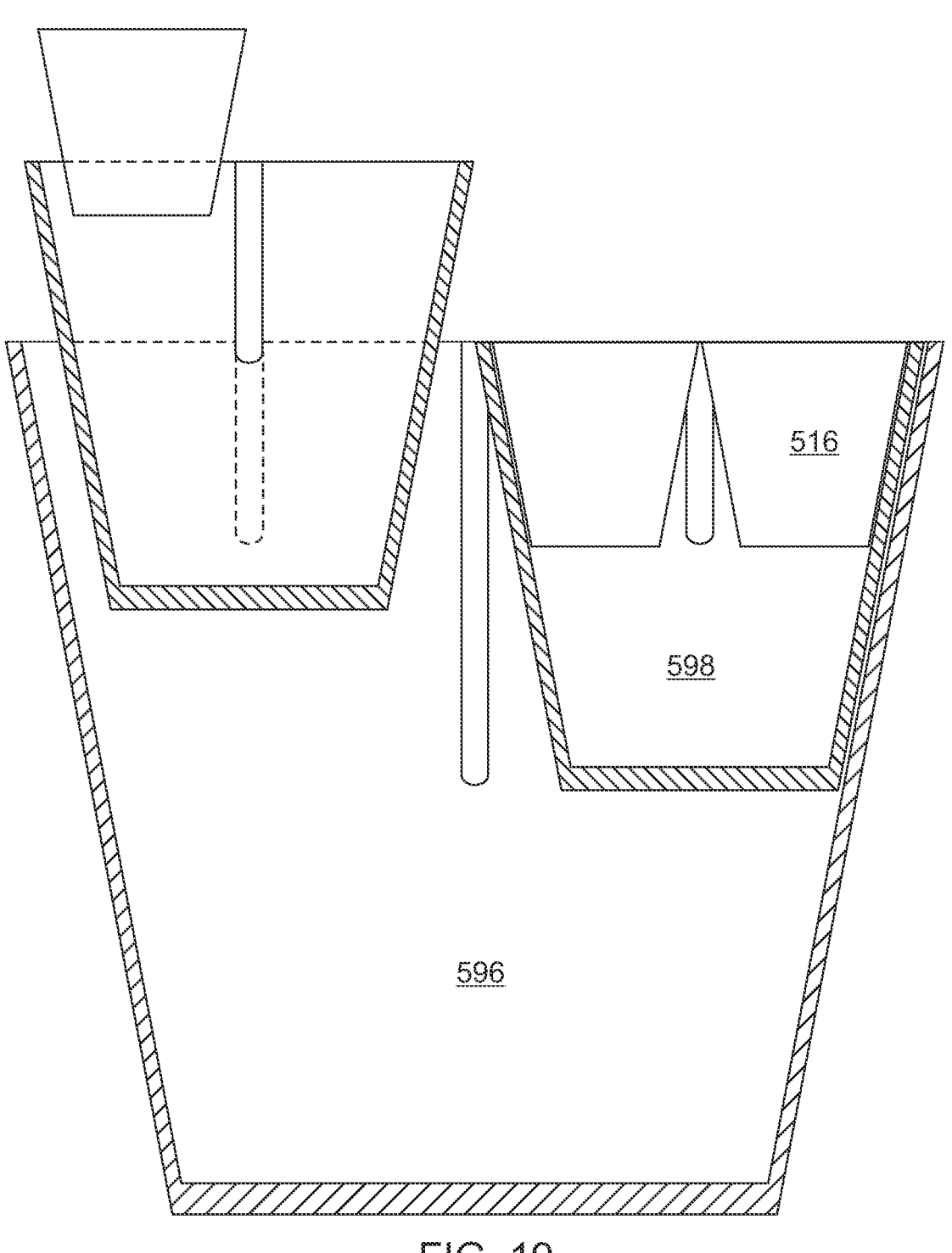
FIG. 19 is a partially disassembled sectional side view of an interengageable container assembly in accordance with an exemplary embodiment of the present invention.
Figure 20:
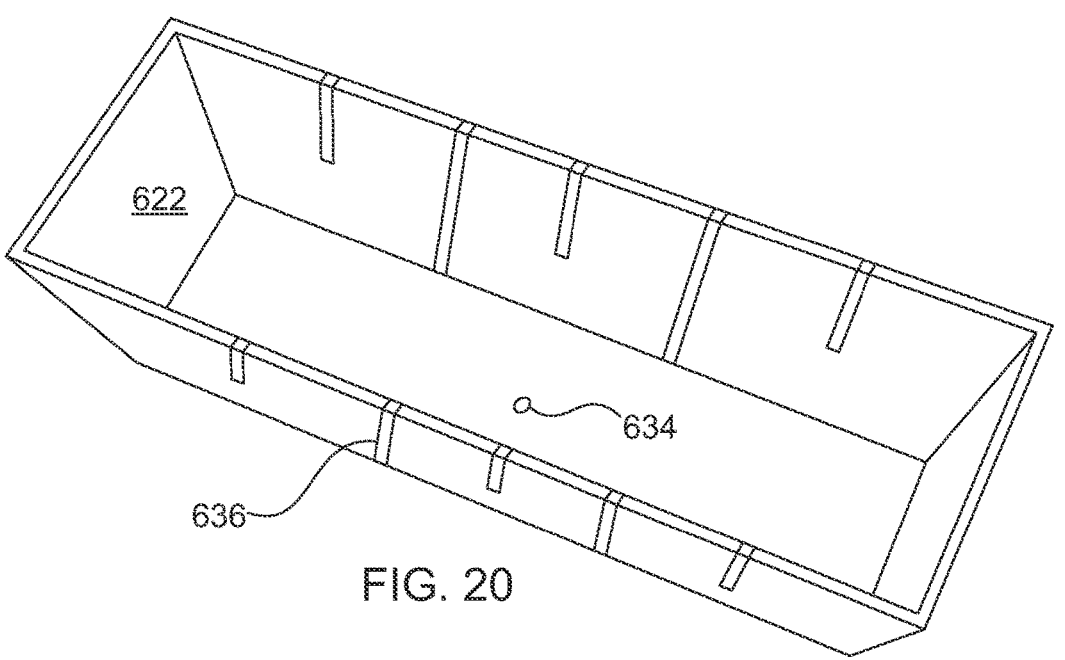
FIG. 20 is a perspective view of an interengageable container trough in accordance with an exemplary embodiment of the present invention.
Figure 21:
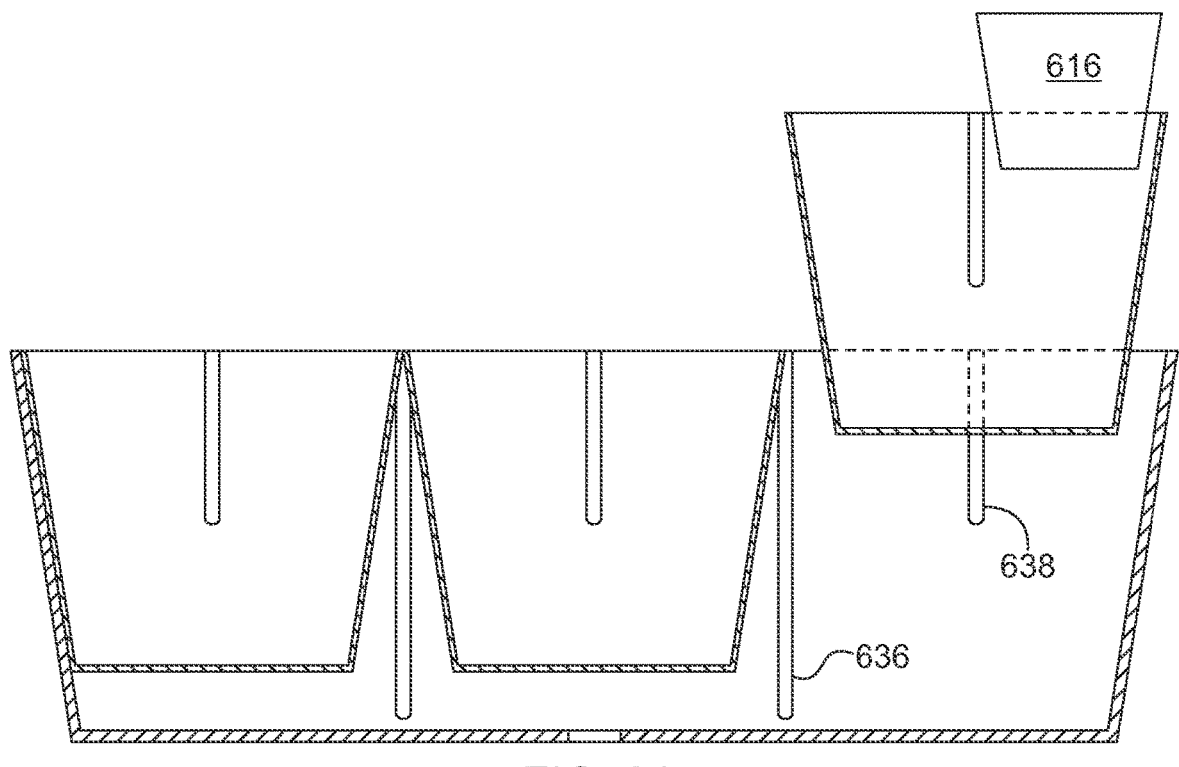
FIG. 21 is a partially disassembled sectional side view of an interengageable container assembly in accordance with an exemplary embodiment of the present invention.
Figure 22:
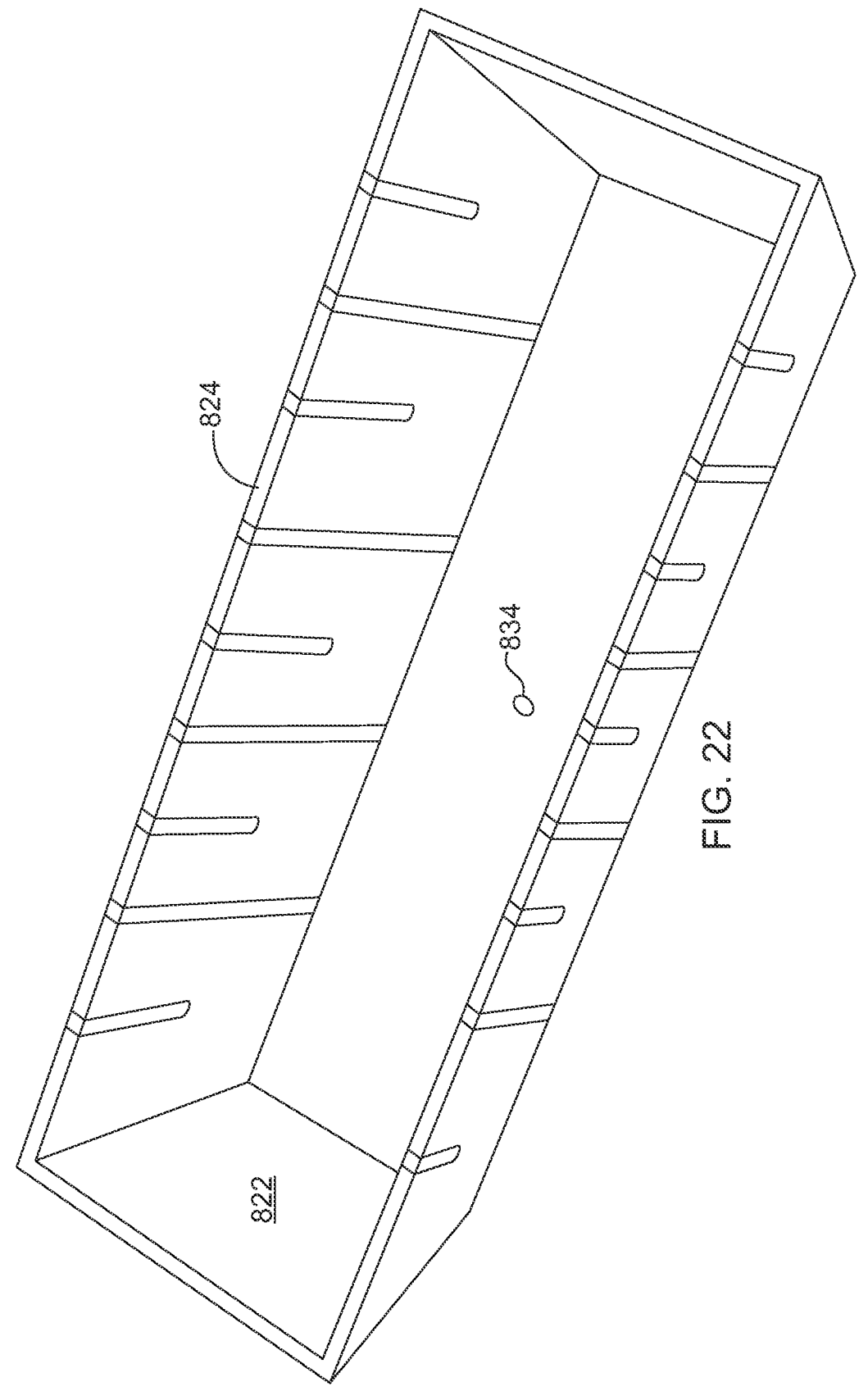
FIG. 22 is a perspective view of an interengageable container trough in accordance with an exemplary embodiment of the present invention.
Figure 23:
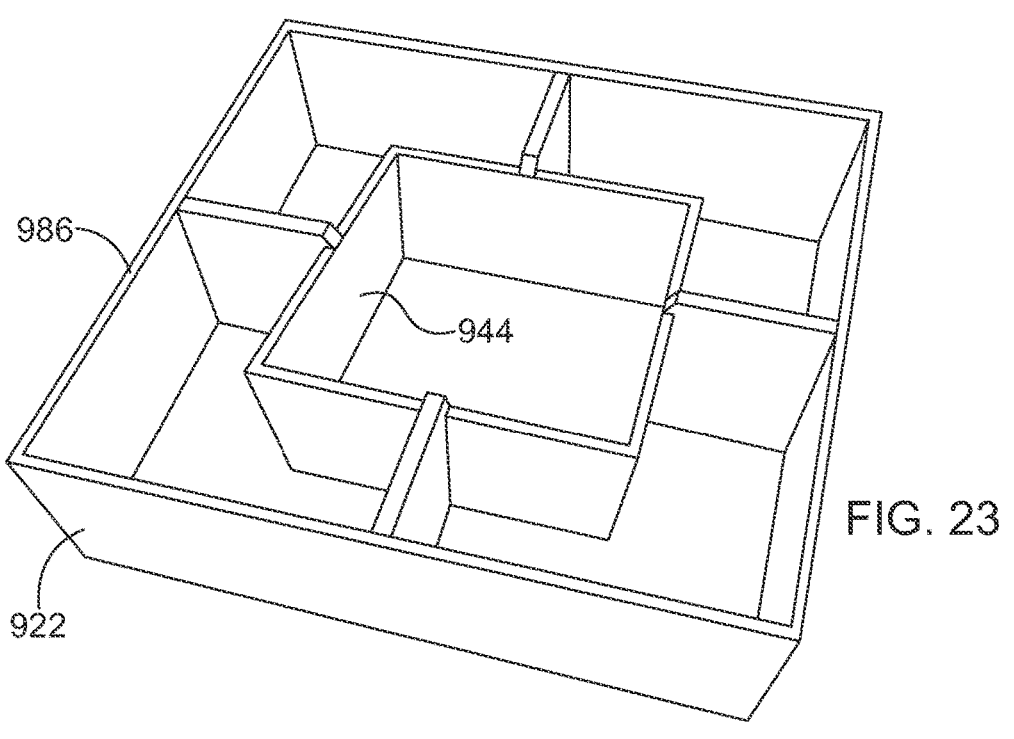
FIG. 23 is a perspective view of an insert interengageable container in accordance with another exemplary embodiment of the present invention.
Figure 24:
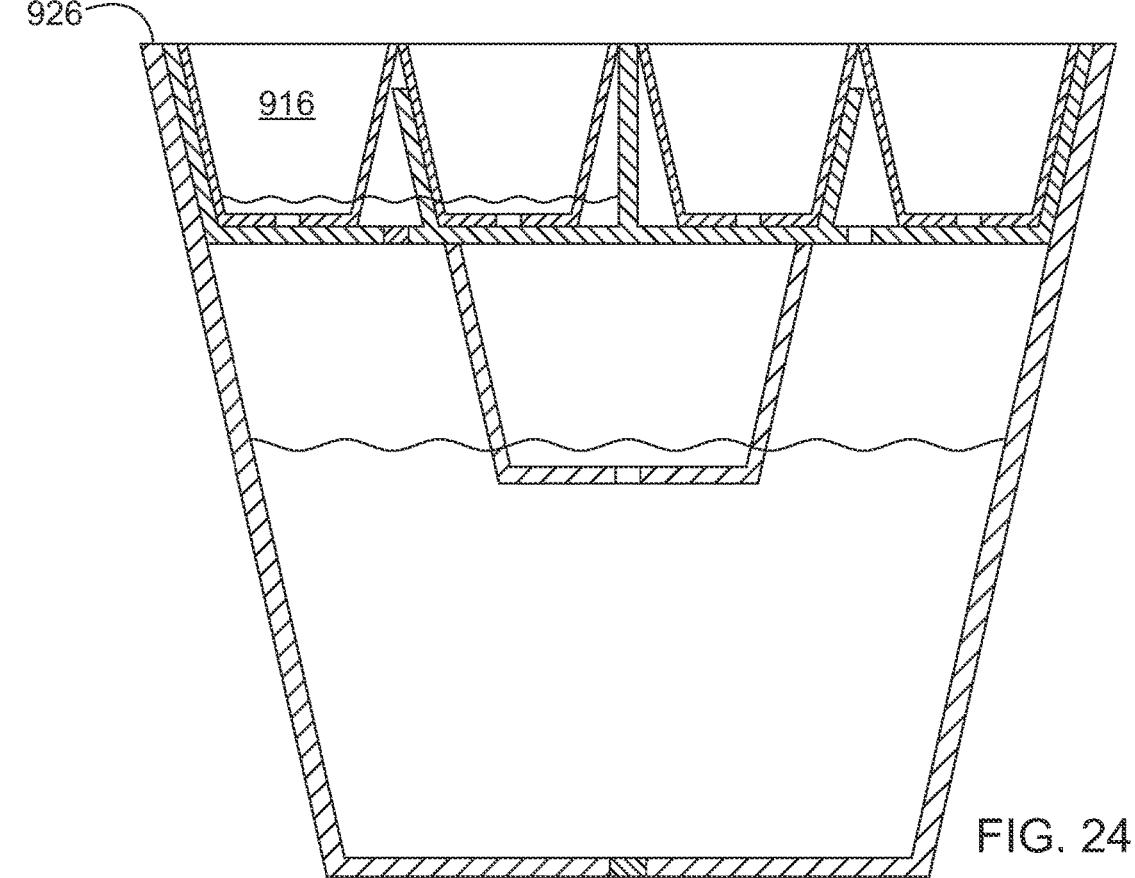
FIG. 24 is a cross sectional view of an insert interengageable container in accordance with another exemplary embodiment of the present invention.
Figure 25:
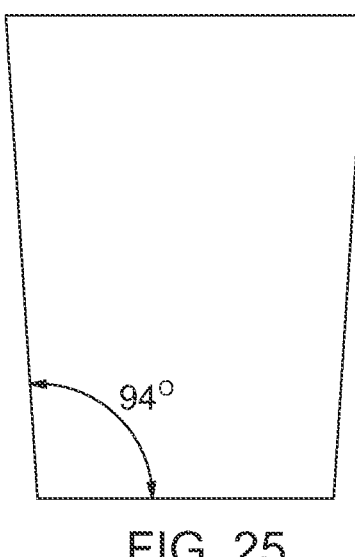
FIG. 25 is a side view of an exemplary container.
Figure 26:
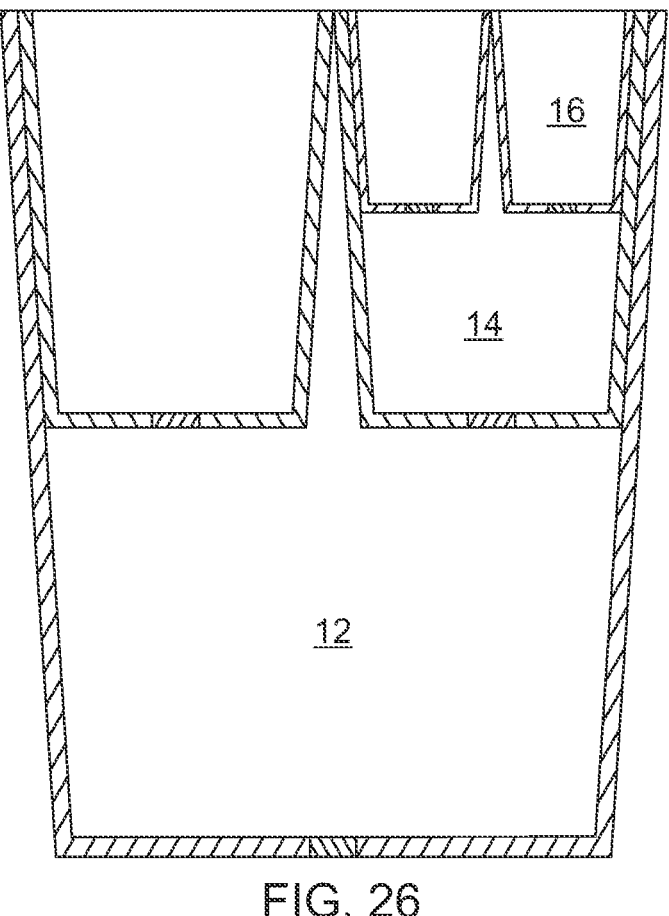
FIG. 26 is a cross-sectional view of an exemplary container assembly.
Figure 27:
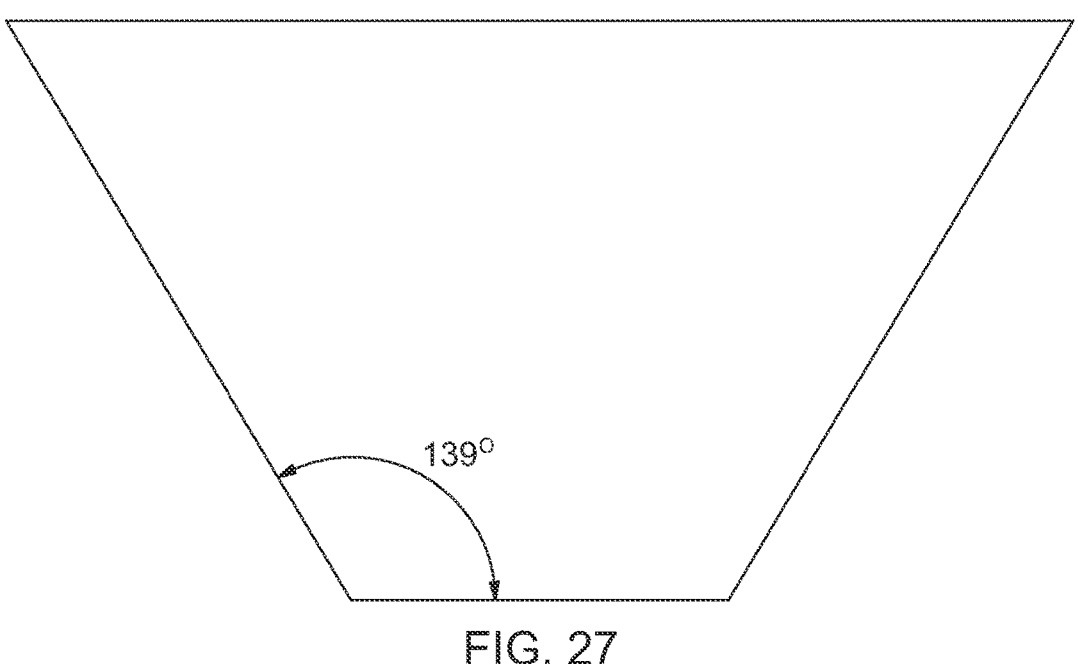
FIG. 27 is a side view of an exemplary container.
Figure 28:
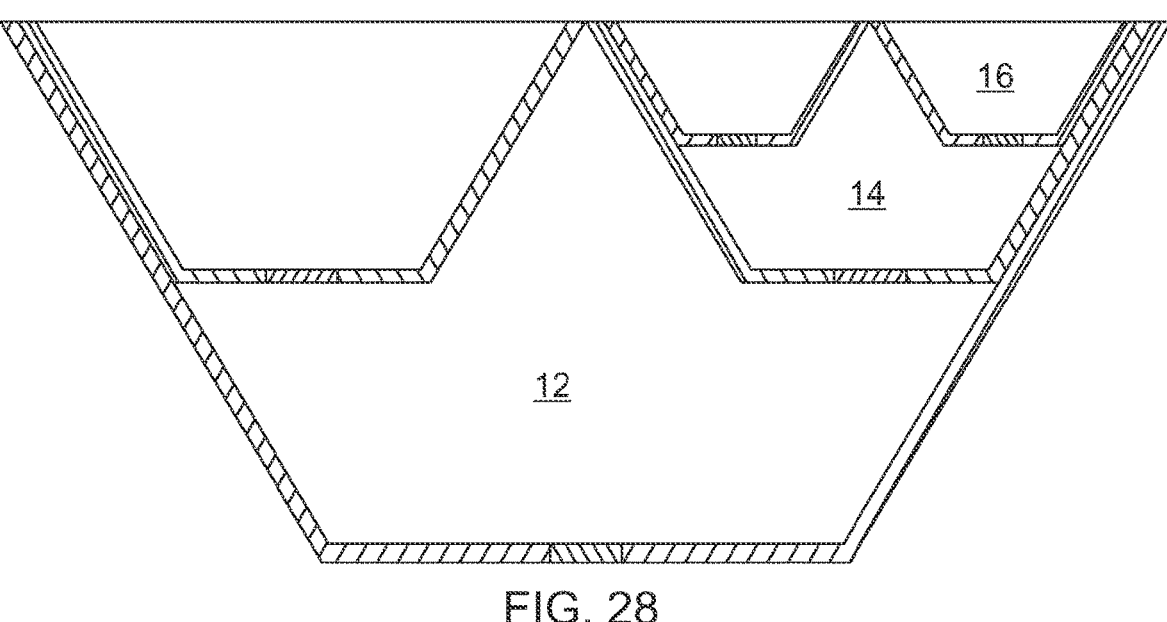
FIG. 28 is a cross-sectional view of an exemplary container assembly.

FIG. 14 illustrates yet another alternate exemplary embodiment of the present invention wherein support structure 1430 is a series of pairs of tab structures 1430 positioned on either side of inner corners 1428 of respective adjacent tapered sidewalls 1422 of interengageable container 1400 Support structure pairs of tab structures 1430 each have upper surfaces 1432 spaced apart from, and parallel to, bottom portion 1418, and spaced apart from, and at least about parallel to top edge 1424 of isosceles-trapezoid-shaped tapered sidewalls 1422. Support structure tab structures 1430 are adapted to support the bottom of any smaller interengageable container(s) placed/nested within interengageable container 1400 so that the top edge of such smaller placed/nested smaller interengageable containers may be generally at least about flush with top edges 1424 of tapered sidewalls 1422, and generally at least about flush with the top edges of adjacent ones of the smaller placed/ nested smaller interengageable containers.

FIG. 15 illustrates yet another alternate exemplary embodiment of the present invention wherein support structure 1530 is a series of pairs of tab structures 1530 positioned on either side of mid points 1529 between the inner corners 1528 of respective adjacent tapered sidewalls 1522 of interengageable container 1500. This may place each tab structure 1530 directly below respective short viewing ports 1538 and/or on either side of long view ports 1536. Support structure pairs of tab structures 1530 each have upper surfaces 1532 spaced apart from, and parallel to, bottom portion 1518, and spaced apart from, and at least about parallel to top edge 1524 of isosceles-trapezoid-shaped tapered sidewalls 1522. Support structure tab structures 1530 are adapted to support the bottom of any smaller interengageable container(s) placed/nested within interengageable container 1500 so that the top edge of such smaller placed/nested smaller interengageable containers may be generally at least about flush with top edges 1524 of tapered sidewalls 1522, and generally at least about flush with the top edges of adjacent ones of the smaller placed/nested smaller interengageable containers.

While certain structures have been illustrated herein for the interengageable container assembly, other structures/ methods are contemplated such as support structures positioned on and about the sidewalls at varying locations than those specifically disclosed herein. While some embodiments illustrate three sized of interengageable containers more, or less, may be implemented. For example, there could be more intermediate sized containers between the bottom-most and upper containers, or more intermediate sized containers between the upper and upper-most containers. There could be more, or less, viewing ports, the viewing ports could be shorter or longer in length positioned differently amongst the containers. The viewing ports could be horizontal and multiple in number for ease in determining sufficient/insufficient water/liquid levels. Interengageable containers 12, 14, 16 may be constructed from materials including, but not limited to, plastic, polypropylene or recycled plastic, concreate, metal, clay, ceramic, glass, rubber, fiberglass, foam, and wood for example, or other suitable material, to minimize corrosion and be suitable for the growth of vegetation/plants.

Reference is now made of FIGS. 16-24. These figures are similar to the Figures and related descriptions of FIGS. 2-9b, with the exception that support structures are not included. In the embodiments illustrated in FIGS. 16-24, the interior containers are suspended by means of mutual lateral support. In many of these embodiments relating to the suspended component, the range of the angle between the base and the shorter end of each isosceles trapezoid sidewall is between about 94 and 139 degrees, as exemplary illustrated in FIGS. 25-28. In some embodiments the angle between the base and the shorter end of each isosceles trapezoid sidewall is about 98.13 degrees. In some embodiments the angle between the base and the shorter end of each isosceles trapezoid sidewall is 98.13 degrees. Preferred materials for containers that are suspended by means of lateral support are plastic, ceramic, clay, glass, rubber, fiberglass, foam, metal and wood.

Reference is now made to FIGS. 29-68.

Figure 29:
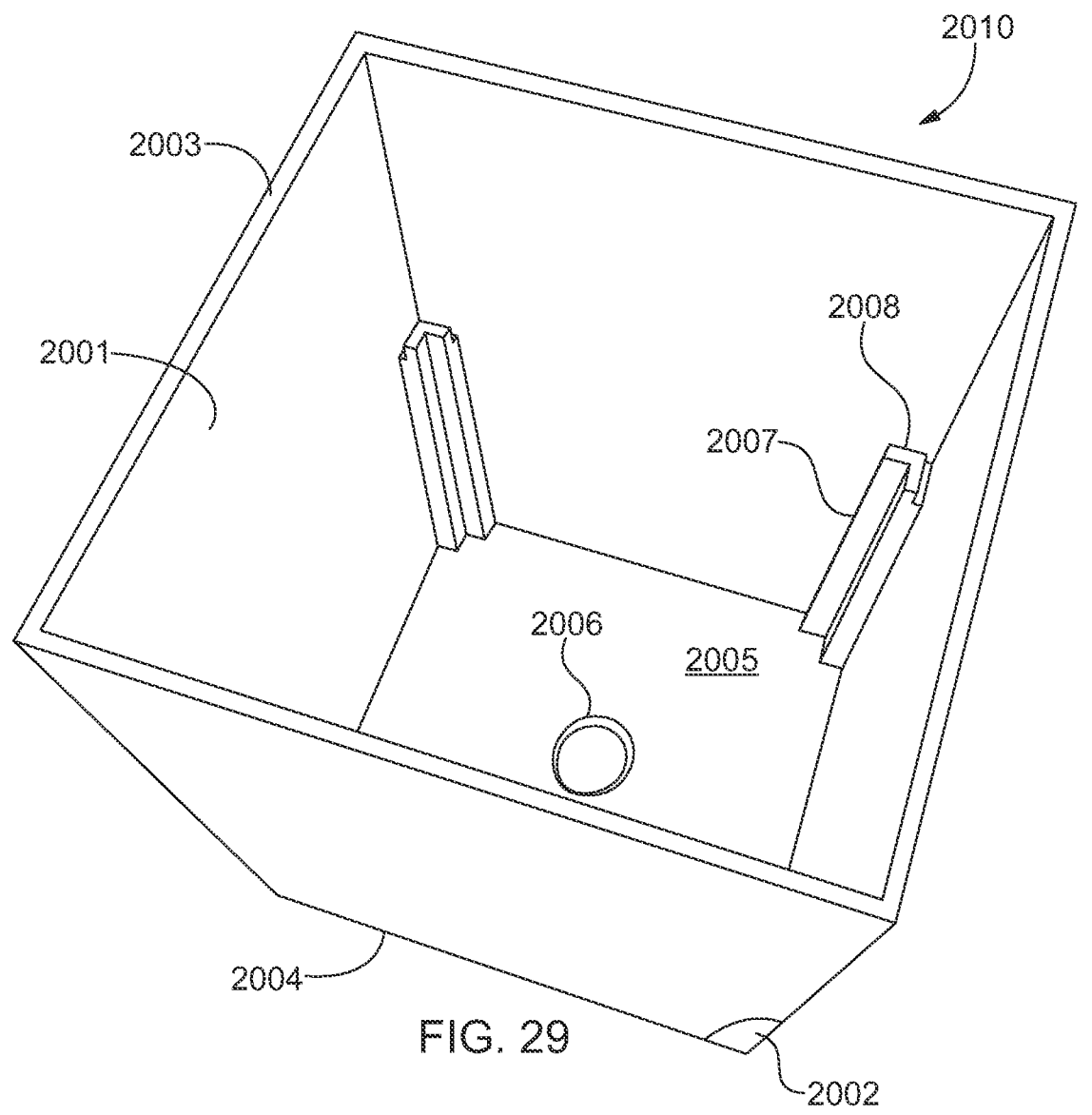
FIG. 29 is a perspective view of a square interengageable container component in accordance with the exemplary embodiment of the present invention.

As illustrated in FIG. 29, the square interengageable container component 2010 is constructed of four outer isosceles trapezoidal sidewalls 2001 that have a common base angle 2002 and a square bottom surface 2005. Opposite trapezoidal sidewalls are congruent and mirror one another. To form the square component 2010, trapezoids join at the shorter legs to derive the outer trapezoidal sidewalls 2001 and the longer base sides of the trapezoids connect perpendicularly to form the outer top edges 2003. As well, the shorter base sides of the trapezoids connect perpendicularly to form the lower edges 2004 of the square component, and square bottom surface 2005 is joined to the shorter base sides of the trapezoids. In some embodiments, the square interengageable container component 2010 features a support structure(s) 2007 fashioned along the interior of the sidewalls 2001 with an upper terminus(es) 2008 below the outer top edges 2003 that form fit to the bottom edge(s) 2004 of smaller square components 2010. Additionally, a hole 2006 can be found within the bottom surface 2005 and may be removably sealed with a plug 2060 to create a reservoir 2009. The square interengageable container component 2010 is not designed to disassemble.

Figures 30, 31:
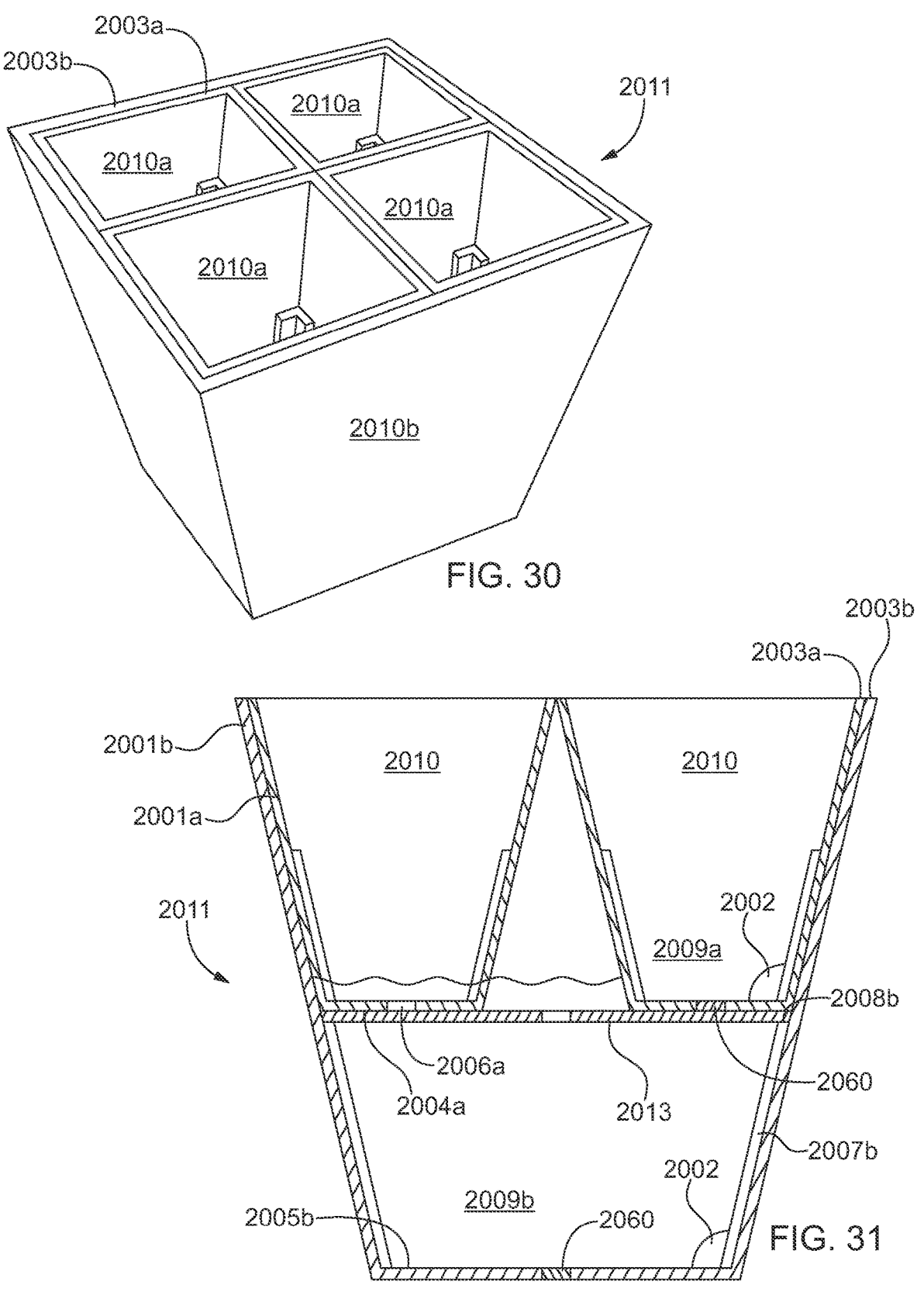
FIG. 30 is a perspective view of a fully assembled primary square unit in accordance with the exemplary embodiment of the present invention.
FIG. 31 is a sectional side view of a fully assembled primary square unit in accordance with the exemplary embodiment of the present invention.

The small square interengageable container component 2010 may be used independently to hold, for example, live plants or may be combined with other interengageable container components 2010a, 2010b to make a complex unit, as illustrated in FIG. 30. Two respective sizes of square components 2010a, 2010b are assembled to derive the primary square interengageable container unit 2011. The interior lengths of the outer top edges 2003b of the medium square component 2010b are about doubled in comparison to the exterior lengths of the outer top edges 2003a of the small square components 2010a. These measurements within the primary unit assembly 2011, in conjunction with common base angles 2002 between the components 2010a, 2010b, allow up to four small square components 2010a to be suspended above the bottom surface 2005b of the medium square component 2010b by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees. As more clearly seen in FIG. 31, in some embodiments, the upper terminus(es) 2008b of the support structure(s) 2007b within the medium square component 2010b may impede the small square component(s) 2010a from descending the interior of the outer sidewalls 2001b of the medium square component 2010b by potentially contacting the lower edge(s) 2004a of the small square component(s) 2010a. A secondary reservoir 2009b may be created by inserting a removable plug 2060 in the hole 2006b of the medium square component 2010b. Fluid may be exchanged between the square interengageable container components 2010a, 2010b through the unplugged holes 20k06a of the small square components 2010a that are suspended above the bottom surface 2005b of the medium square component 2010b. The sizing of the interengageable container components 2010a, 2010b creates generally flush upper edges 2003a, 2003b and a cohesive assembly of the primary square interengageable container unit 2011. In some embodiments, a square grate 2013 may be added to rest upon the upper terminus(es) 2008b of the support structure(s) 2007b and may contact the lower edges 2004a of a small square component 2010a and may obviate at least some of the lateral pressure.

The primary square interengageable container unit 2011 may be considered a complete assembly or may be combined with other small square interengageable container units 2011 and/or square components 2010b to create a more complex unit, as illustrated in FIG. 32-FIG. 35. Three respective sizes of square components 2010a, 2010b, 2010c are assembled to derive the secondary square interengageable container units 2101-2104. A minimum of one primary square unit 2011 nested with three small square components 2010b held within a large square component 2010c (nine components in total) are required to complete the secondary square unit 2101, and a maximum of four primary square units 2011 may be nested within a large square component 2010c (twenty-one components in total) to complete a secondary square interengageable container unit 2104. The interior lengths of the outer top edges 2003c of the large square component 10c are about doubled in comparison to the exterior lengths of the of the outer top edges 2003b of the medium square components 2010b and/or primary square units 2011. These measurements, in conjunction with common base angles 2002 between the square components 2010b, 2010c allow for the medium square components 2010b and/or primary square units 2011 to be suspended above the bottom surface 2005c of the large square component 2010c by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees.

Figures 32, 33:
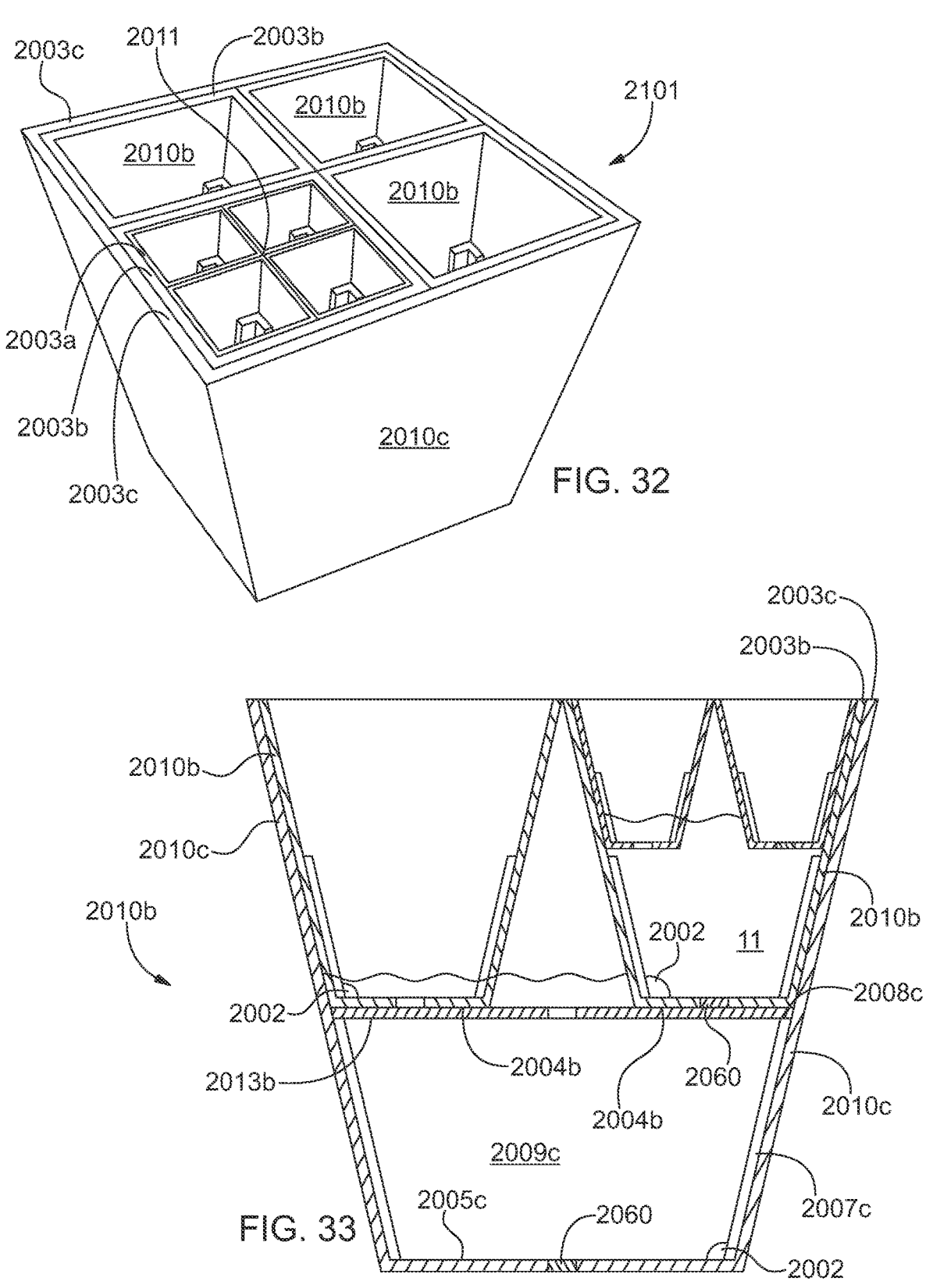
FIG. 32 is a perspective view of a fully assembled secondary square unit comprising four small square components, four medium square components and one large square component.
FIG. 33 is a sectional side view of a fully assembled secondary square unit in accordance with the exemplary embodiment of the present invention.
Figures 34, 35:
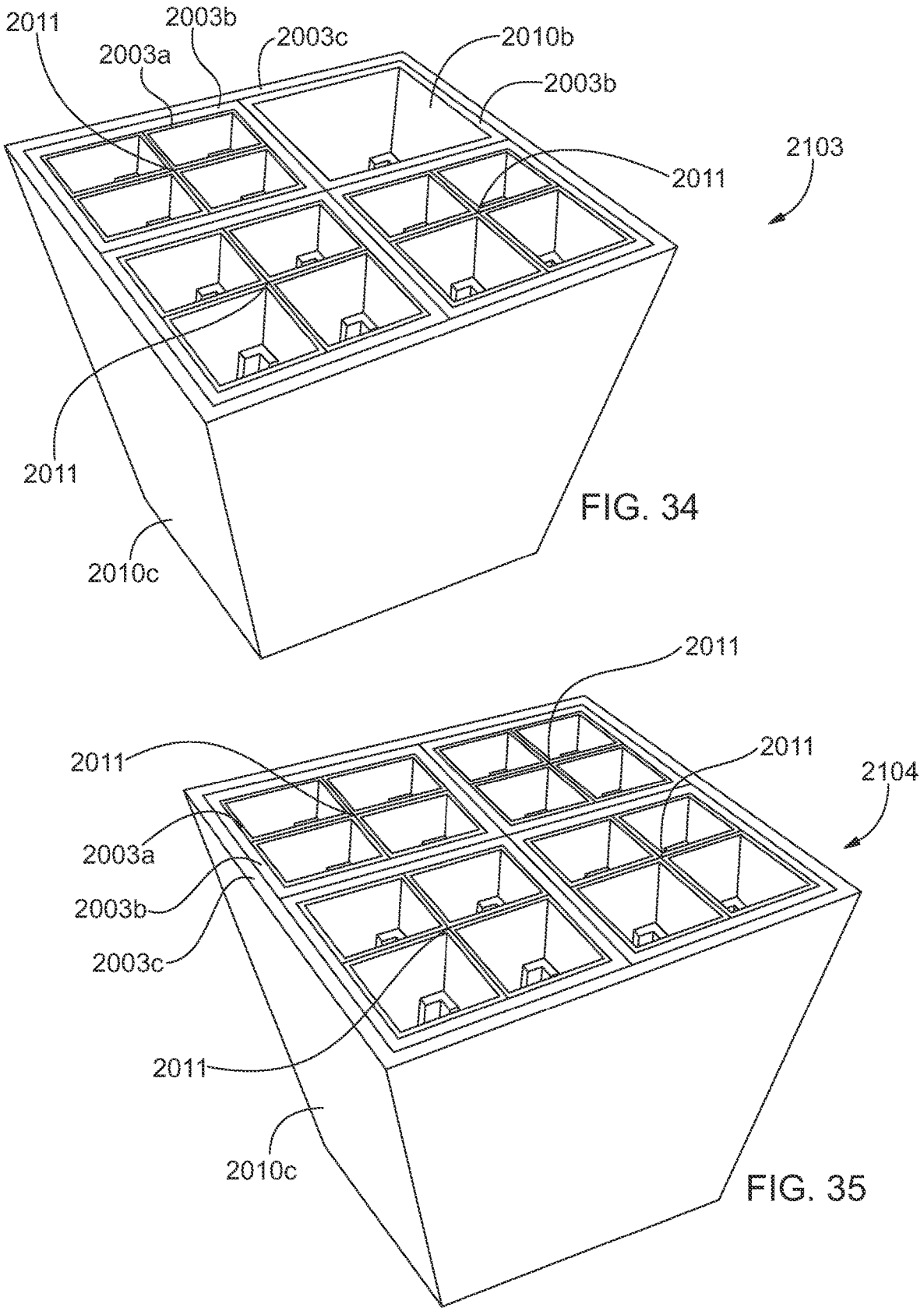
FIG. 34 is a perspective view of a fully assembled secondary square unit comprising twelve small square components, four medium square components, and one large square component.
FIG. 35 is a perspective view of a fully assembled secondary square unit comprising sixteen small square components, four medium components, and one large square component.
Figure 36:
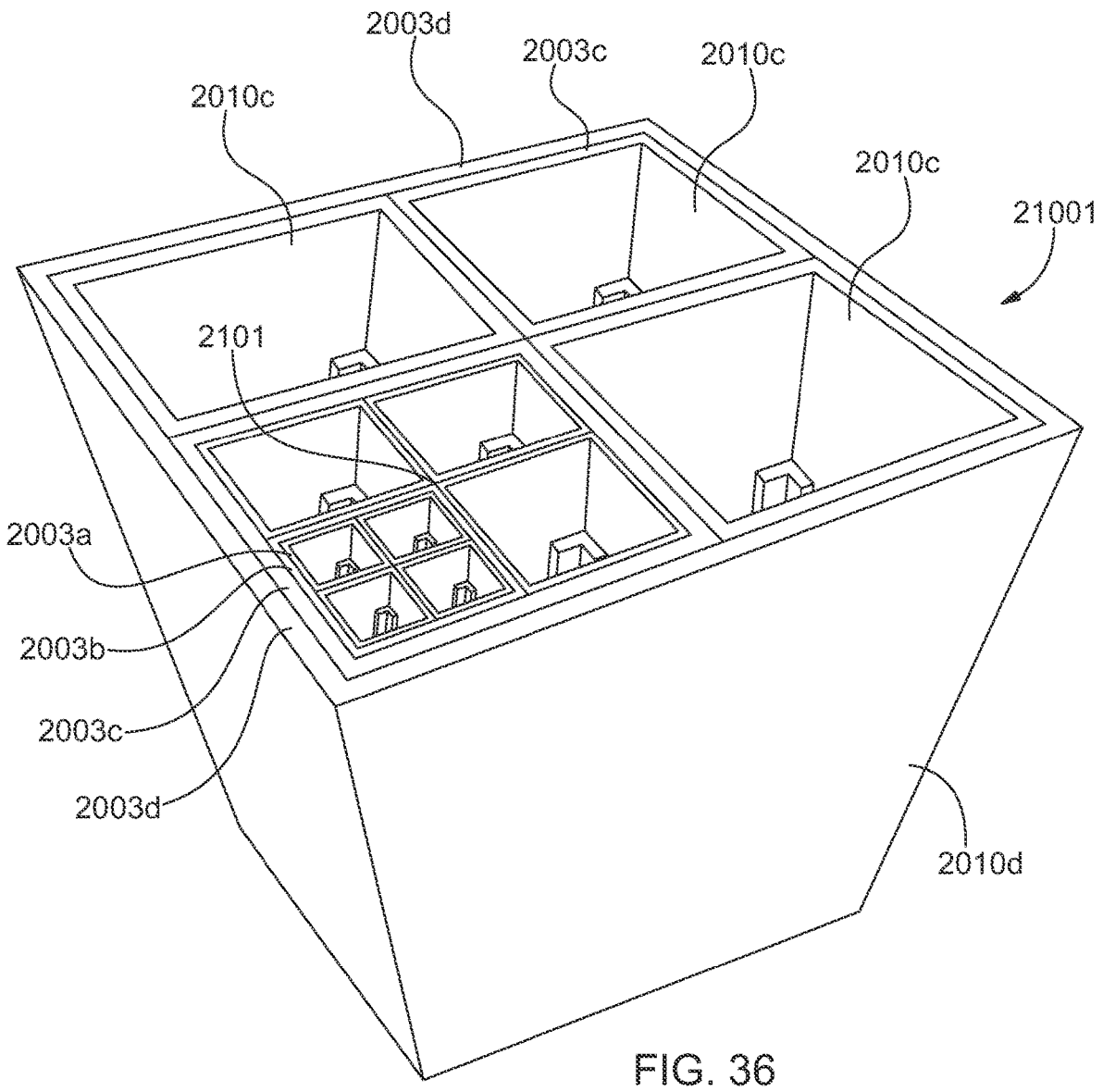
FIG. 36 is a perspective view of a fully assembled tertiary square unit comprising four small square components, four medium square components, four large square components, and one extra-large square component.

As more clearly seen in FIG. 33, the upper terminus(es) 08c of the support structure(s) 2007c within the large square component 2010c may impede the medium square components 2010b and/or primary square units 2011 from descending the interior of the outer sidewalls 2001c of the large square component 2010c by potentially contacting the bottom edges(s) 2004b of the medium square component(s) 2010b and/or the bottom edges(s) 2004b of the primary square unit(s) 2011. A tertiary reservoir 2009c may be created by removably sealing the hole 2006c with a plug 2060 within the large square component 2010c. Fluid may be exchanged between the medium square component(s) 2010b and the large square component 2010c through the unplugged hole(s) 2006b of the medium square components 2010b that are suspended above the bottom surface 2005c of the large square component 2010c. Proper sizing of the interengageable container components 2010a, 2010b, 2010c ensure flush upper edges 2003a, 2003b, 2003c and a cohesive assembly of the secondary square interengageable units 2101-2104. A square grate 2013 may be added to rest upon the upper terminus(es) 2008c of the support structure(s) 2007c and may contact the lower edge 2004b of the medium square component(s) 2010b and/or the lower edge 2004b of the primary square unit(s) 2011 and may obviate at least some of the lateral pressure.

The secondary square interengageable container units 2101-2104 may be considered complete assemblies or may be combined with other square interengageable container units 2011, 2101-2104 and/or square components 2010c to create a more complex unit, as illustrated in FIG. 36-FIG. 39. Four respective sizes of square components 2010a, 2010b, 2010c, 2010d are assembled to derive the tertiary square interengageable container units 21001-21040. A minimum of one secondary square unit 2101 nested with three large square components 2010c held within an extra-large square component 2010*d* (13 components in total) are required to complete the tertiary square unit assembly 21001, and a maximum of four secondary square units 2104 may be nested within an extra-large square component 2010*d* (eighty-five components in total) to complete a tertiary square interengageable container unit assembly 21040. The interior lengths of the outer top edges 2003*d* of the extra-large square component 2010*d* are about doubled in comparison to the exterior lengths of the of the outer top edges 2003*c* of the large square component(s) 2010*c*, the exterior lengths of the outer top edges of the primary square units 2011, and the exterior edges of the outer top edges of the secondary units 2101-2104. These measurements, in conjunction with common base angles 2002 between the square components 2010*c*, 2010*d* allow for the large square components 2010*c* and the square units 2011 and/or the secondary square units 2101-2104 to be suspended above the bottom surface 2005*d* of the extra-large square component 2010*d* by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees.

Figure 37:
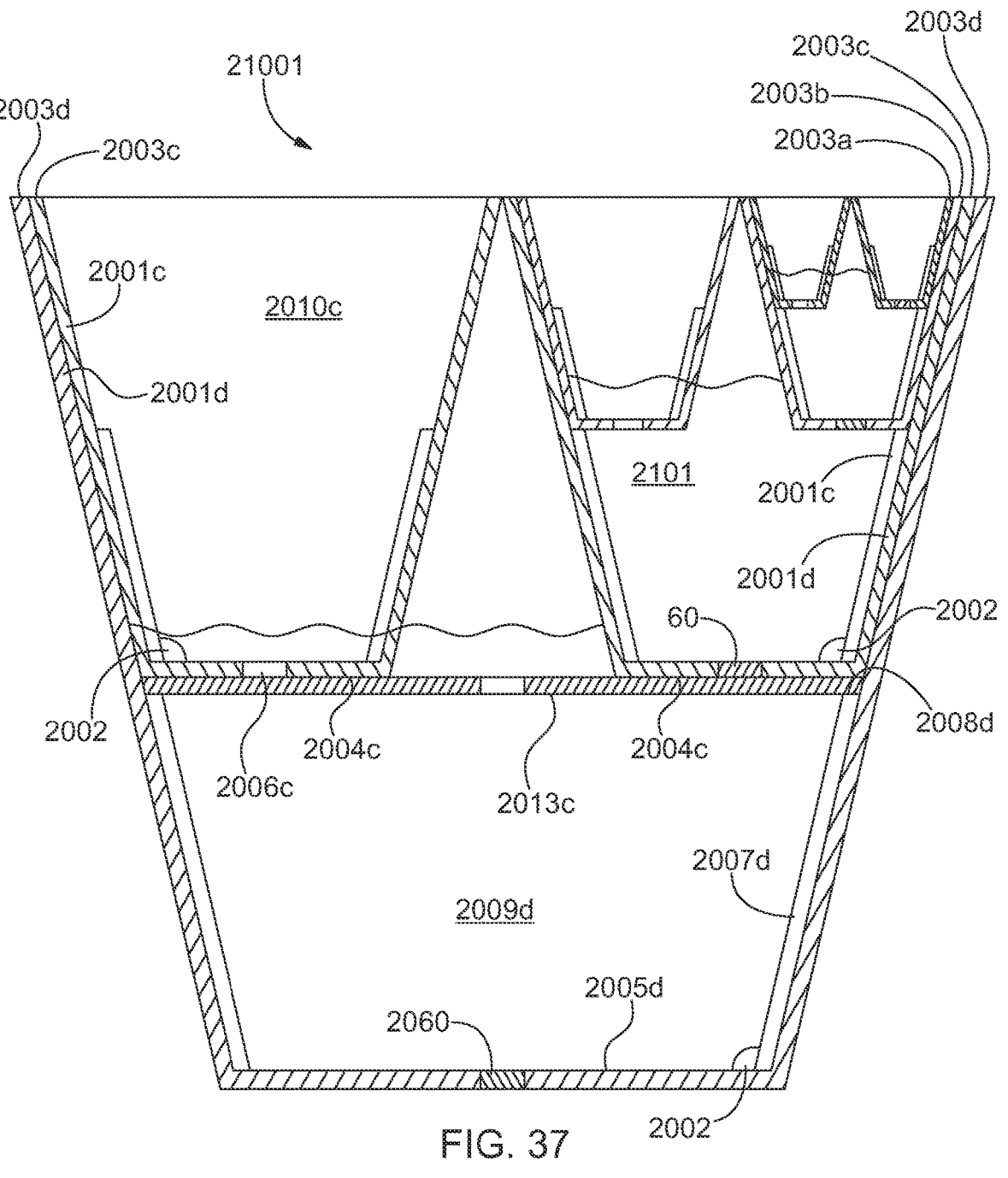
FIG. 37 is a sectional side view of a fully assembled tertiary square unit in accordance with the exemplary embodiment of the present invention.
Figure 38:
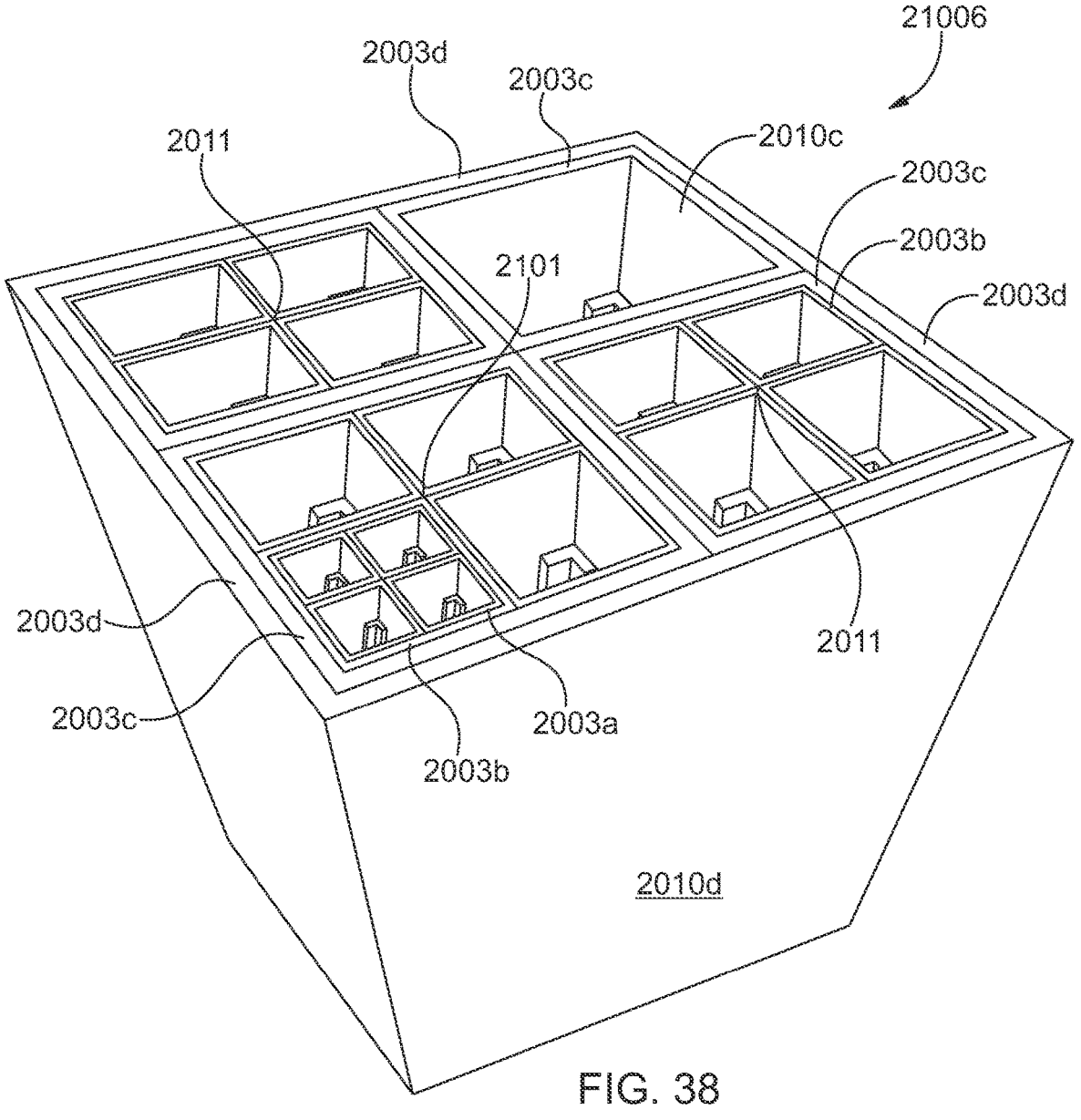
FIG. 38 is a perspective view of a fully assembled tertiary square unit comprising four small square components, twelve medium square components, four large square components, and one extra-large square component.
Figure 39:
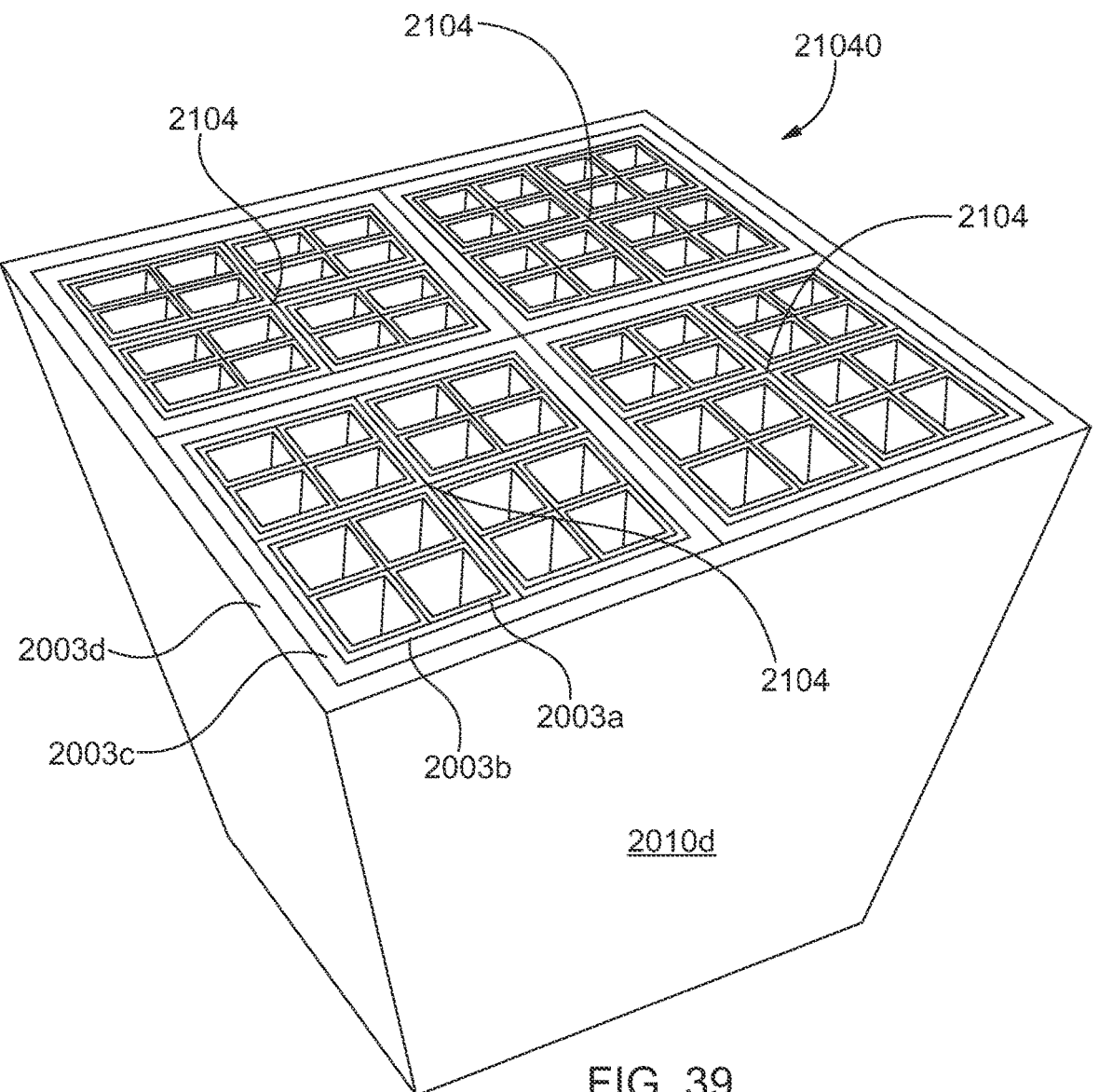
FIG. 39 is a perspective view of a fully assembled tertiary square unit comprising sixty-four small square components, sixteen medium square components, four large square components, and one extra-large square component.

As more clearly seen in FIG. 37, the upper terminus(es) 2008*d* of the support structure(s) 2007*d* within the extra-large square component 2010*d* may impede the large square component(s) 2010*c*, the primary square unit(s) 2011, and/or the secondary units 2101-2104 from descending the interior of the outer sidewalls 2001*d* of the extra-large square component 2010*d* by potentially contacting the bottom edge(s) 2004*c* of the large square components 2010*c*, the primary square units 2011 and/or the square unit(s) 2101-2104. A quaternary reservoir 2009*d* may be created by removably sealing the hole 2006*d* with a plug 2060 within the extra-large square component 2010*d*. Fluid may be exchanged between the large square components 2010*c* and the extra-large square component 2010*d* through the unplugged holes 2006*c* of the large square components 2010*c*. Sizing of the interengageable container components 2010*a*, 2010*b*, 2010*c*, 2010*d* creates flush upper edges 2003*a*, 2003*b*, 2003*c*, 2003*d* and a cohesive assembly of the tertiary square interengageable units 21001-21040. A square grate 2013 may be added to rest upon the upper terminus(es) 08*d* of the support structure(s) 2007 of the extra-large component 2010*d* and may contact the lower edge(s) 2004*c* of the medium square component(s)s, the primary unit(s) and/or the secondary square units 2101-2104 and may obviate at least some of the lateral pressure.

Figure 40:
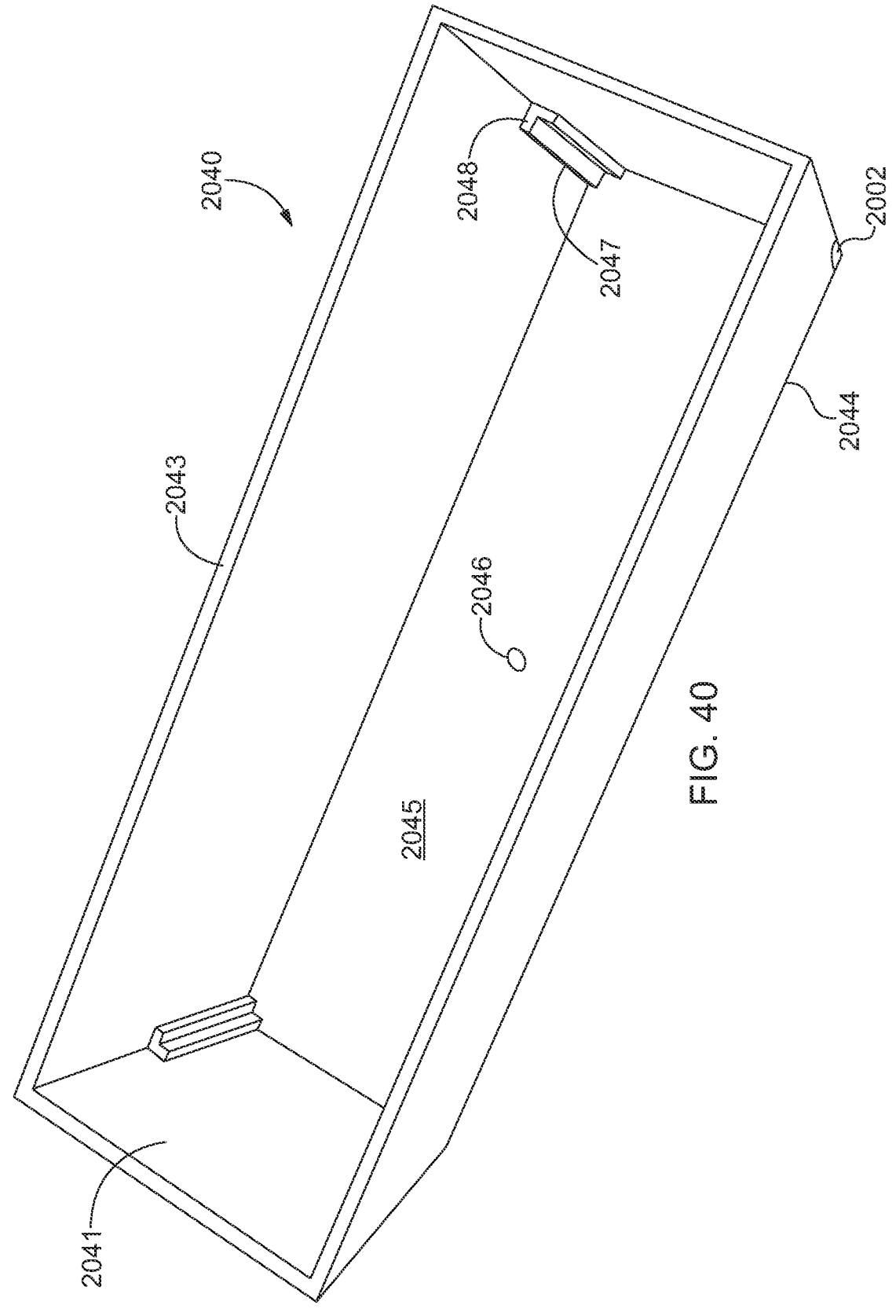
FIG. 40 is a perspective view of a rectangular interengageable container component in accordance with the exemplary embodiment of the present invention.
Figures 41, 42:
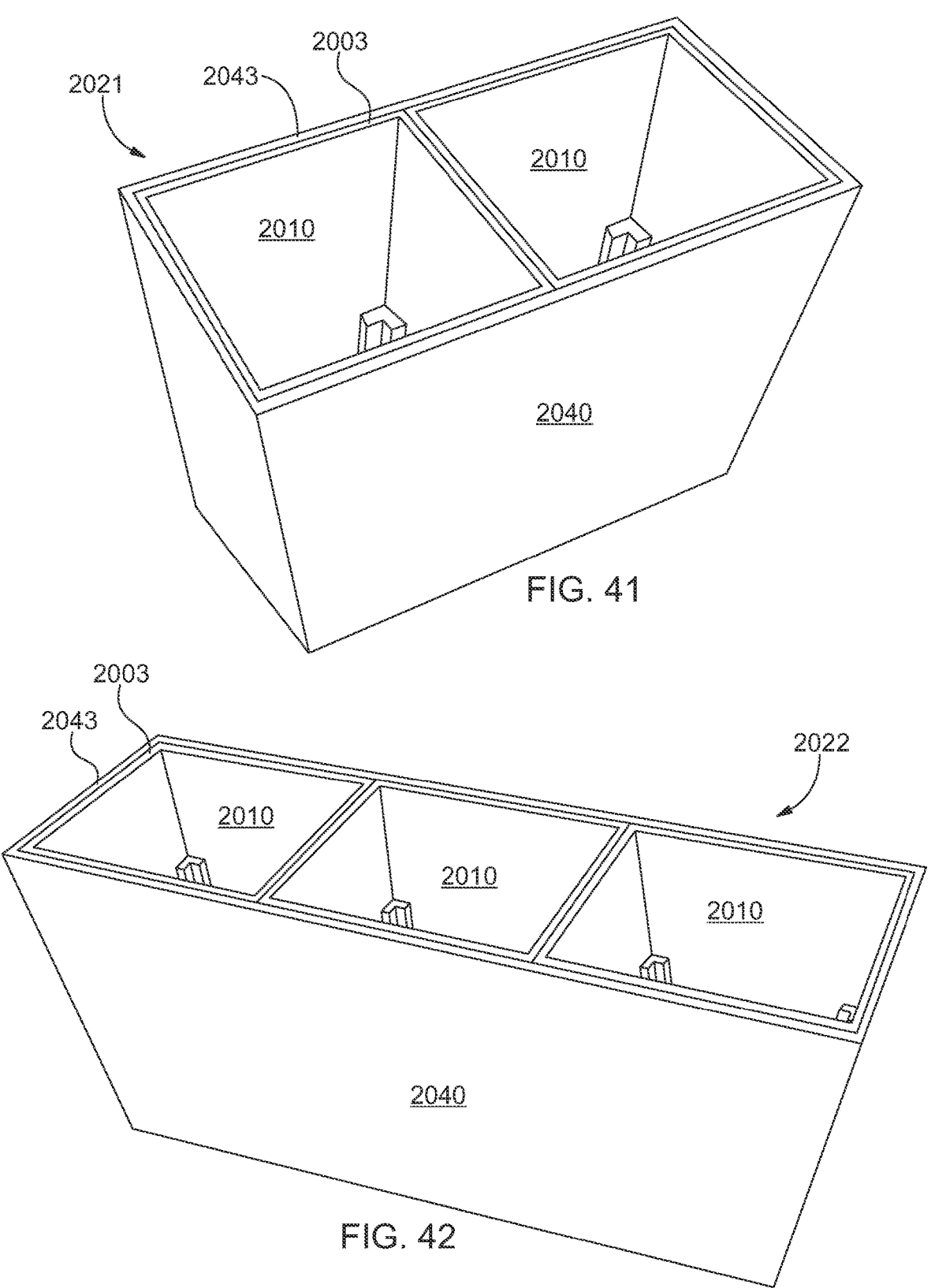
FIG. 41 is a perspective view of a fully assembled primary rectangular unit comprising two small square components and one rectangular component.
FIG. 42 is a perspective view of a fully assembled primary rectangular unit comprising three small square components and one rectangular component.
Figure 43:
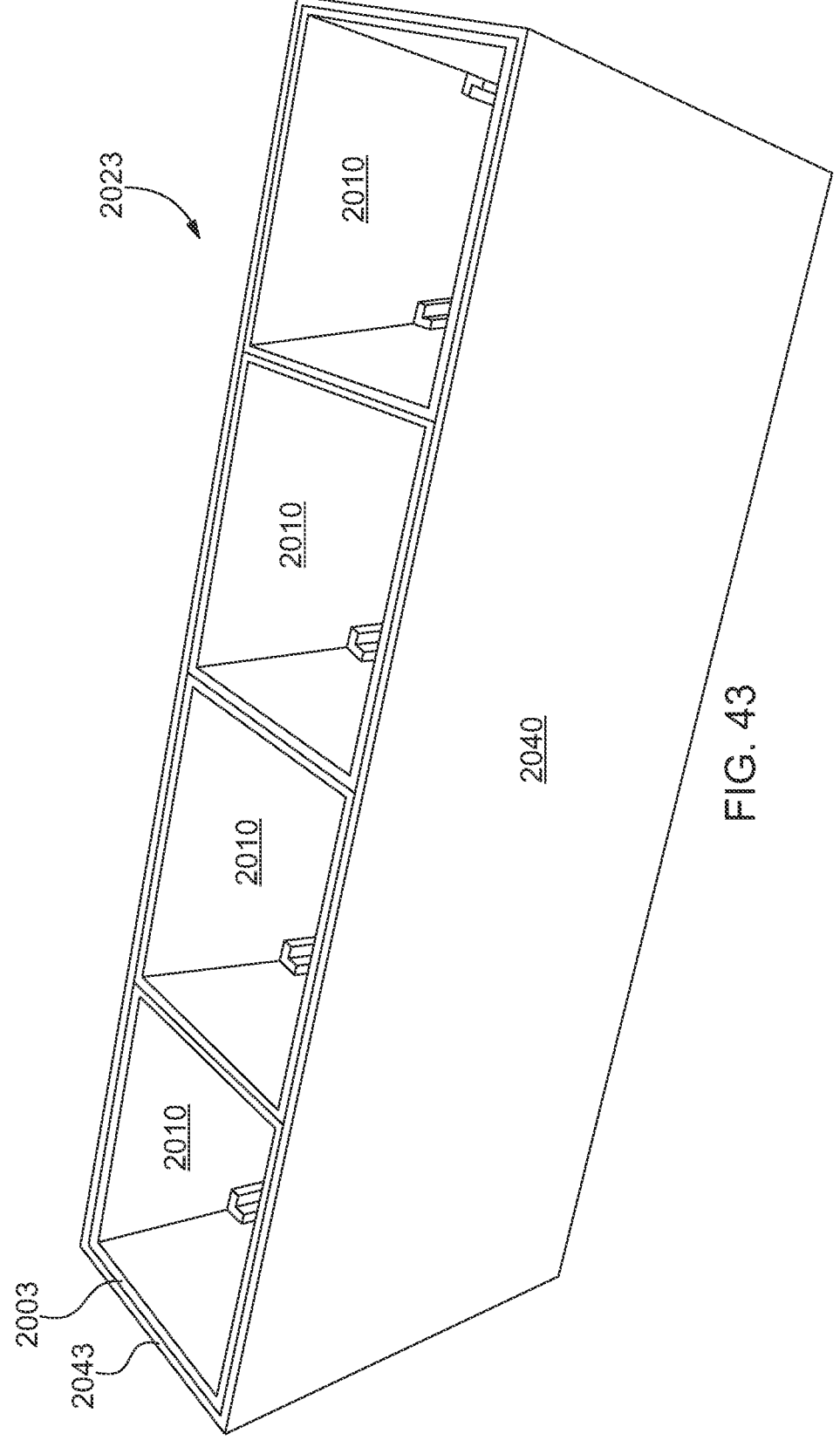
FIG. 43 is a perspective view of a fully assembled primary rectangular unit comprising four small square components and one rectangular component.
Figure 44:
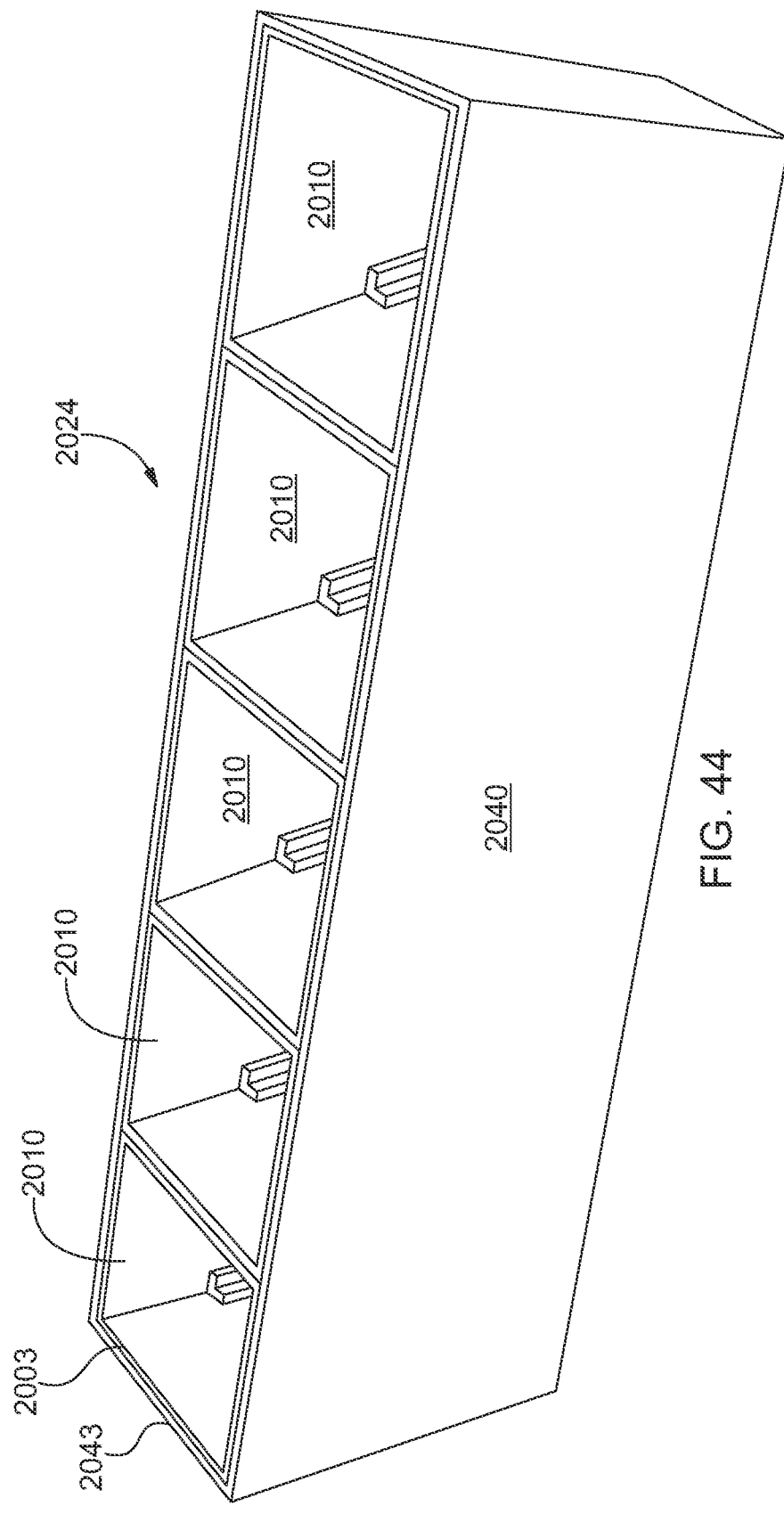
FIG. 44 is a perspective view of a fully assembled primary rectangular unit comprising five small square components and one rectangular component.

As illustrated in FIG. 40, the rectangular interengageable container component 2040 is constructed of four outer isosceles trapezoidal sidewalls 2046 that have a common base angle 2002 and a rectangular bottom surface 2045. Opposite trapezoidal sidewalls 2041 are congruent and mirror one another. To form the rectangular square component 2040, trapezoids join at the legs to derive the outer trapezoidal sidewalls 2041 and the longer base sides of the trapezoids connect perpendicularly to form outer top edges 2043. As well, the shorter base sides of the trapezoids connect perpendicularly to form the lower edges 2044 of the rectangular component 2040, and the rectangular bottom surface 2045 is joined. The rectangular interengageable container component 2040 features a support structure(s) 2047 fashioned along the interior of the sidewalls 2041 with an upper terminus(es) 2048 below the outer top edges 2043 that form fit to the bottom edge(s) 2004 of square components 2010. Additionally, a hole 2046 can be found within the bottom surface 2045 and may be removably sealed with a plug 2060 to create a reservoir 2009. The rectangular interengageable container component 2040 is not designed to disassemble.

The rectangular interengageable container component 2040 may be used independently to hold, for example, live plants or may be combined with other interengageable container components 2010 to make a complex unit, as illustrated in FIG. 41-FIG. 44. One size of the square components 10 may be assembled within a rectangular component 2040 to derive the primary rectangular interengageable container units 2021-2024. The interior lengths of the outer top edges 2043 of the rectangular component 2040 are about equal, doubled, tripled, quadrupled, or quintupled in comparison to the exterior lengths of the outer top edges 03 of the square interengageable container components 2010. These measurements, in conjunction with common base angles 2002 between the components 2010, 2040 allow for up to five small square components 2010 to be suspended above the bottom surface 2045 of the square rectangular component 2040 by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees.

Figure 45:
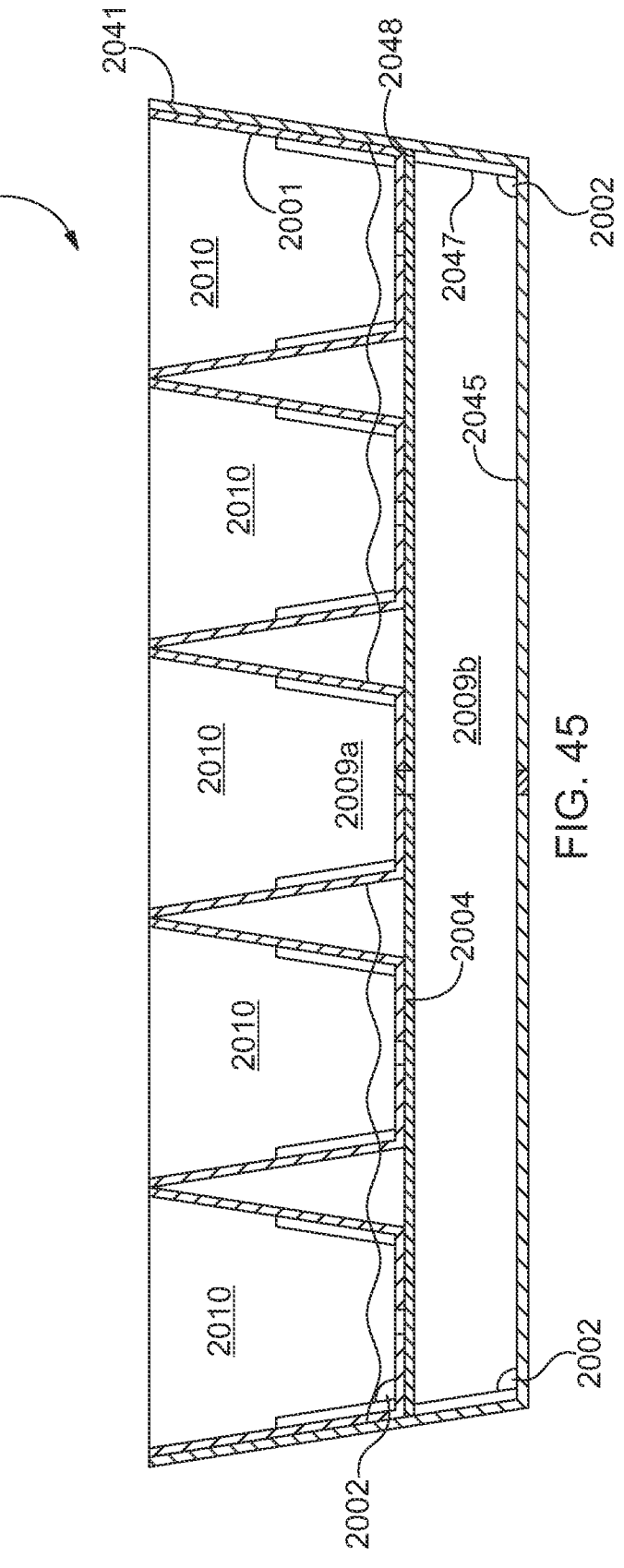
FIG. 45 is a sectional side view of a fully assembled primary rectangular unit in accordance with the exemplary embodiment of the present invention.
Figure 46:
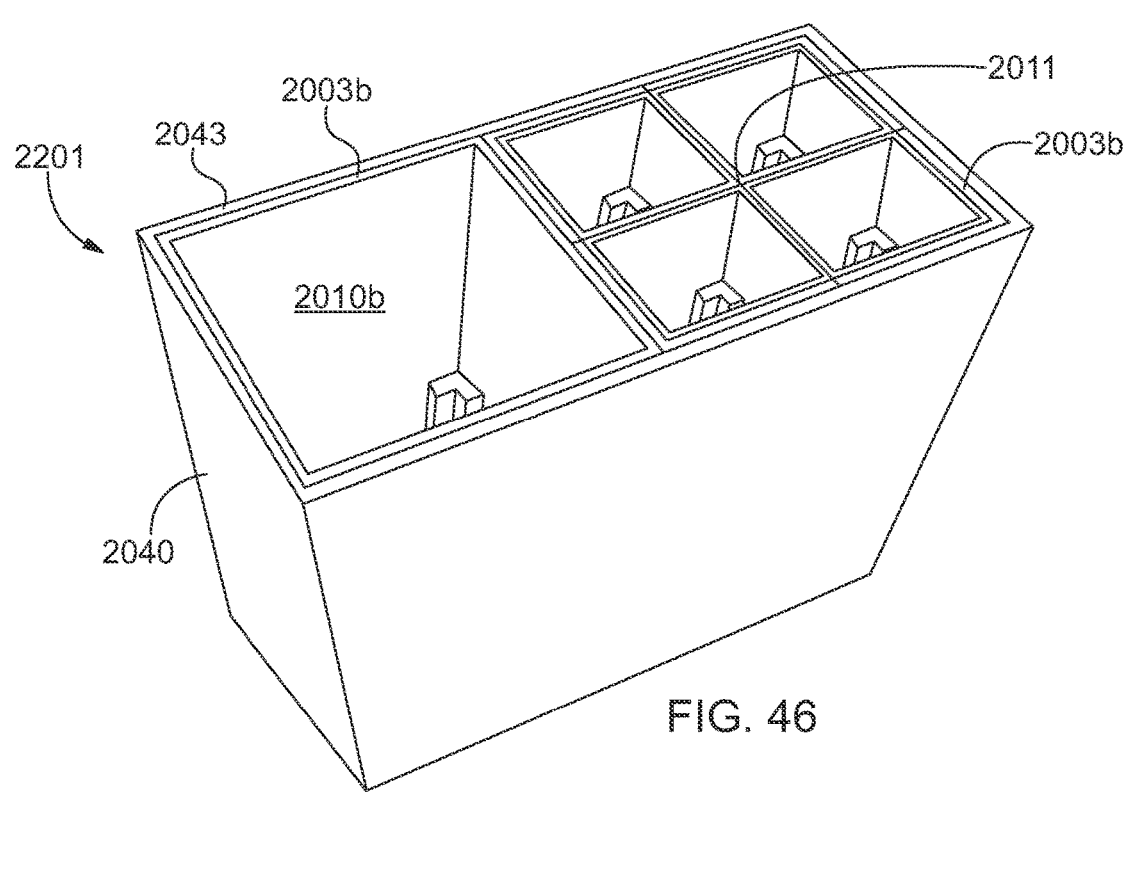
FIG. 46 is a perspective view of a fully assembled secondary rectangular unit comprising four small square components, two medium square components, and one rectangular component.
Figure 47:
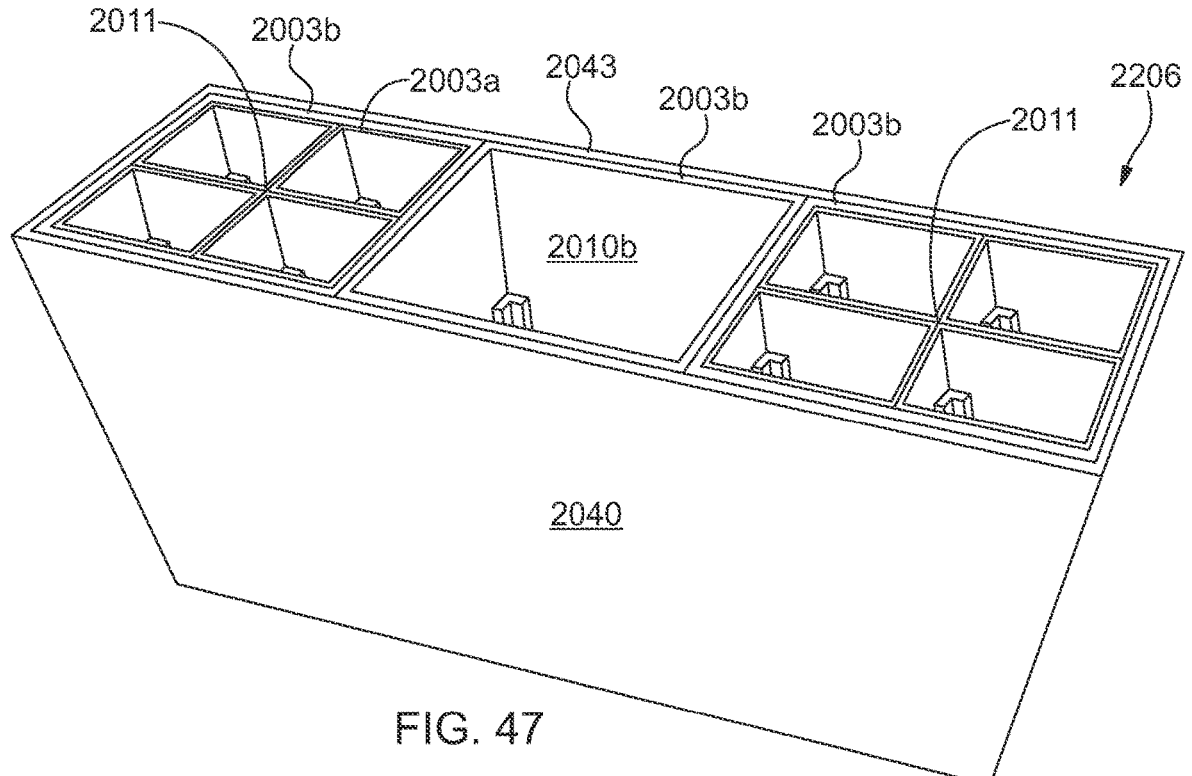
FIG. 47 is a perspective view of a fully assembled secondary rectangular unit comprising eight small square components, three medium square components, and one rectangular component.
Figure 48:
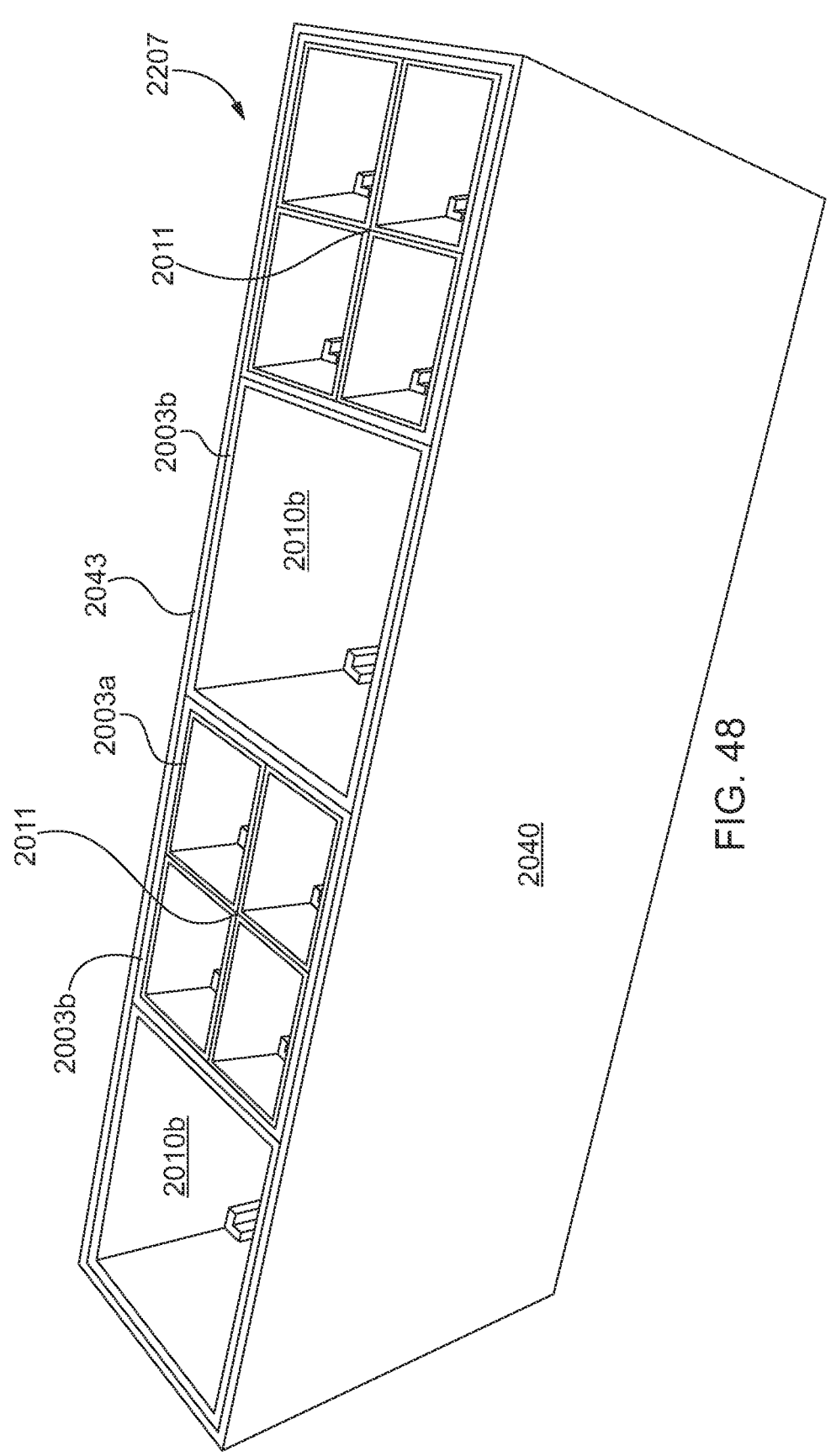
FIG. 48 is a perspective view of a fully assembled secondary rectangular unit comprising eight small square components, four medium square components, and one rectangular component.
Figure 49:
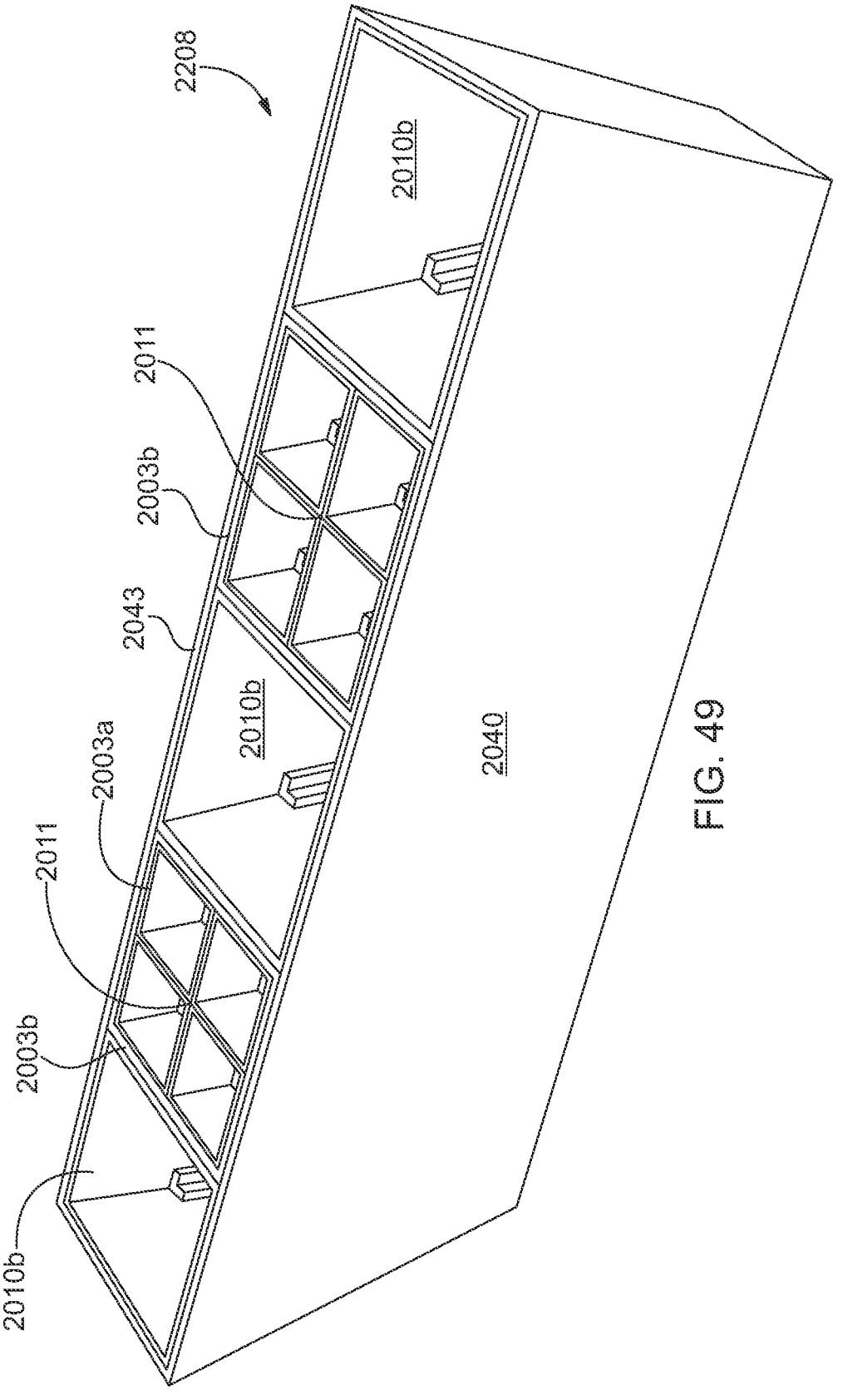
FIG. 49 is a perspective view of a fully assembled secondary rectangular unit comprising eight small square components, five medium square components, and one rectangular component.

As more clearly seen in FIG. 45, the upper terminus(es) 2048 of the support structure(s) 2047 within the rectangular component 2040 may impede the square components 2010 from descending the interior of the outer sidewalls 2046 of the rectangular component 2040 by potentially contacting the lower edge(s) 2004 of the square components 2010. A secondary reservoir 2009*b* may be created by inserting a removable plug 2060 in the hole 2046 of the rectangular component 2040. Fluid may be exchanged between the interengageable container components 2010, 2040 through the unplugged holes 2006 of the square components 2010 that are suspended above the bottom surface 2045 of the rectangular component 2040. Sizing of the interengageable container components 2010, 2040 creates flush upper edges 2003, 2043 and cohesive assemblies of the small rectangular interengageable container units 2021-2024. A rectangular grate 2033 may be added to rest upon the upper terminus(es) 2048 of the support structure(s) 2047 and may contact the lower edge(s) 2004 of the square components 2010 and may obviate at least some of the lateral pressure.

The primary square interengageable container unit 2011 may be considered a complete assembly or it may also be combined with other primary square interengageable container units 2011 and/or medium square components 2010*b* to create a more complex unit, as illustrated in FIG. 46-FIG. 51. Two respective sizes of square components 2010*a*, 2010*b* and a rectangular component 2040 are assembled to derive the secondary rectangular interengageable container units 2201-2214. A minimum of one primary square unit 2011 nested with one medium square component 2010*b* held within a rectangular component 2040 (7 components in total) are required to complete the secondary rectangular unit 2201, and a maximum of five primary square units 2011 may be nested within a rectangular component 2040 (twenty-six components in total) to complete the secondary rectangular interengageable container unit 2214. The interior lengths of the outer top edges 2043 of the rectangular component 2040 are about equal, doubled, tripled, quadrupled, or quintupled in comparison to the exterior lengths of the of the outer top edges 2003$b$ of the medium square components 2010$b$ and/or the exterior lengths of the outer top edges of the primary square units 2011. These measurements, in conjunction with common base angles 2002 between the components 2040, 2010$b$ and primary units 2011, allow for the medium square components 2010$b$ and/or primary square units 2011 to be suspended above the bottom surface 2045 of the rectangular component 2040 by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees.

Figure 50:
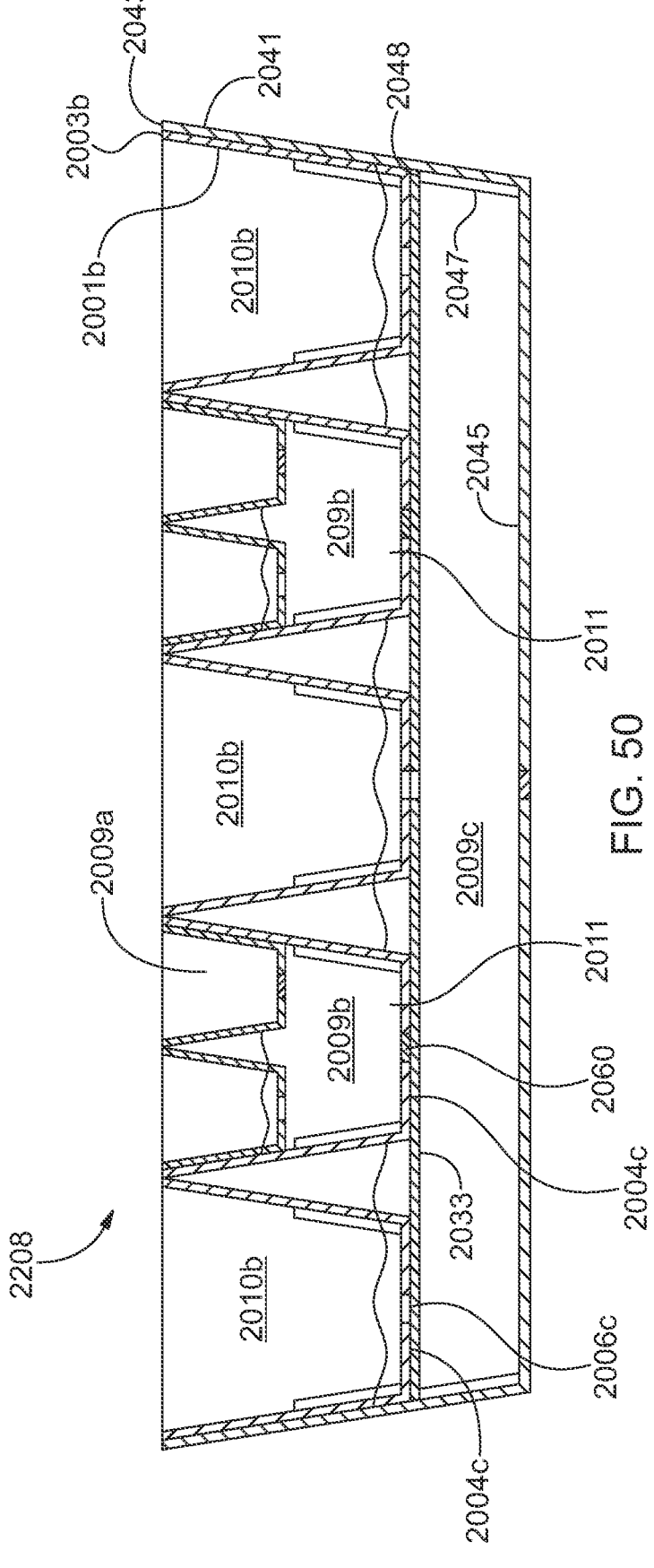
FIG. 50 is a sectional side view of a fully assembled secondary rectangular unit in accordance with the exemplary embodiment of the present invention.
Figure 51:
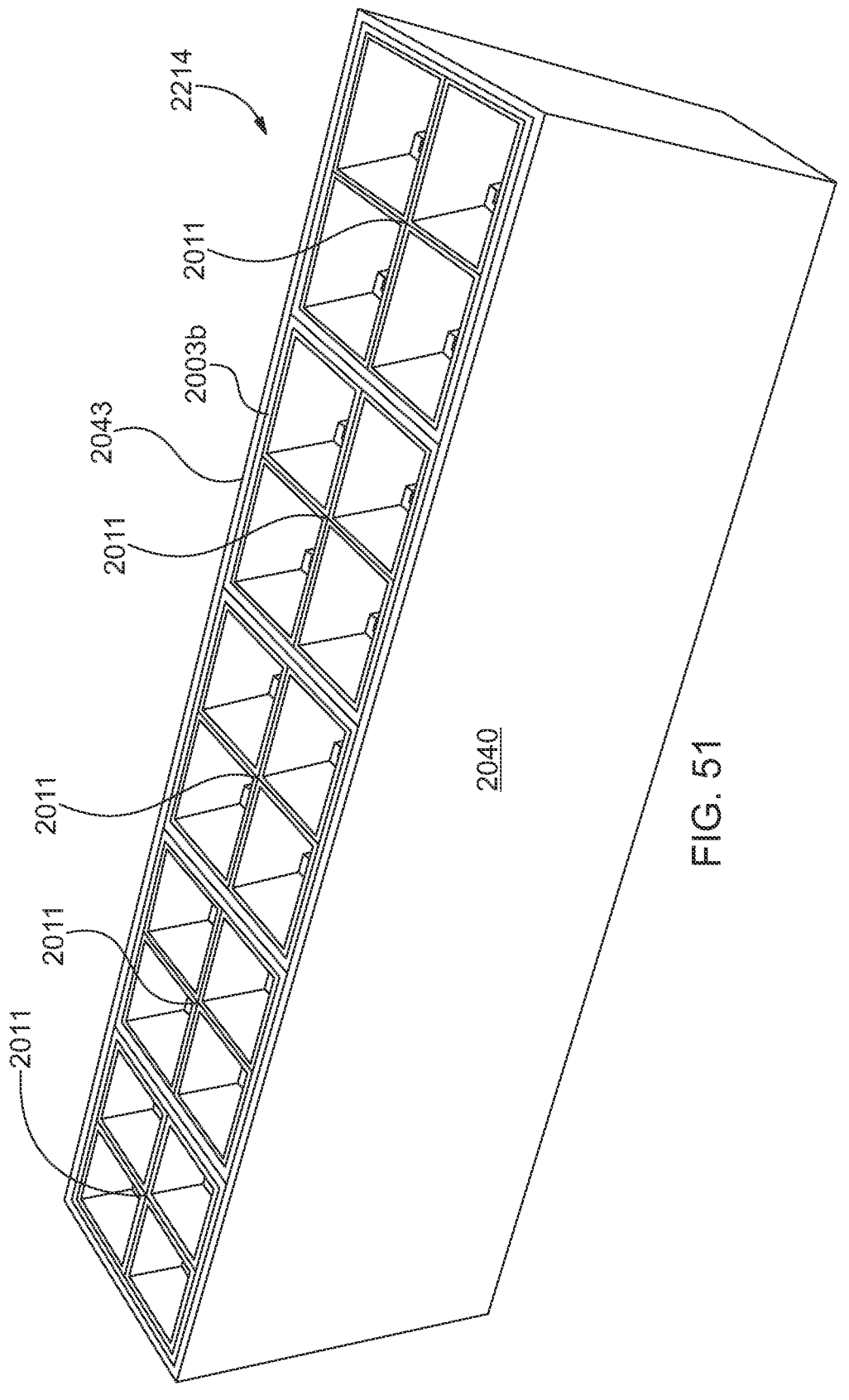
FIG. 51 is a perspective view of a fully assembled secondary rectangular unit comprising twenty small square components, five medium square components, and one rectangular component.
Figure 52:
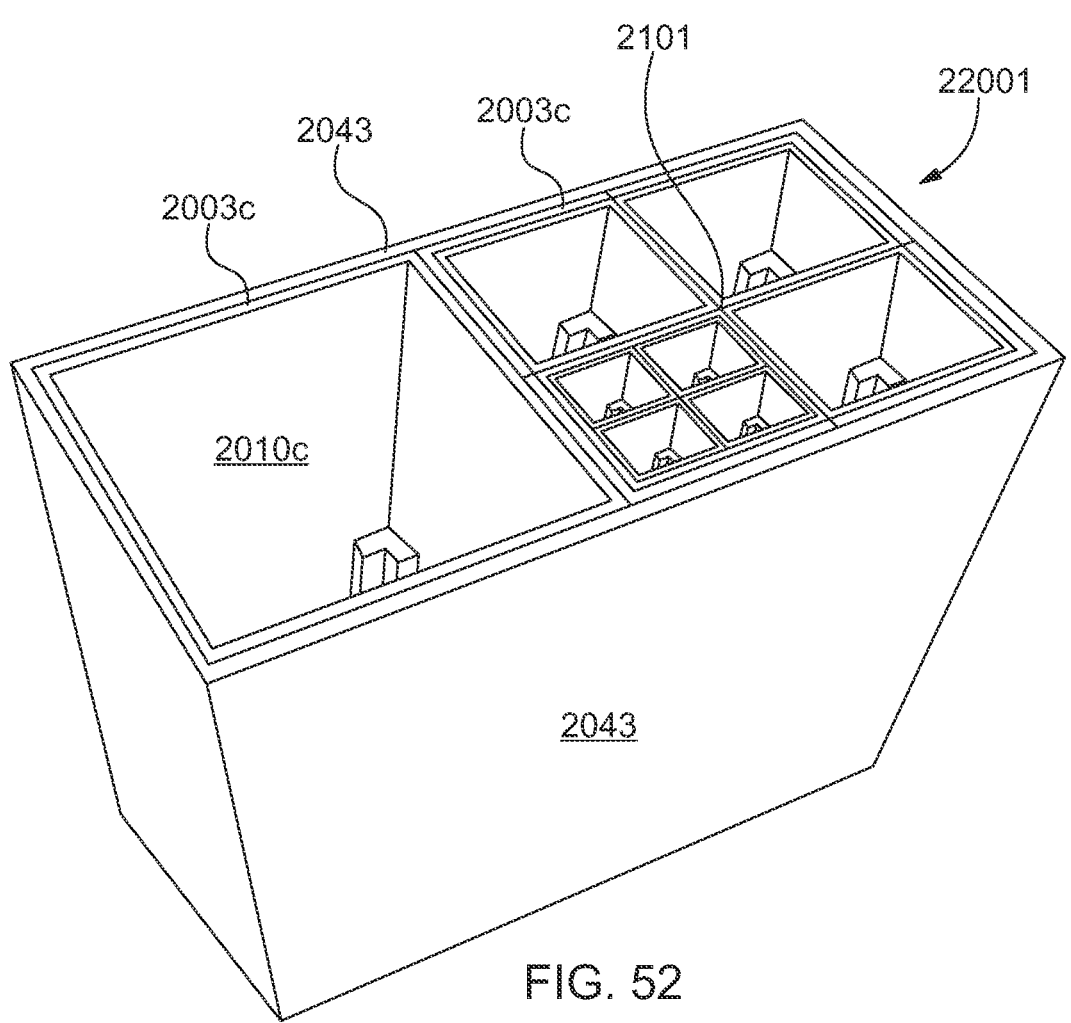
FIG. 52 is a perspective view of a fully assembled tertiary rectangular unit comprising four small square components, four medium square components, two large square components, and one rectangular component.
Figure 53:
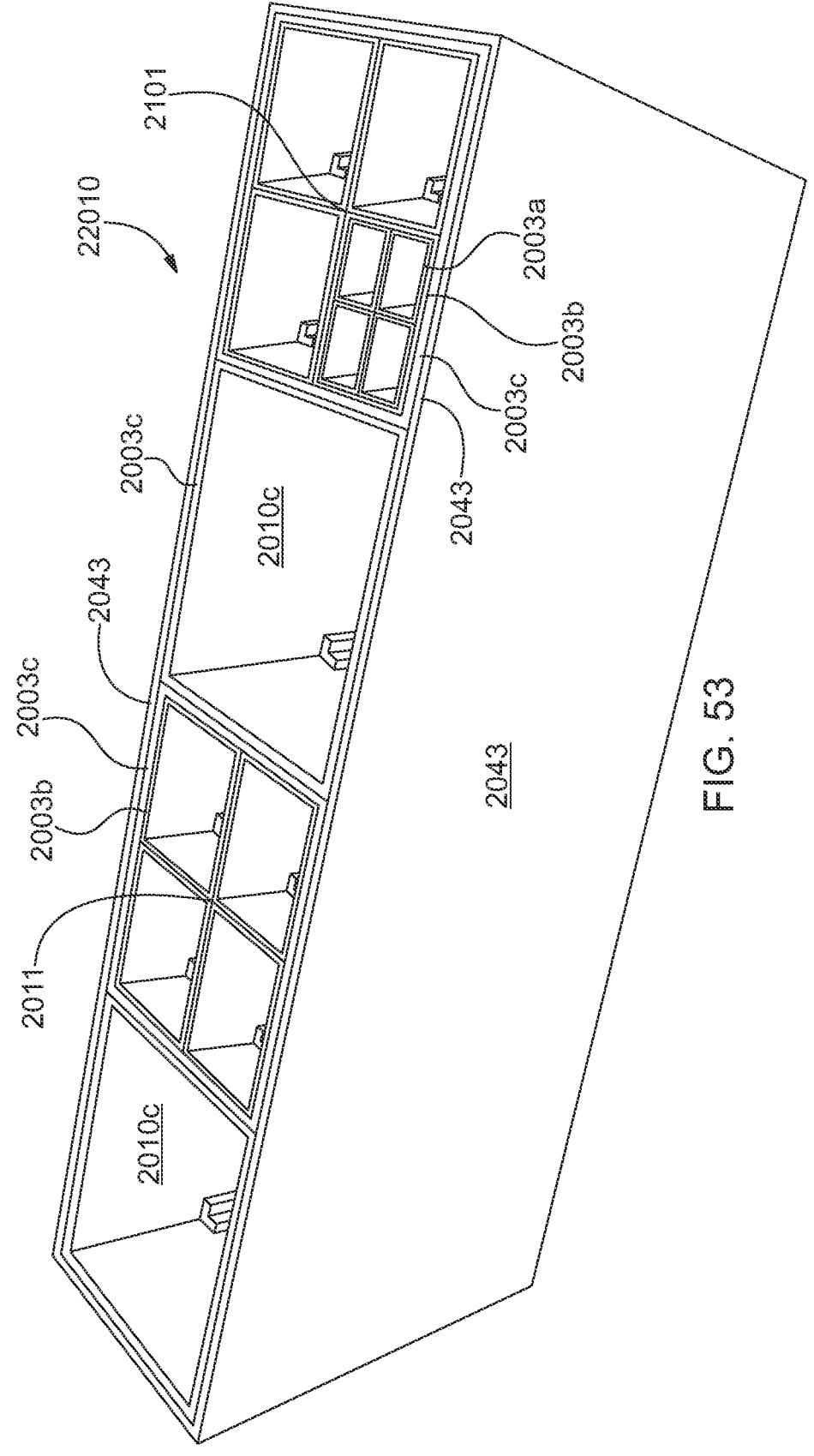
FIG. 53 is a perspective view of a fully assembled tertiary rectangular unit comprising four small square components, eight medium square components, four large square components, and one rectangular component.

As more clearly seen in FIG. 50, the upper terminus(es) 2048 of the support structure(s) 2047 within the rectangular component 2040 may impede the medium square components 2010$b$ and/or primary square units 2011 from descending the interior of the outer sidewalls 2041 of the rectangular component 2040 by potentially contacting the bottom edge(s) 2004$b$ of the medium square component(s) 2010$b$ and/or the bottom edge(s) 2004$b$ of the primary square unit(s) 2011. A tertiary reservoir 2009$c$ may be created by sealing the hole 2046 with a removable plug 2060 within the rectangular component 2040. Fluid may be exchanged between the medium square components 2010$b$ and the rectangular component 2040 through the unplugged holes 06$b$ of the medium square components 2010$b$. Sizing of the interengageable container components 2010$a$, 2010$b$, 2040 creates flush upper edges 2003$a$, 2003$b$, 2043 and a cohesive assembly of the secondary rectangular interengageable container units 2201-2214. A rectangular grate 2033 may be added to rest upon the upper terminus(es) 2048 of the support structures 2047 and may contact the lowers edge(s) 2004$b$ of the medium square component 2010$b$ and/or the lower edge(s) of the primary square unit(s) 2011 and may obviate at least some of the lateral pressure.

The secondary square interengageable container units 2101-2104 may be considered a complete assembly or they may be combined with other square units 2011, 2101-2104 and/or large square components 2010$c$ to create a more complex unit, as illustrated in FIG. 52-FIG. 56. Three respective sizes of square components 2010$a$, 2010$b$, 2010$c$ and a rectangular component 2040 are assembled to derive the tertiary rectangular interengageable container units 22001-22136. A minimum of one secondary square unit 2101 nested with one large component 2010$c$ held within a rectangular component 2040 (11 components in total) are required to complete the tertiary rectangular unit 22001, and a maximum of five secondary square units 2104 may be nested within a large rectangular component 2040 (one hundred six components in total) to complete the tertiary rectangular interengageable container unit 22136. The interior lengths of the outer top edges 2043 of the rectangular component 2040 are about equal, doubled, tripled, quadrupled, or quintupled in comparison to the exterior lengths of the of the outer top edges 2003$c$ of the large square components 2010$c$, the exterior lengths of the outer top edges 2003$c$ of the primary square units 2011, and/or the exterior lengths of the outer top edges of the secondary units 2101-2104. These measurements, in conjunction with common base angles 2002 between the components 2010$c$, 2040 and units 2011, 2101-2104 allow for the large square components 2010$c$ and the primary square unit(s) 2011 and/or the secondary square units 2101-2104 to be suspended above the bottom surface 2045 of the rectangular component 2040 by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees.

Figure 54:
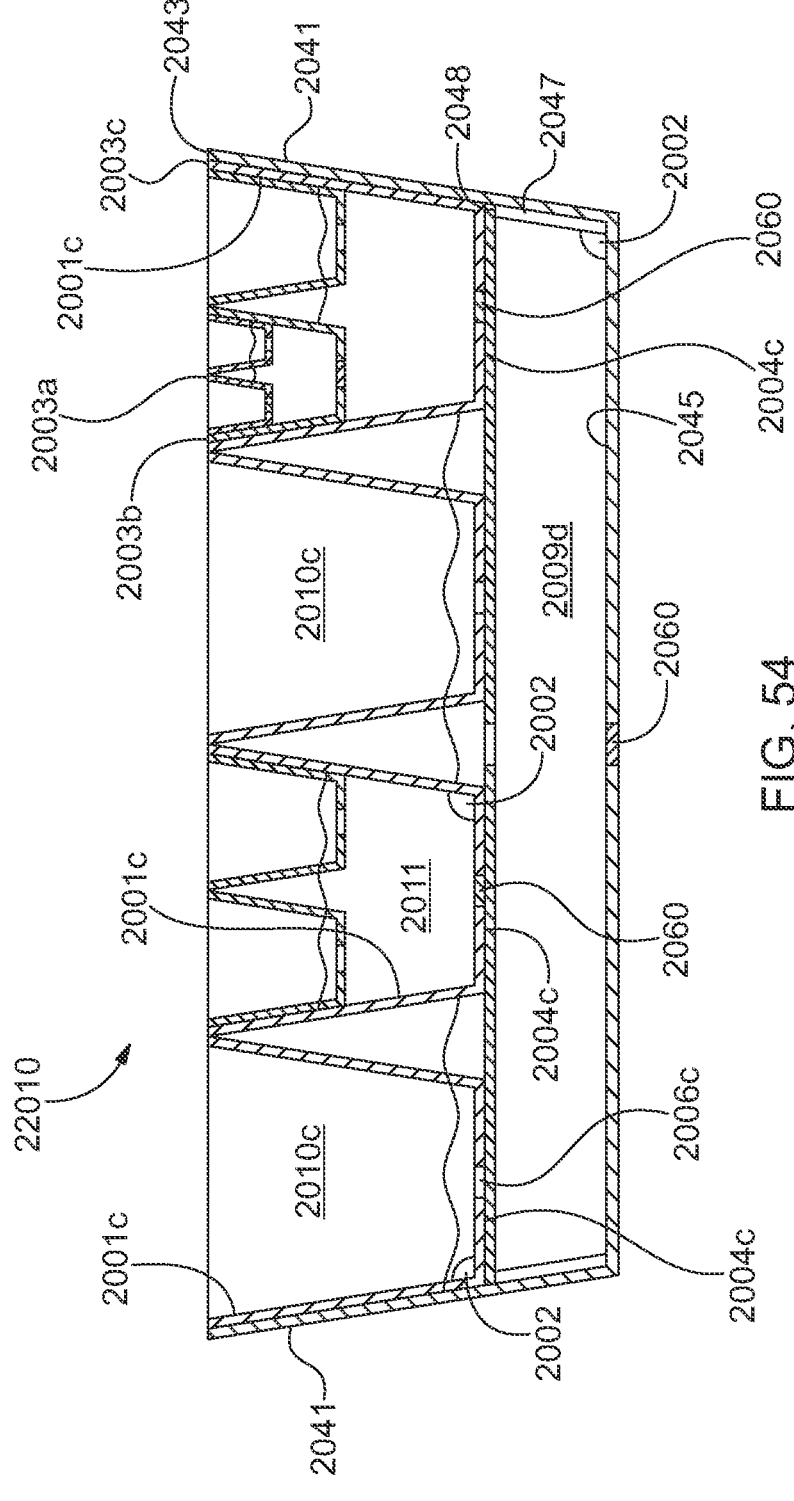
FIG. 54 is a sectional side view of a fully assembled tertiary rectangular unit in accordance with the present embodiment of the present invention.
Figure 55:
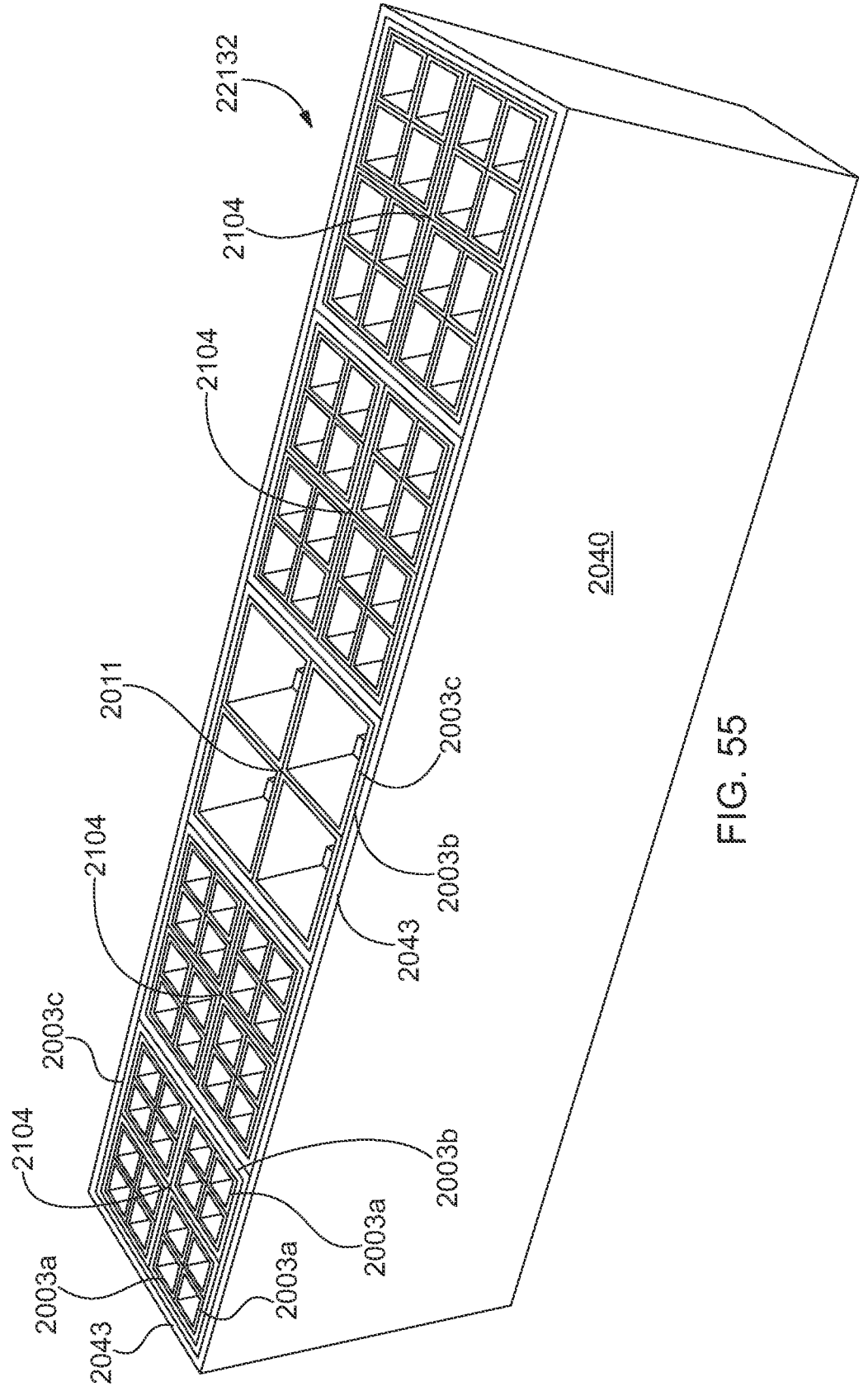
FIG. 55 is a perspective view of a fully assembled tertiary rectangular unit comprising sixty-four small square components, twenty medium square components, five large square components, and one rectangular component.
Figure 56:
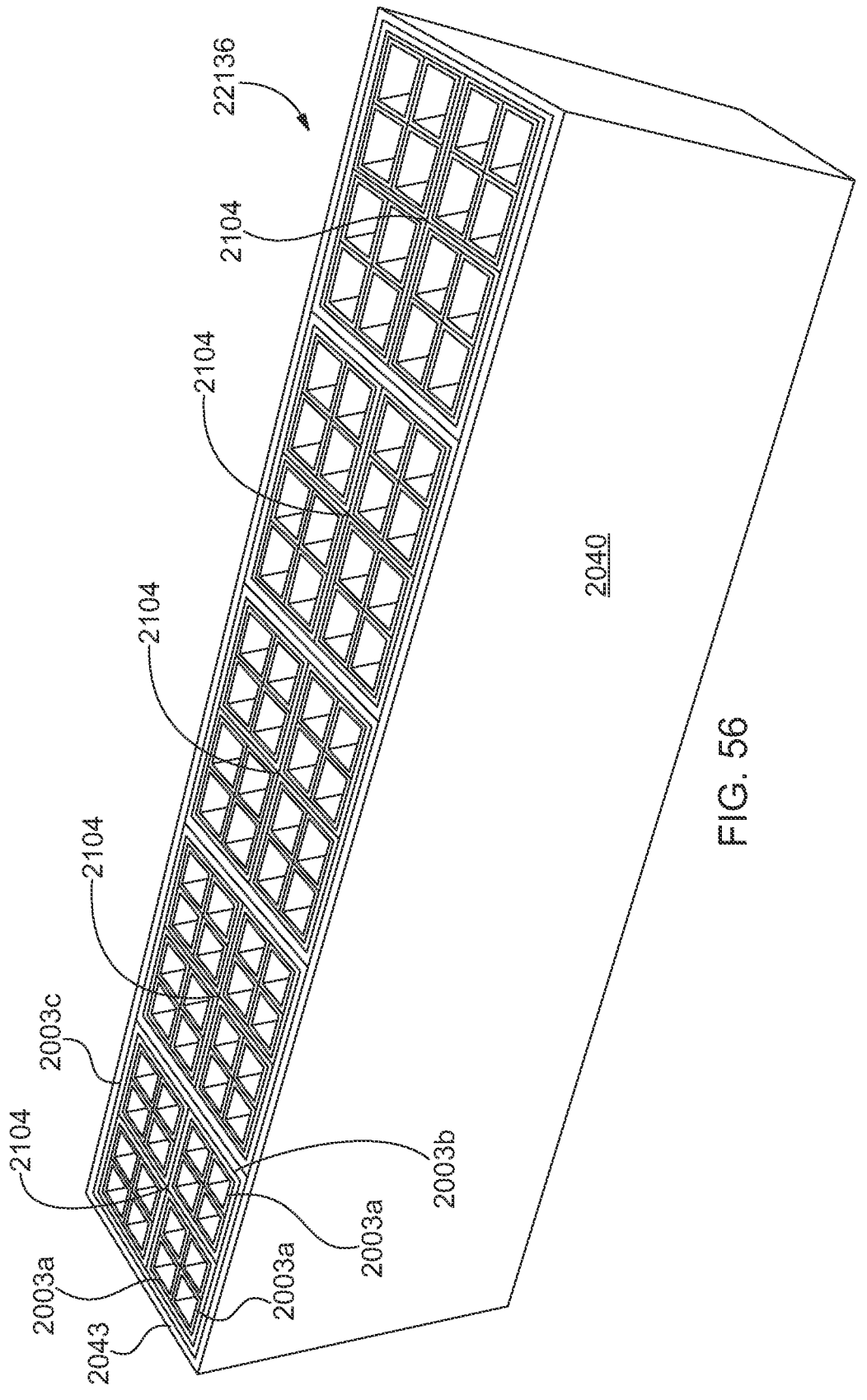
FIG. 56 is a perspective view of a fully assembled tertiary rectangular unit comprising eighty small square components, twenty medium square components, five large square components, and one rectangular component.

As more clearly seen in FIG. 54, in some embodiments the upper terminus(es) 2048 of the support structure(s) 2047 within the rectangular component 2040 may impede the large square component(s) 2010$c$, primary square component(s) 2011 and/or secondary square units 2101-2104 from descending the interior of the outer sidewalls 2041 of the rectangular component 2040 by potentially contacting the bottom edge(s) 2004$c$ of the large square components 2010$c$ and the square unit(s) 2011 and/or the secondary square units 2101-2104. A quaternary reservoir 2009$d$ may be created by sealing the hole 2046 with a removable plug 2060 within the rectangular component 2040. Fluid may be exchanged between the large square components 2010$c$ and the rectangular component 2040 through the unplugged holes 2006$c$ of the large square components 2010$c$. Sizing of the interengageable container components 2010$a$, 2010$b$, 2010$c$, 2040 create flush upper edges 2003$a$, 2003$b$, 2003$c$, 2043 and a cohesive assembly of the tertiary rectangular interengageable units 22001-22136. In some embodiments, a rectangular grate 2033 may be added to rest upon the upper terminus(es) 2048 of the support structure(s) 2047 and may obviate at least some of the lateral pressure.

Figure 57:
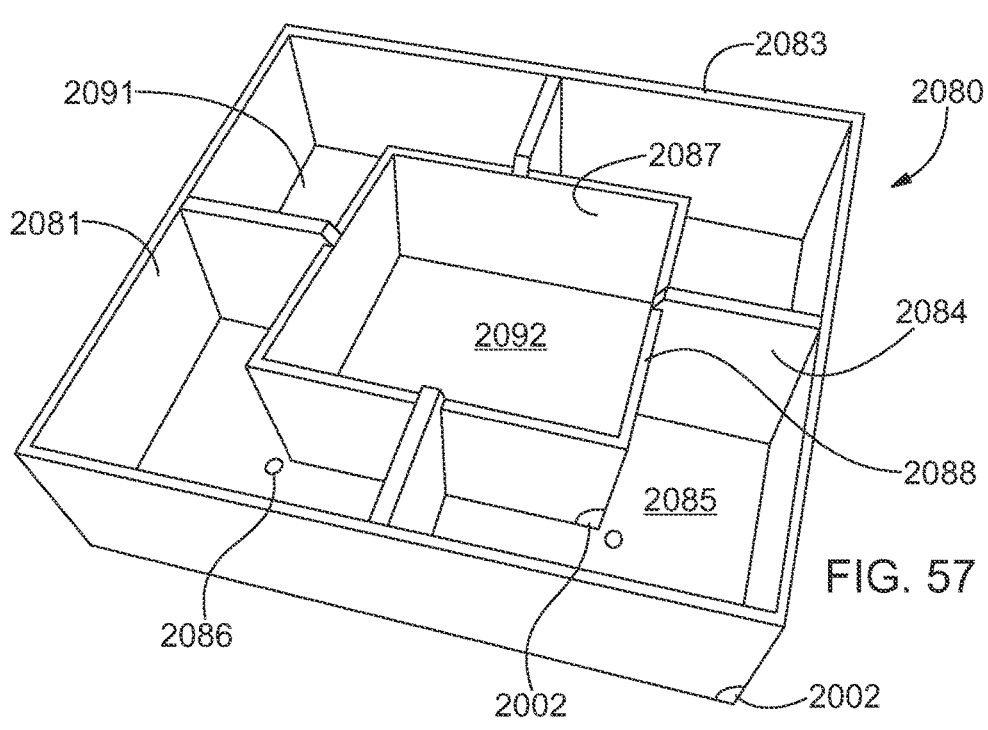
FIG. 57 is a perspective view of a supplemental interengageable container component in accordance with the exemplary embodiment of the present invention.

As illustrated in FIG. 57, the supplemental component 2080 is constructed of four outer isosceles trapezoidal sidewalls 2081 with a common base angle 2002, and a square bottom surface 2085. Trapezoids join at the legs to form outer trapezoidal sidewalls 2081 while the longer base sides of the trapezoids connect perpendicularly to form the outer top edges 2083 of the supplemental component 2080. Opposite outer trapezoidal sidewalls 2081 are congruent and mirror one another. The supplemental component 2080 also features four inner trapezoidal sidewalls 2087 with a common base angle 2002 and four spacing walls 2084 that define four separate chambers 2091 with four respective holes 2086. Additionally, the bottom surface is absent between the inner sidewalls 2087, creating an inner cradle 2092 in which a medium component 2010$b$ may nest. The supplementary interengageable container component 2080 is not designed to be disassembled.

Figure 58:
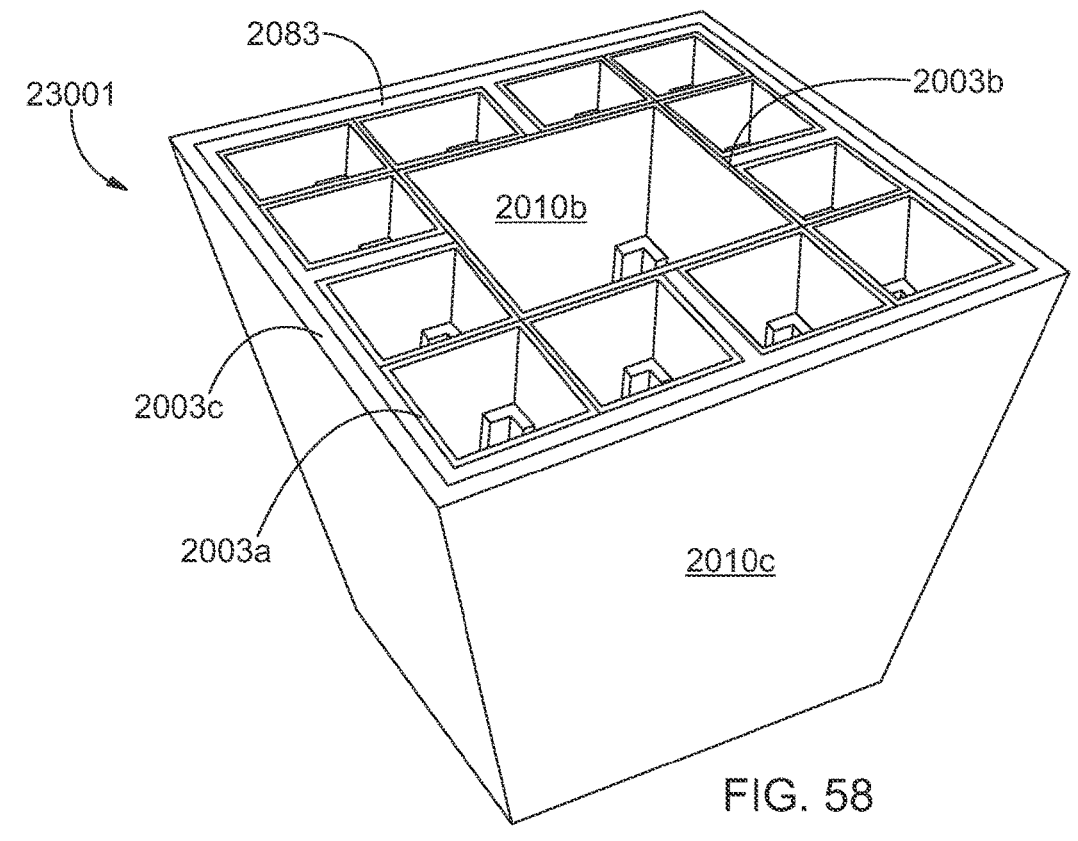
FIG. 58 is a perspective view of a fully assembled alternative secondary square unit in accordance with the exemplary embodiment of the present invention.
Figure 59:
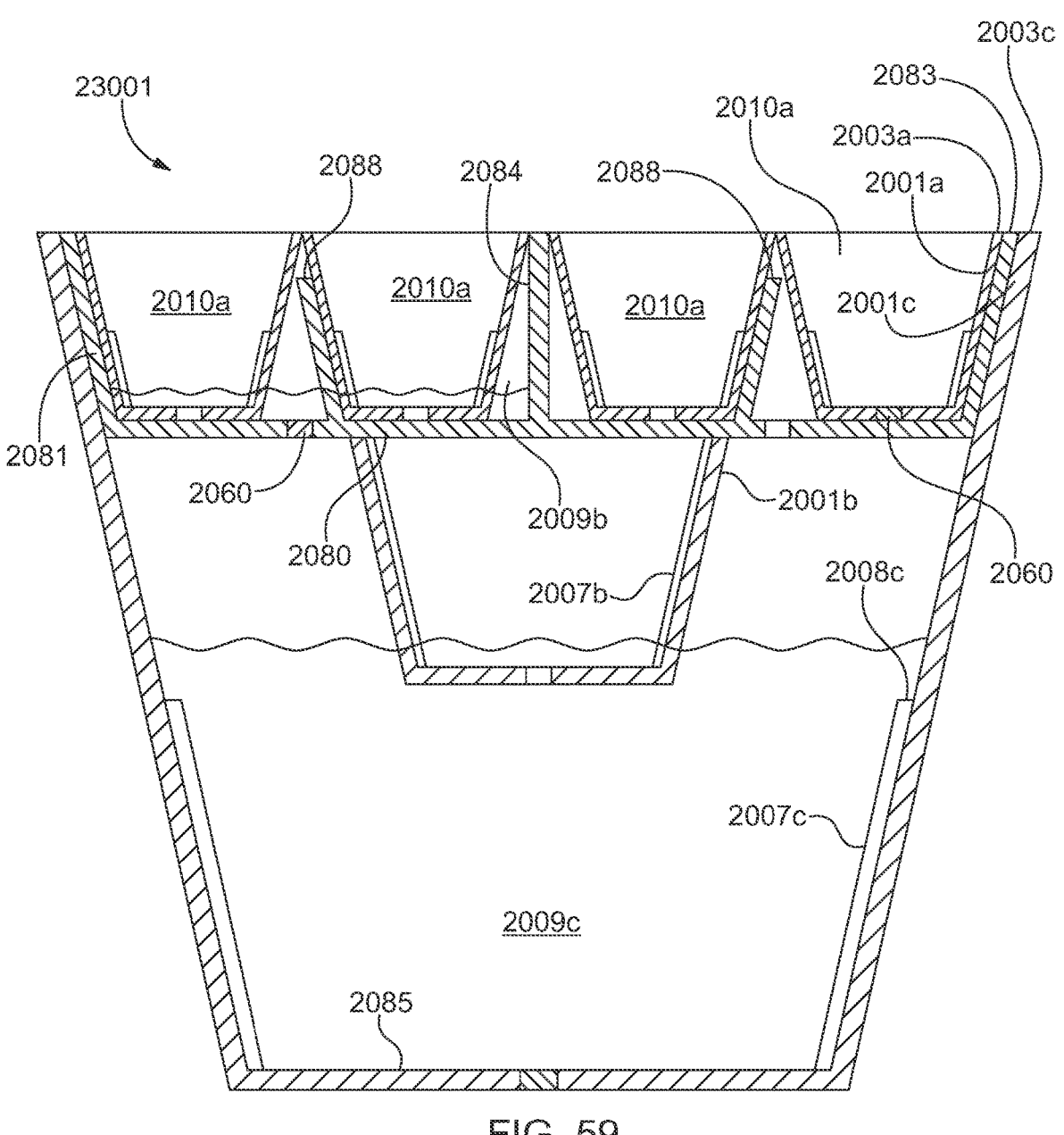
FIG. 59 is a sectional side view of a fully assembled alternative secondary square unit in accordance with the exemplary embodiment of the present invention.
Figure 60:
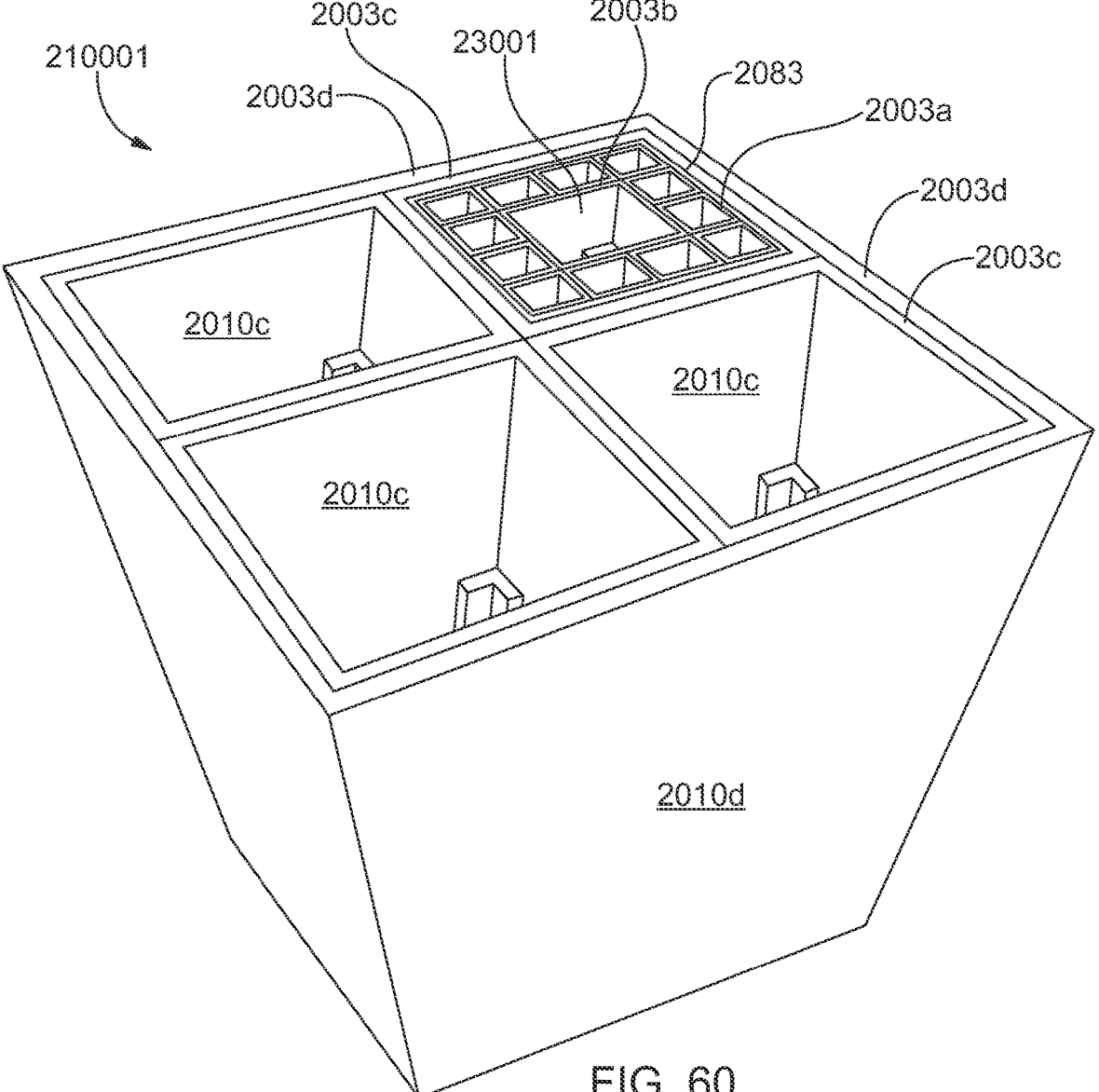
FIG. 60 is a perspective view of a fully assembled alternative tertiary square unit comprising sixteen small square components, one medium square component, four large square components, one extra-large square component, and one supplemental component.
Figure 61:
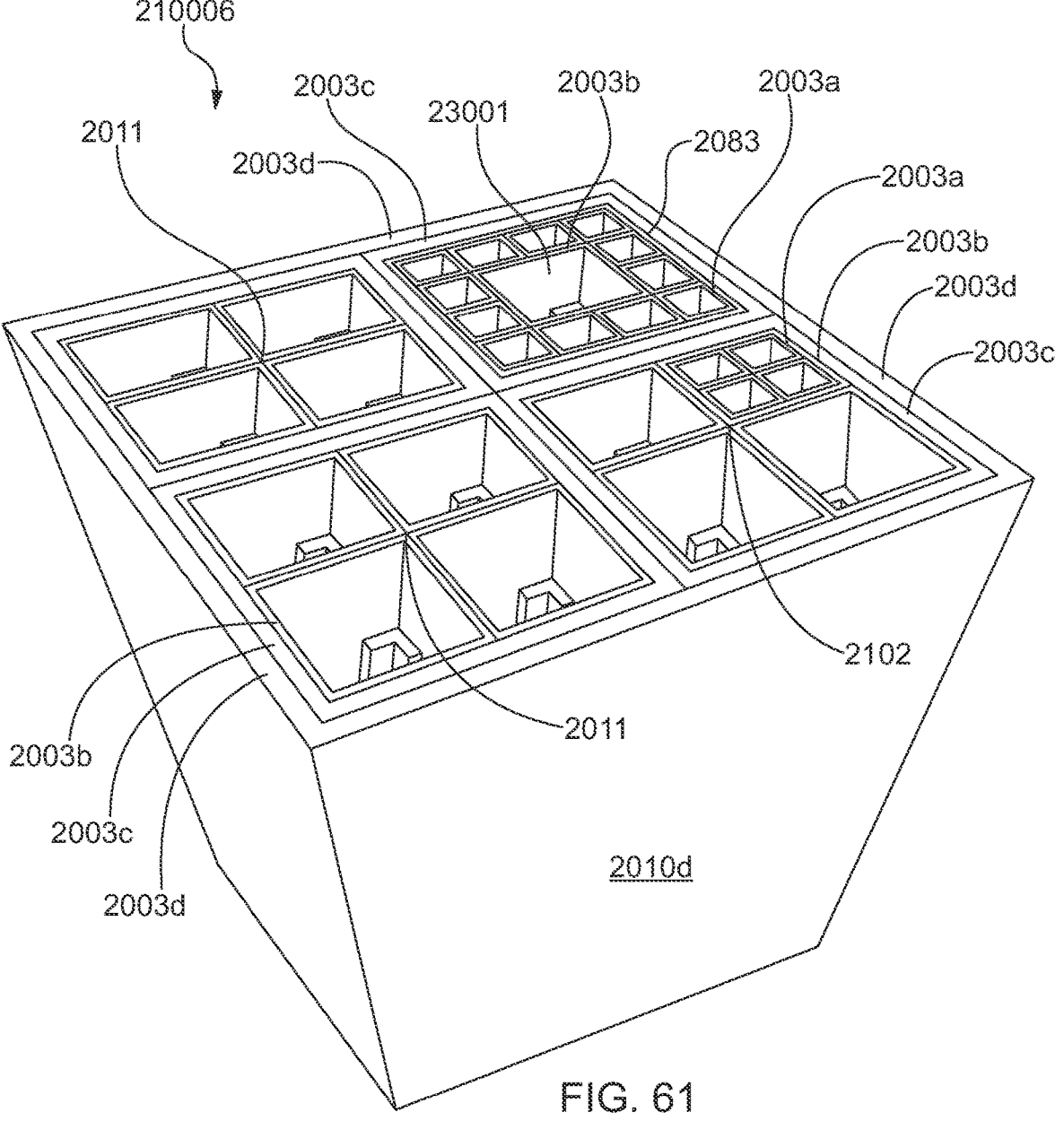
FIG. 61 is a perspective view of a fully assembled alternative tertiary square unit comprising sixteen small square components, thirteen medium square components, four large square components, one extra-large square component, and one supplemental component.
Figure 62:
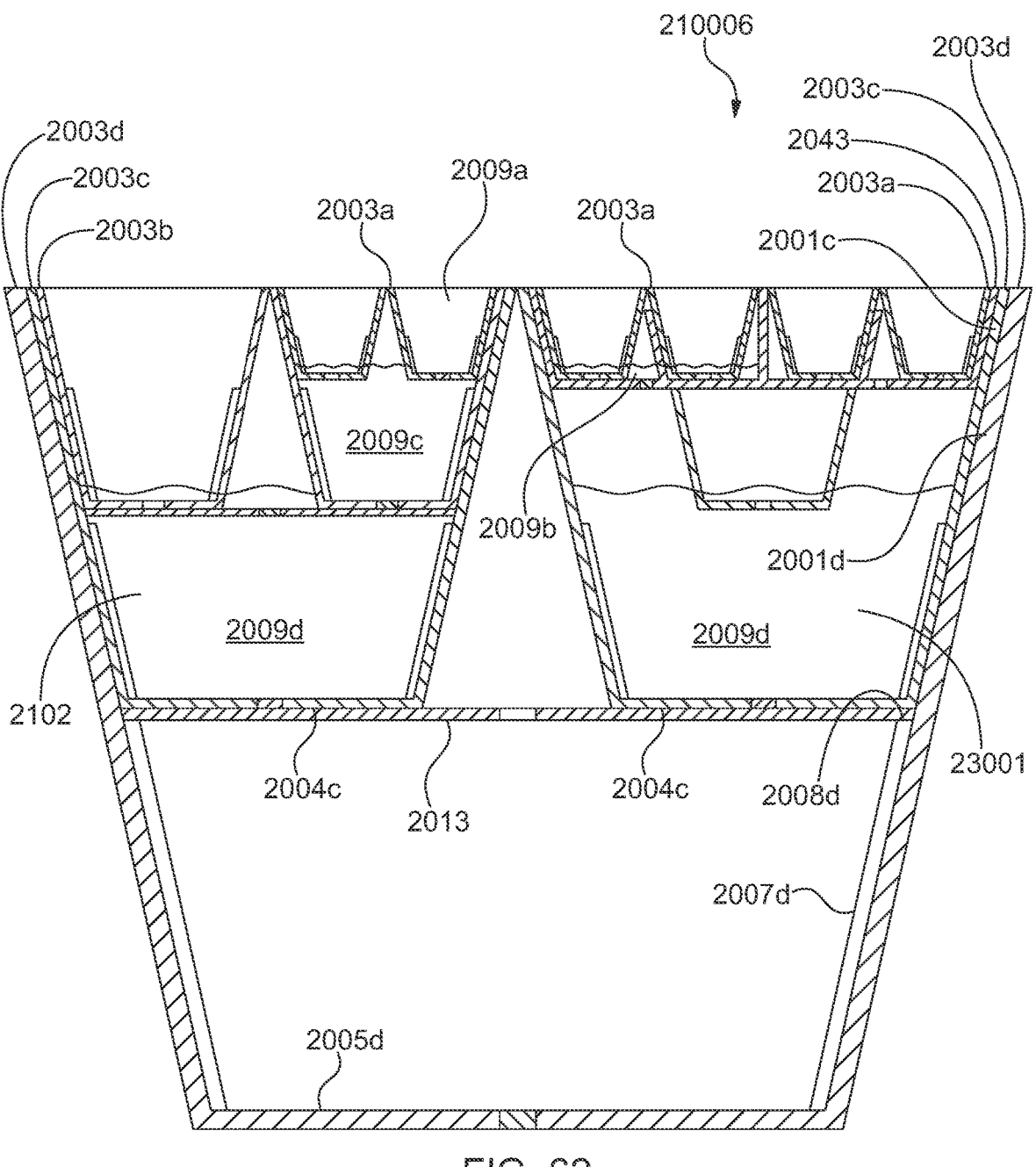
FIG. 62 is a sectional side view of a fully assembled alternative tertiary square unit in accordance with the exemplary embodiment of the present invention.
Figure 63:
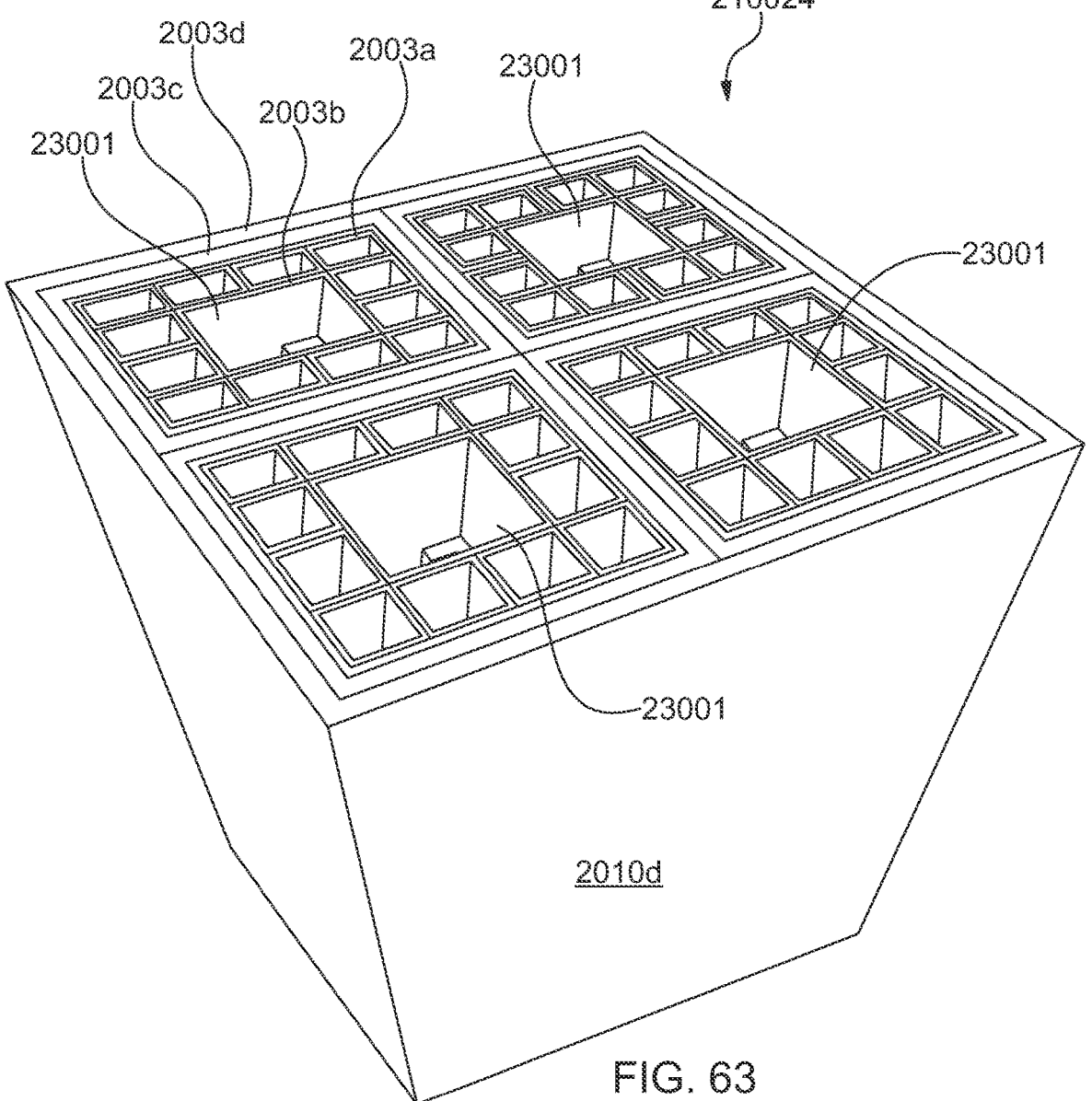
FIG. 63 is a perspective view of a fully assembled alternative tertiary square unit comprising forty-eight small square components, four medium square components, four large square components, one extra-large square component, and four supplemental components.
Figure 64:
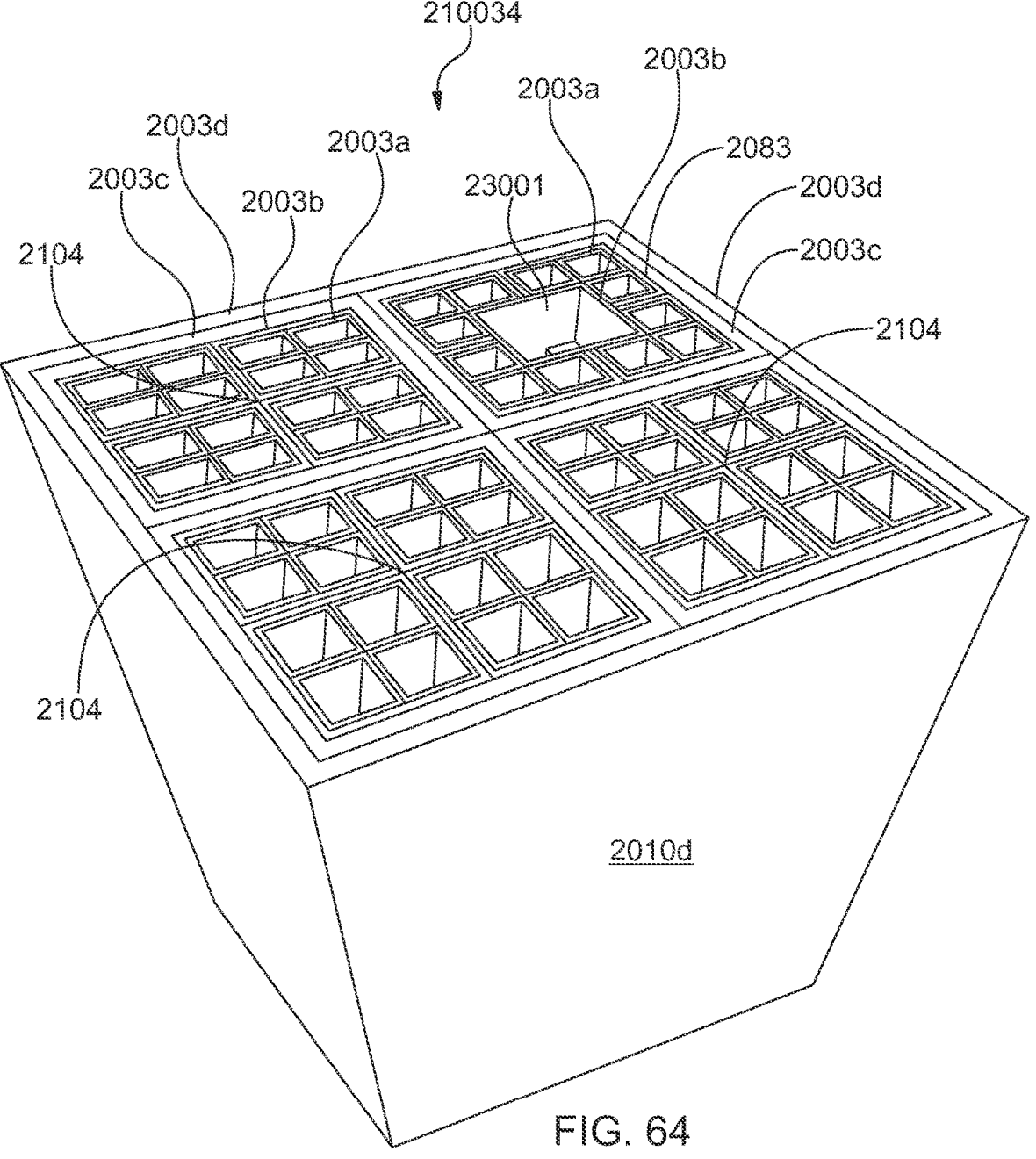
FIG. 64 is a perspective view of a fully assembled alternative tertiary square unit comprising sixty small square components, thirteen medium square components, four large square components, one extra-large square component, and one supplemental component.
Figures 65, 66:
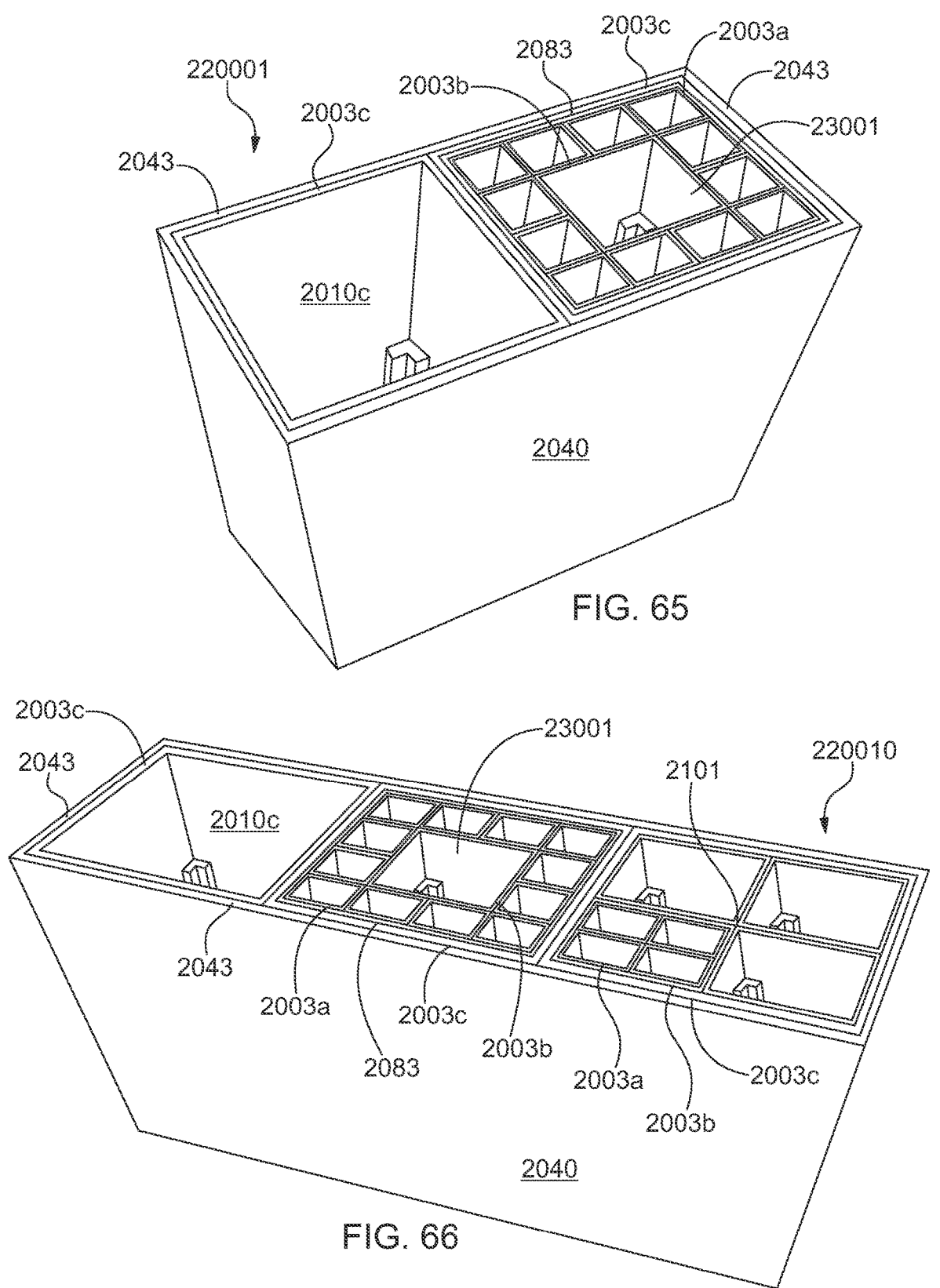
FIG. 65 is a perspective view of a fully assembled alternative tertiary rectangular unit comprising sixteen small square components, one medium component, two large components, one rectangular component, and one supplemental component.
FIG. 66 is a perspective view of a fully assembled alternative tertiary rectangular unit comprising twenty small square components, five medium square components, three large square components, one rectangular component, and one supplemental component.
Figure 67:
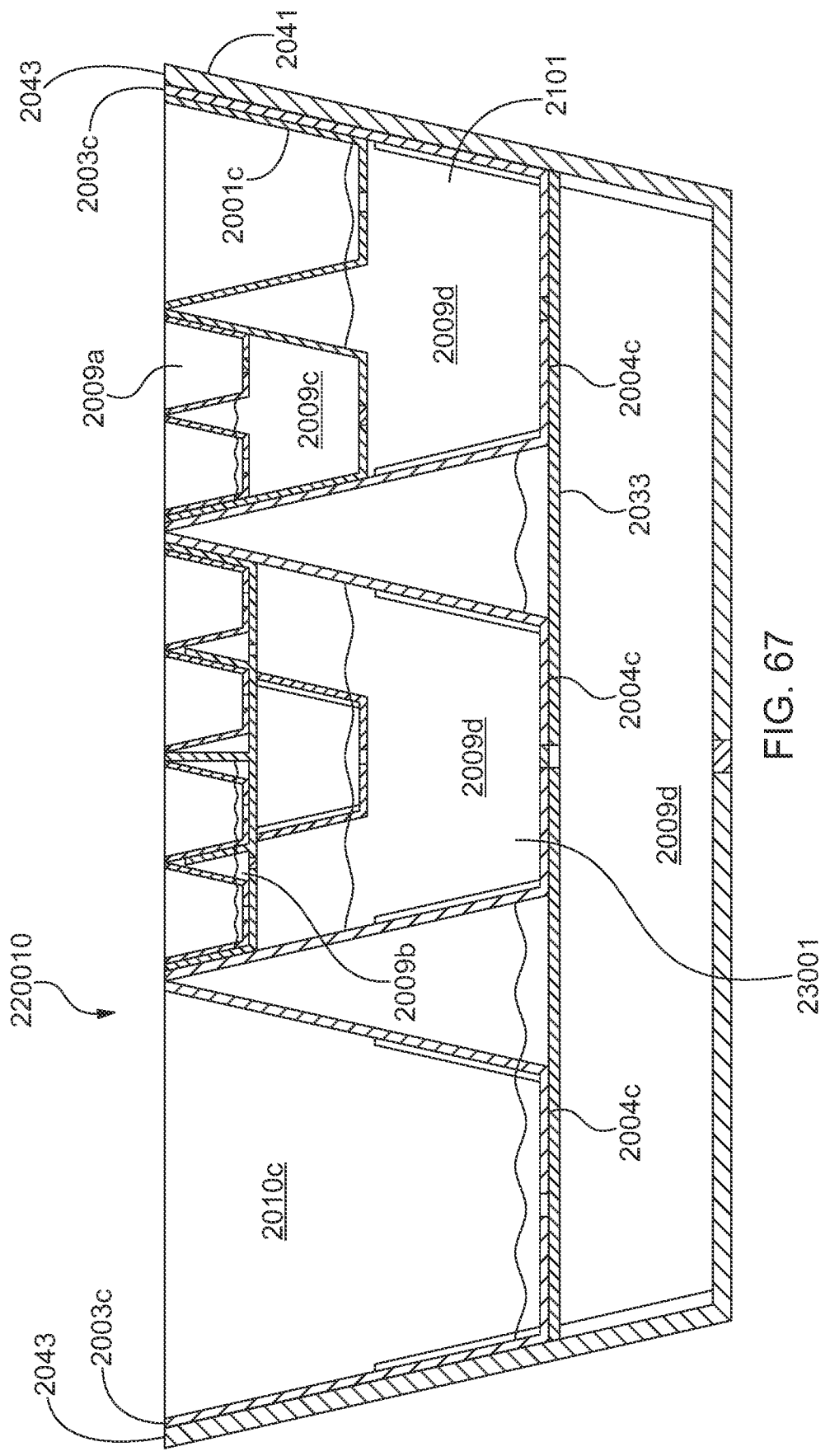
FIG. 67 is a sectional side view of a fully assembled alternative tertiary rectangular unit in accordance with the exemplary embodiment of the present invention.
Figure 68:
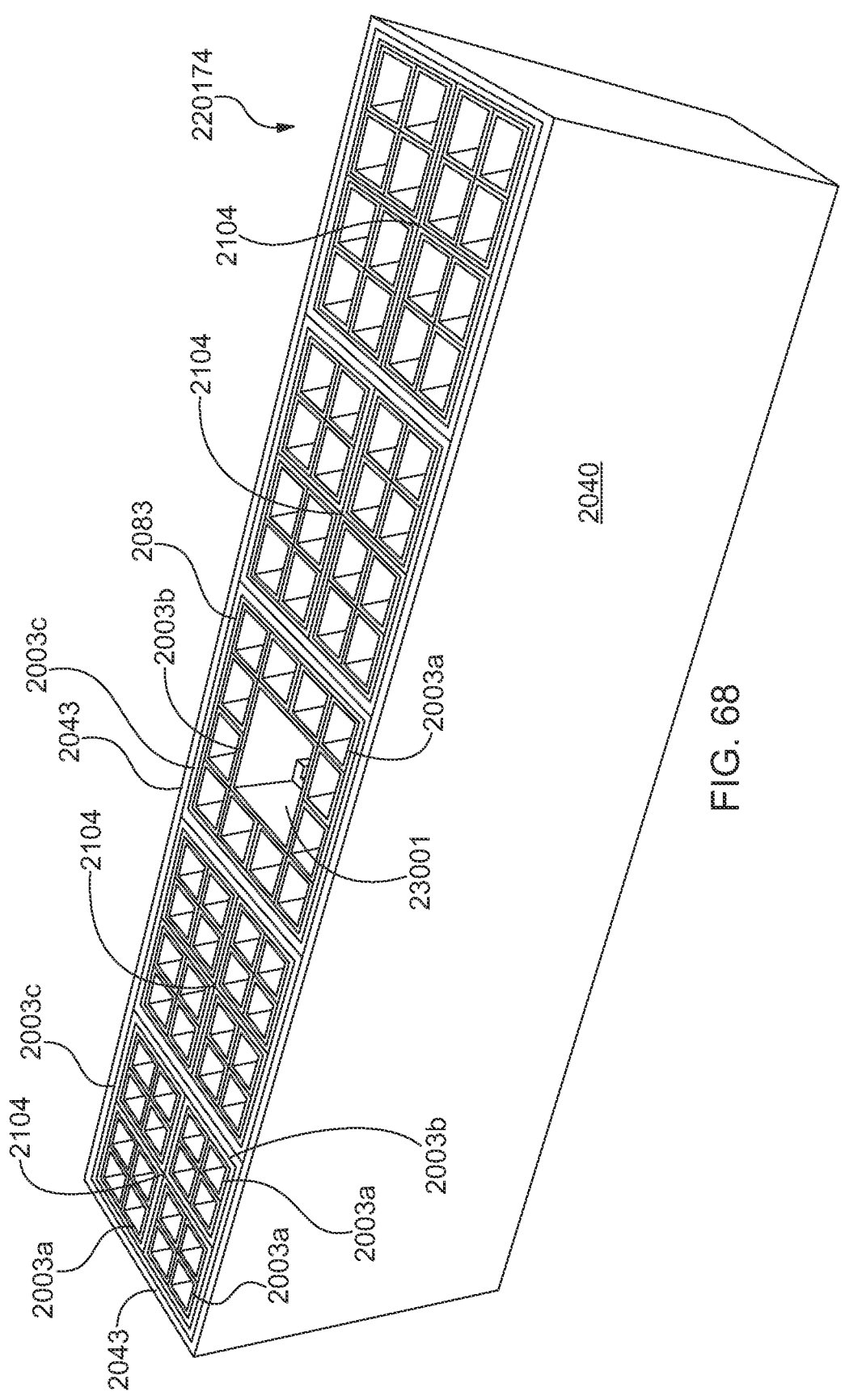
FIG. 68 is a perspective view of a fully assembled alternative tertiary rectangular unit comprising seventy-six small square components, seventeen medium square components, five large square components, one rectangular component, and one supplemental component.
Figures 69, 70:
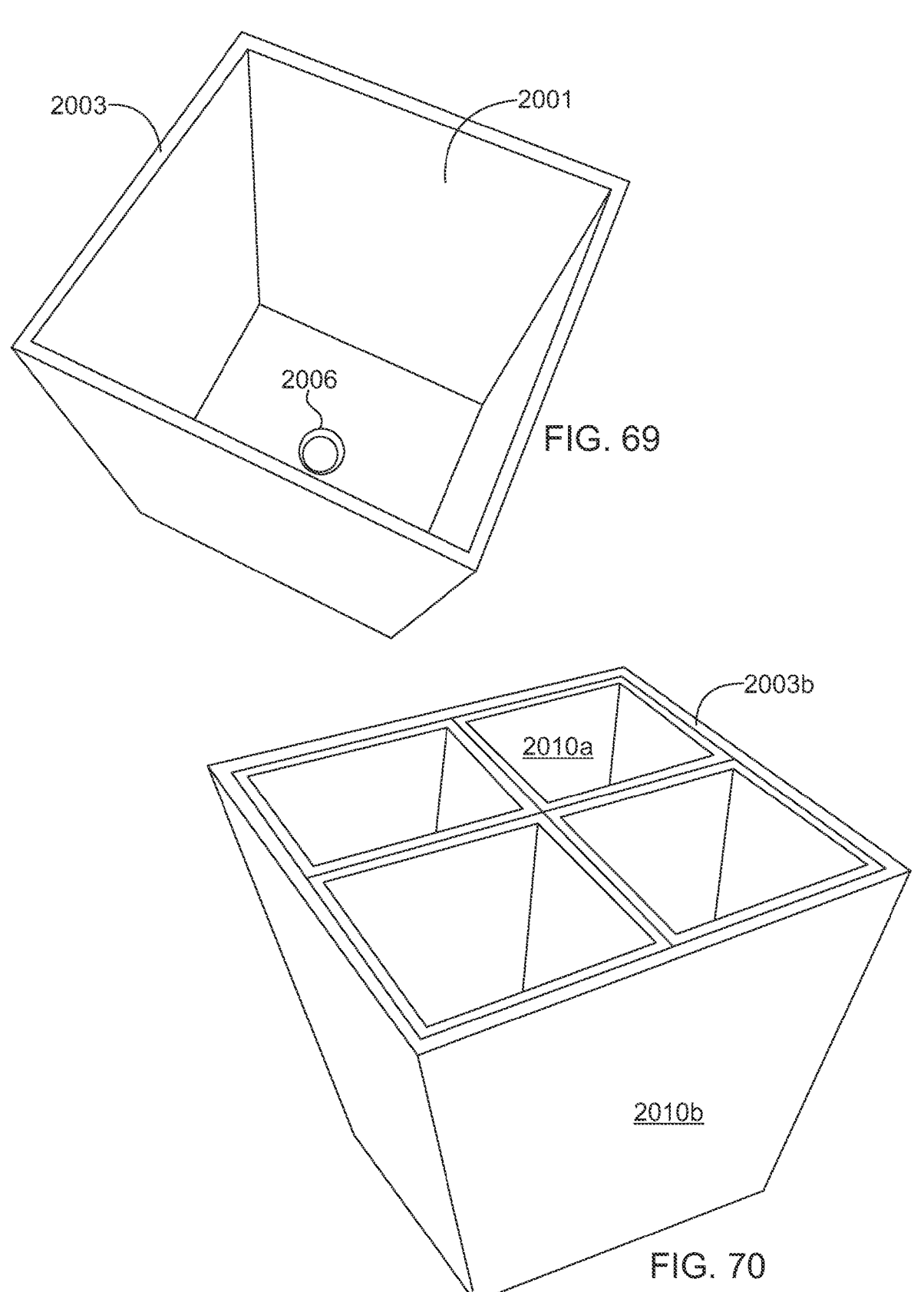
FIG. 69 is a perspective view of a square interengageable container component in accordance with the exemplary embodiment of the present invention.
FIG. 70 is a perspective view of a fully assembled primary square unit in accordance with the exemplary embodiment of the present invention.
Figure 71:
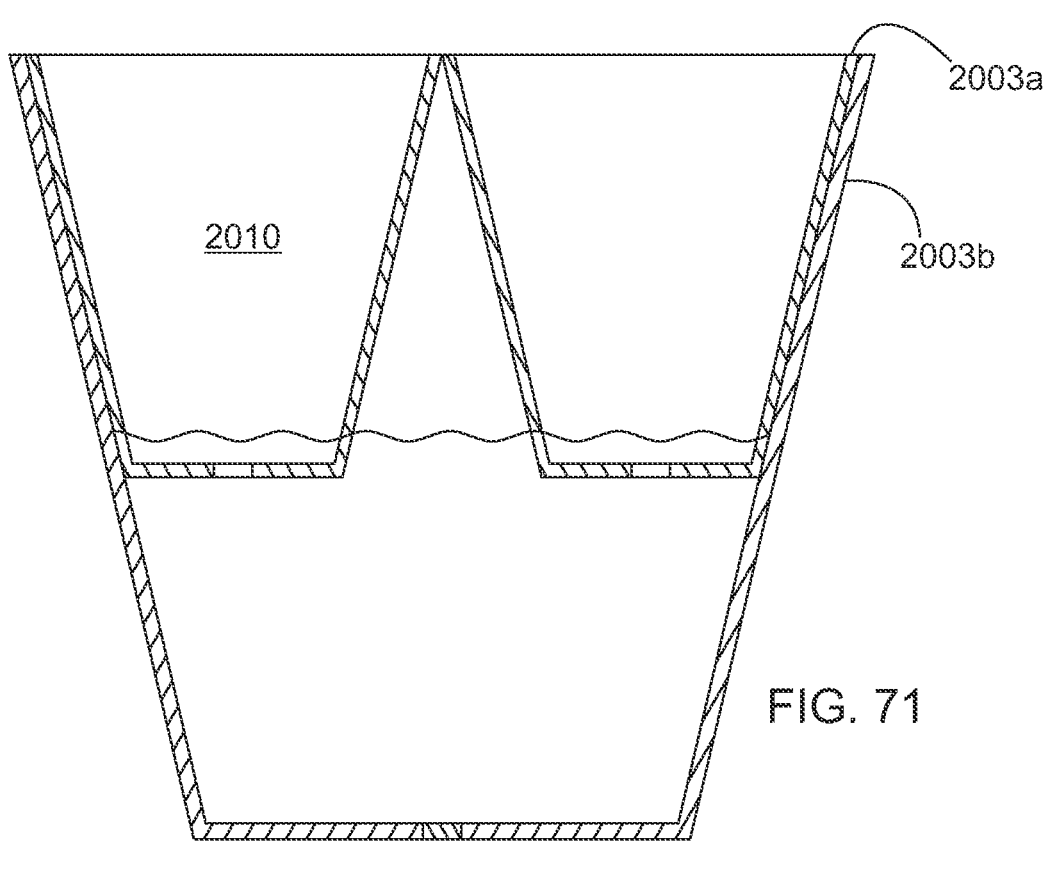
FIG. 71 is a sectional side view of a fully assembled primary square unit in accordance with the exemplary embodiment of the present invention.
Figure 72:
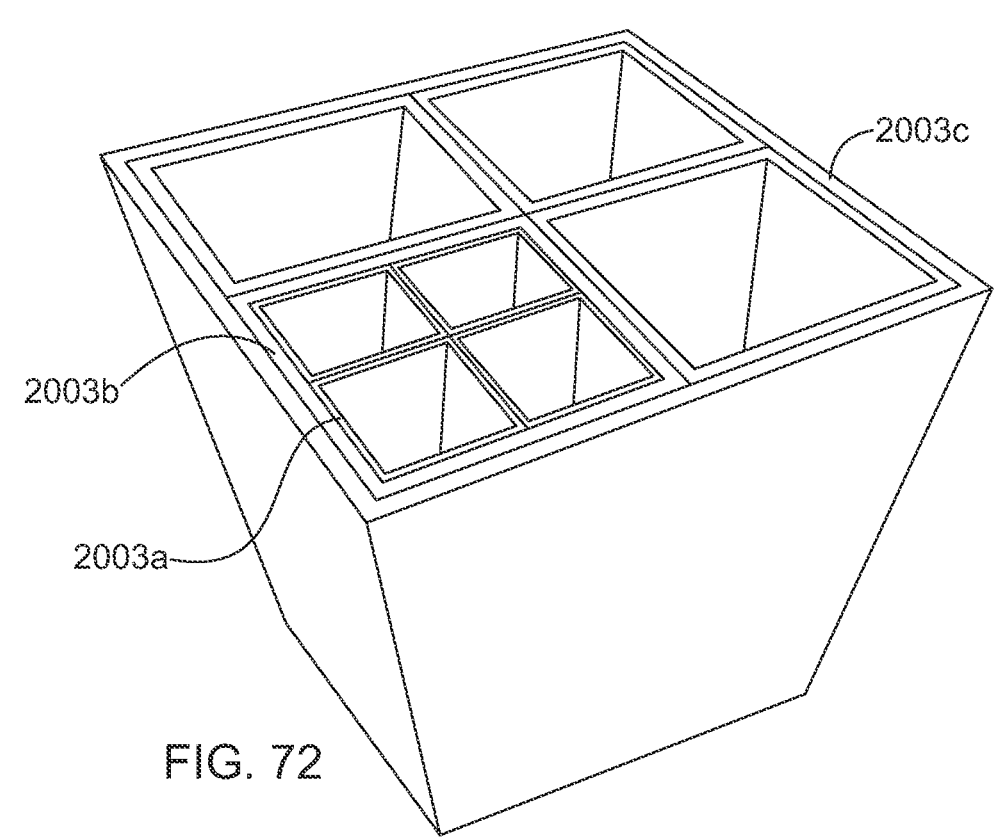
FIG. 72 is a perspective view of a fully assembled secondary square unit comprising four small square components, four medium square components and one large square component.
Figure 73:
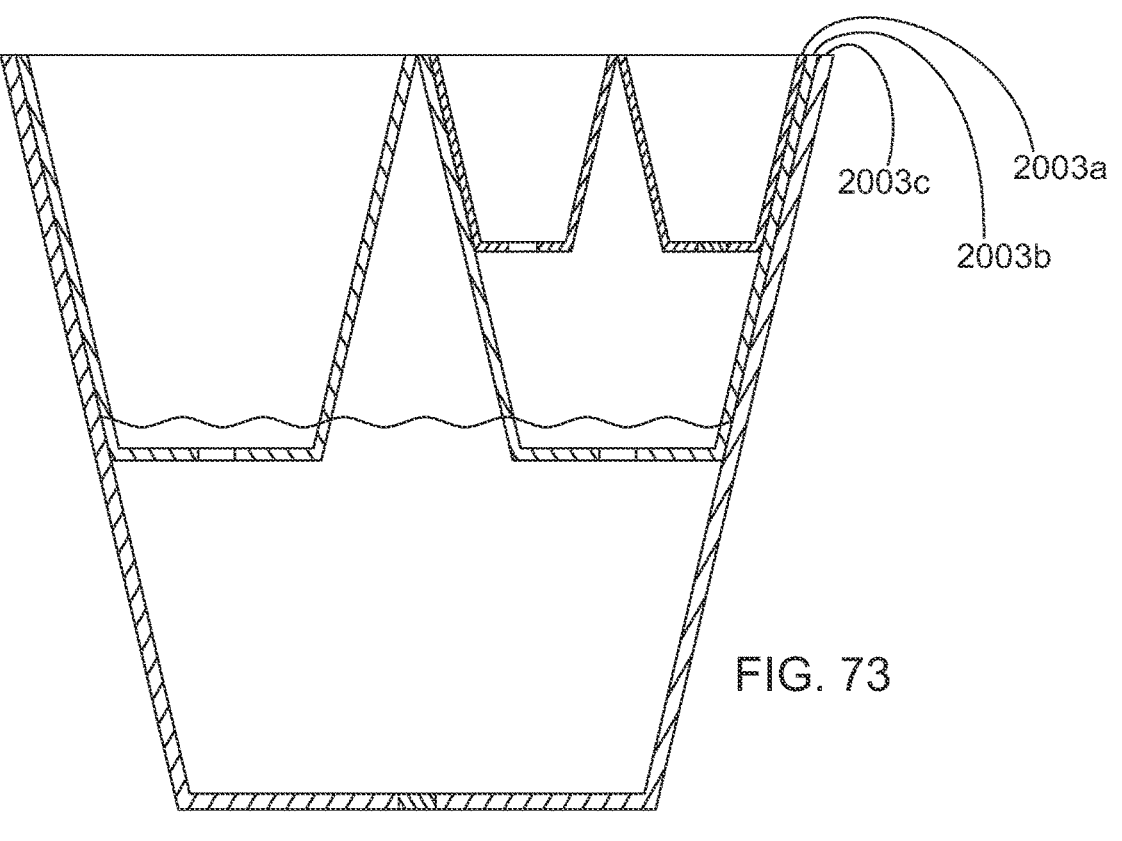
FIG. 73 is a sectional side view of a fully assembled secondary square unit in accordance with the exemplary embodiment of the present invention.
Figure 74:
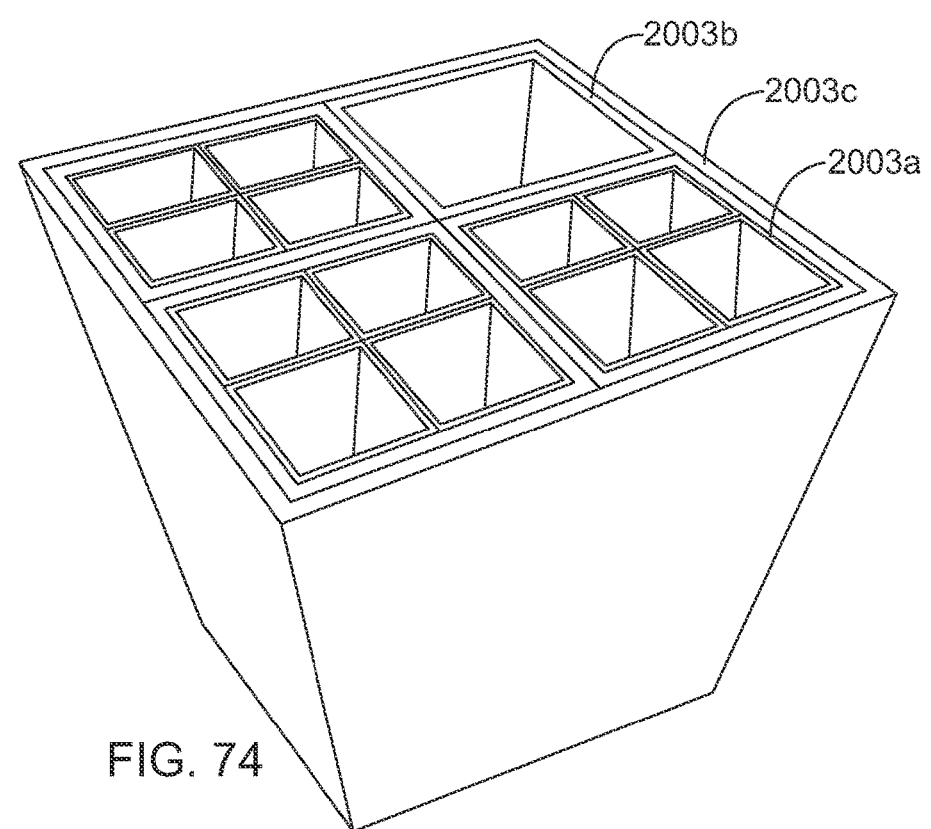
FIG. 74 is a perspective view of a fully assembled secondary square unit comprising twelve small square components, four medium square components, and one large square component.
Figures 75, 76:
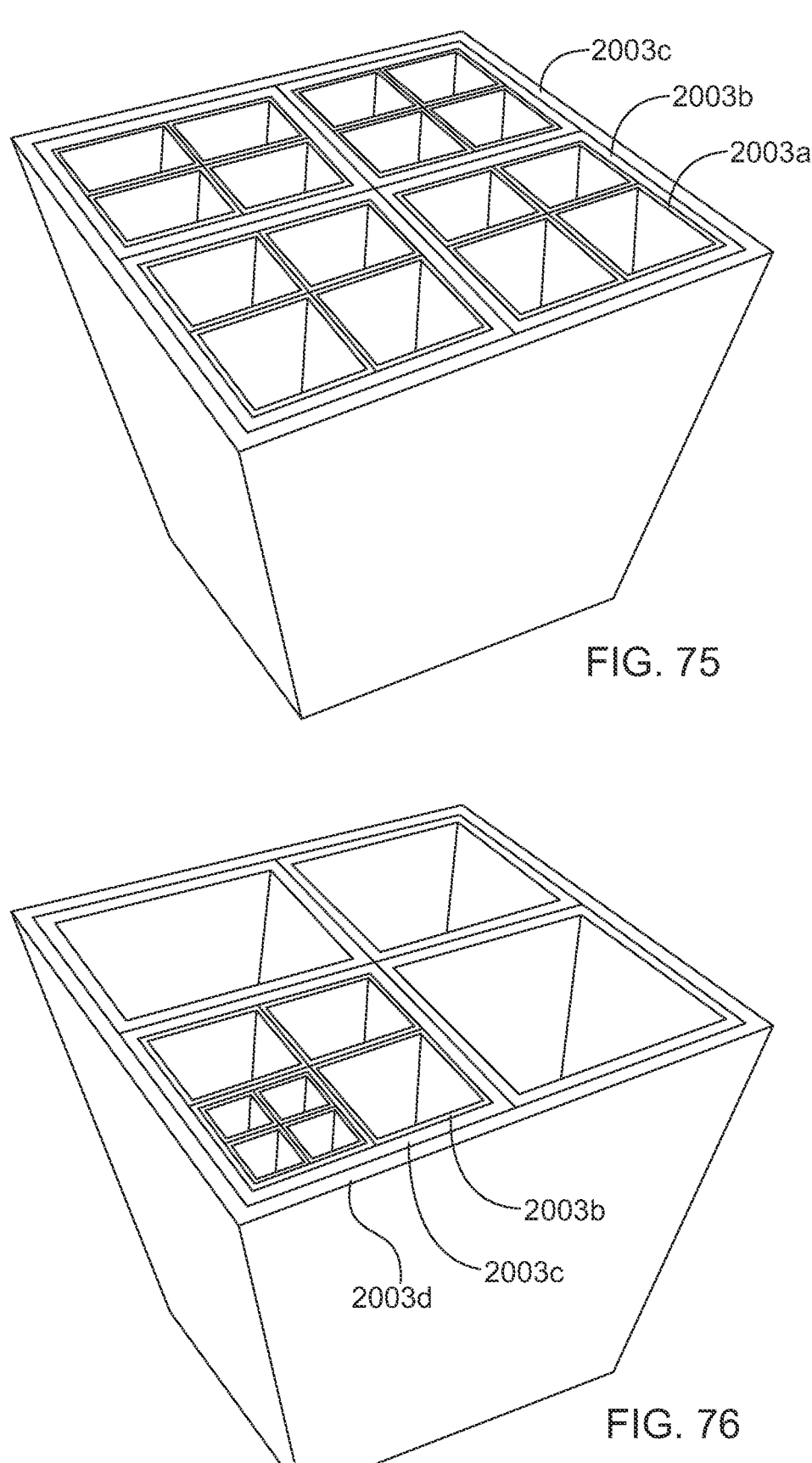
FIG. 75 is a perspective view of a fully assembled secondary square unit comprising sixteen small square components, four medium components, and one large square component.
FIG. 76 is a perspective view of a fully assembled tertiary square unit comprising four small square components, four medium square components, four large square components, and one extra-large square component.
Figure 77:
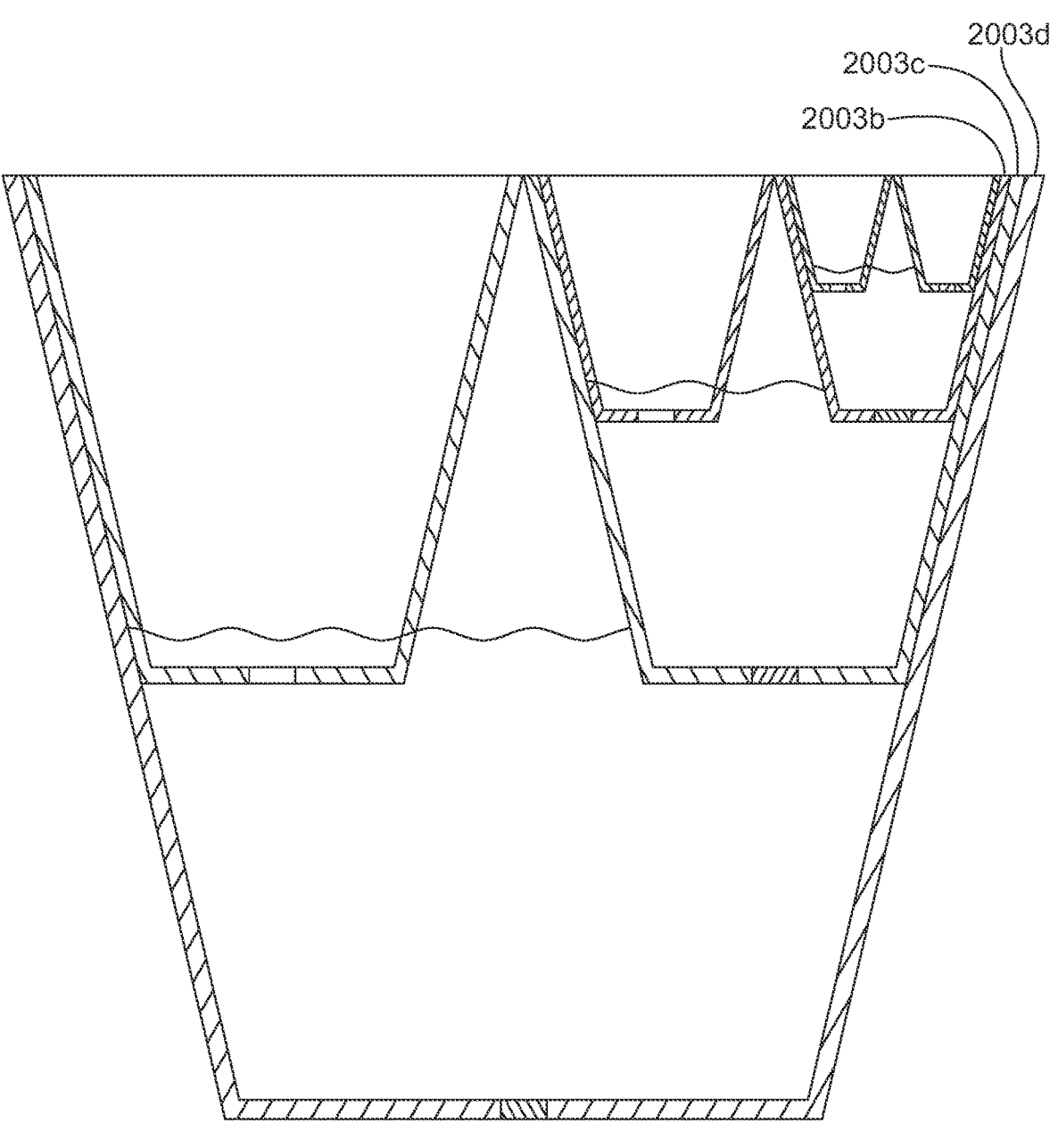
FIG. 77 is a sectional side view of a fully assembled tertiary square unit in accordance with the exemplary embodiment of the present invention.
Figure 78:
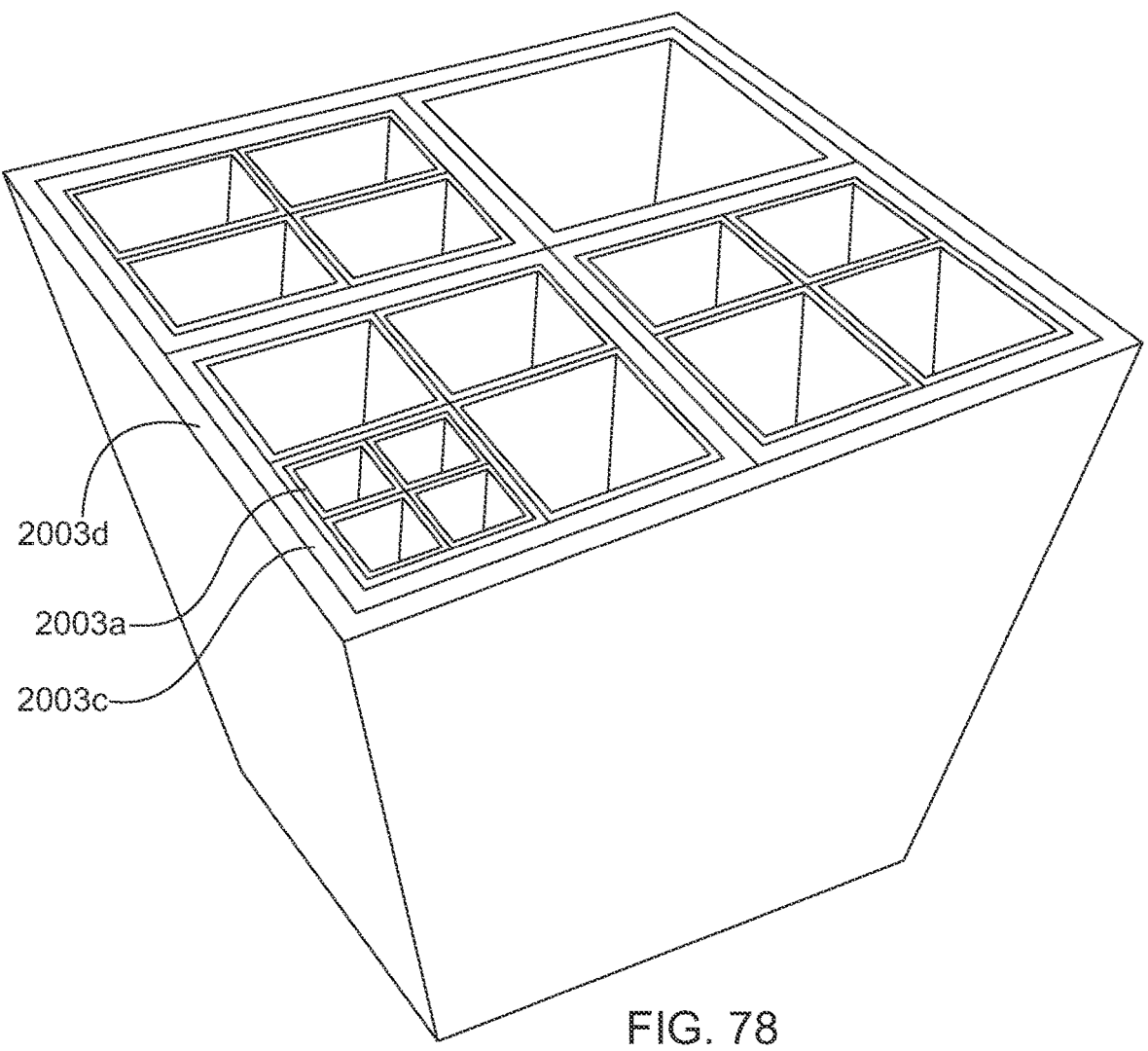
FIG. 78 is a perspective view of a fully assembled tertiary square unit comprising four small square components, twelve medium square components, four large square components, and one extra-large square component.
Figure 79:
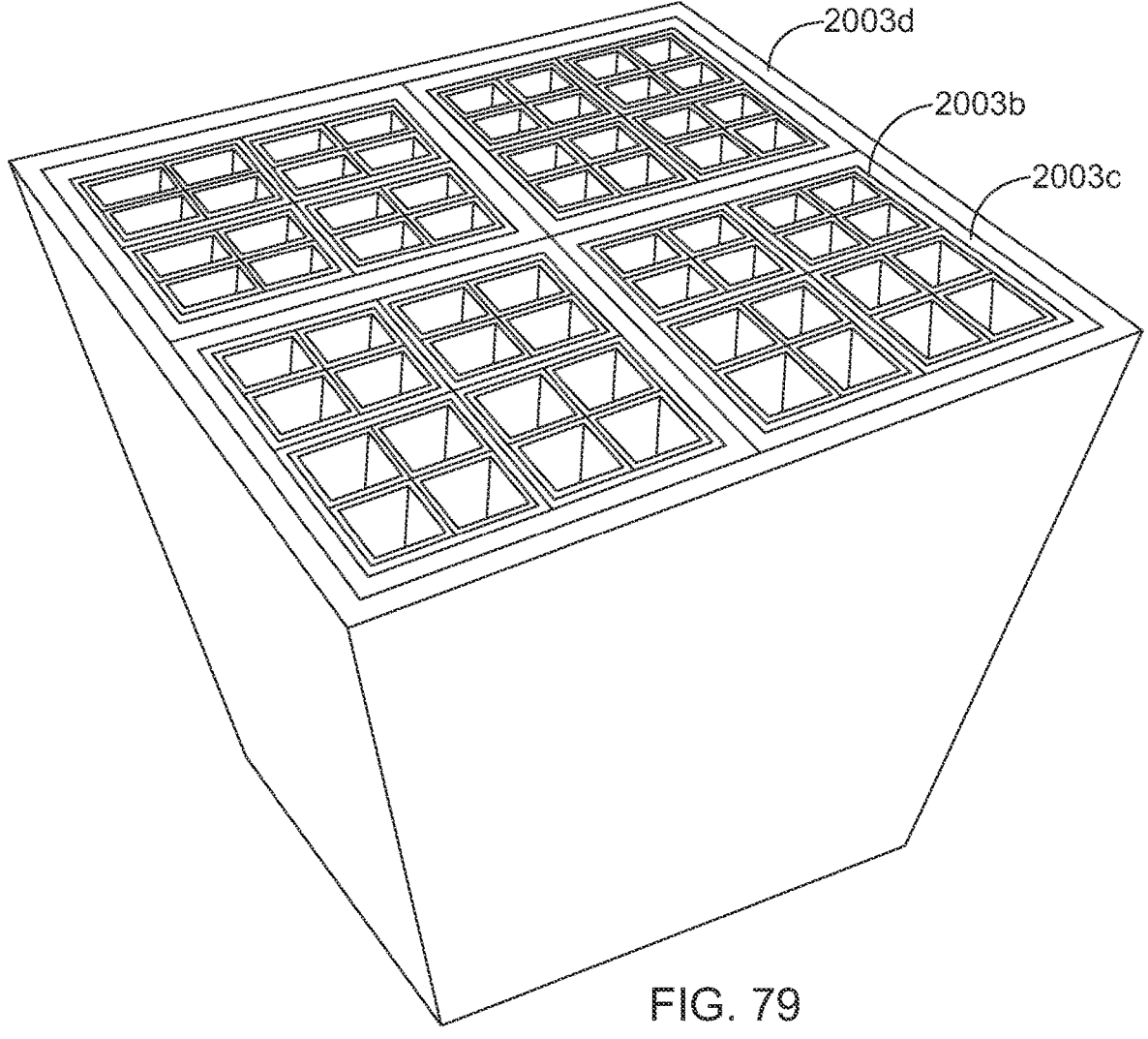
FIG. 79 is a perspective view of a fully assembled tertiary square unit comprising sixty-four small square components, sixteen medium square components, four large square components, and one extra-large square component.
Figure 81:
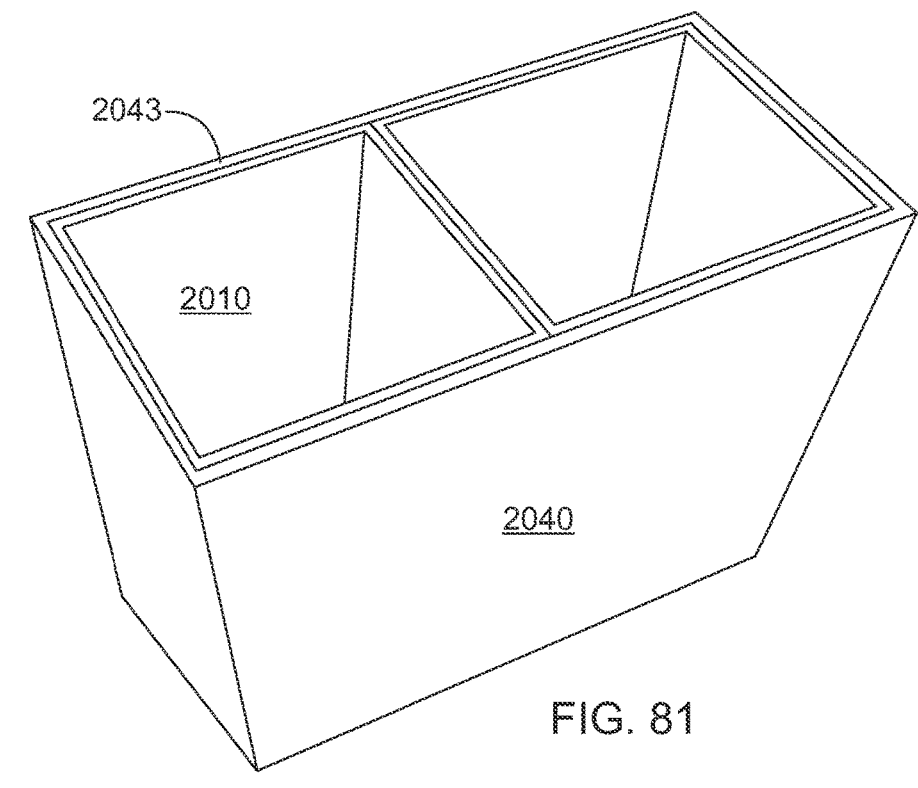
FIG. 81 is a perspective view of a fully assembled primary rectangular unit comprising two small square components and one rectangular component.
Figure 82:
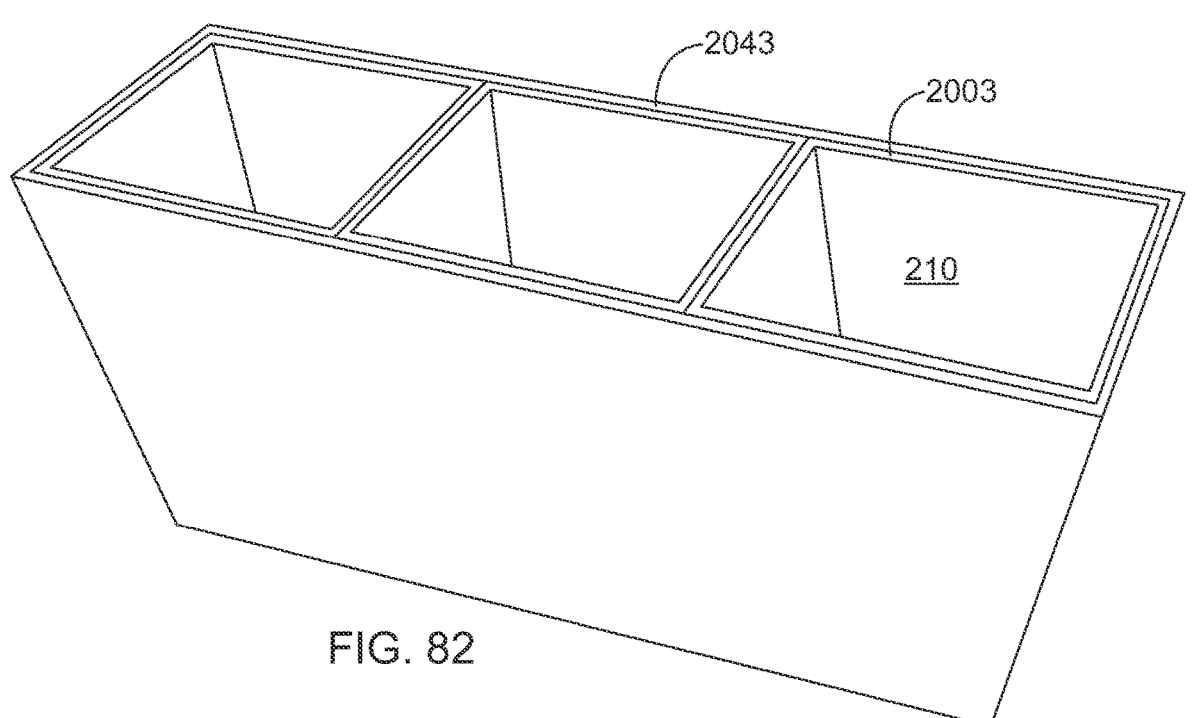
FIG. 82 is a perspective view of a fully assembled primary rectangular unit comprising three small square components and one rectangular component.
Figure 83:
FIG. 83 is a perspective view of a fully assembled primary rectangular unit comprising four small square components and one rectangular component.
Figure 84:
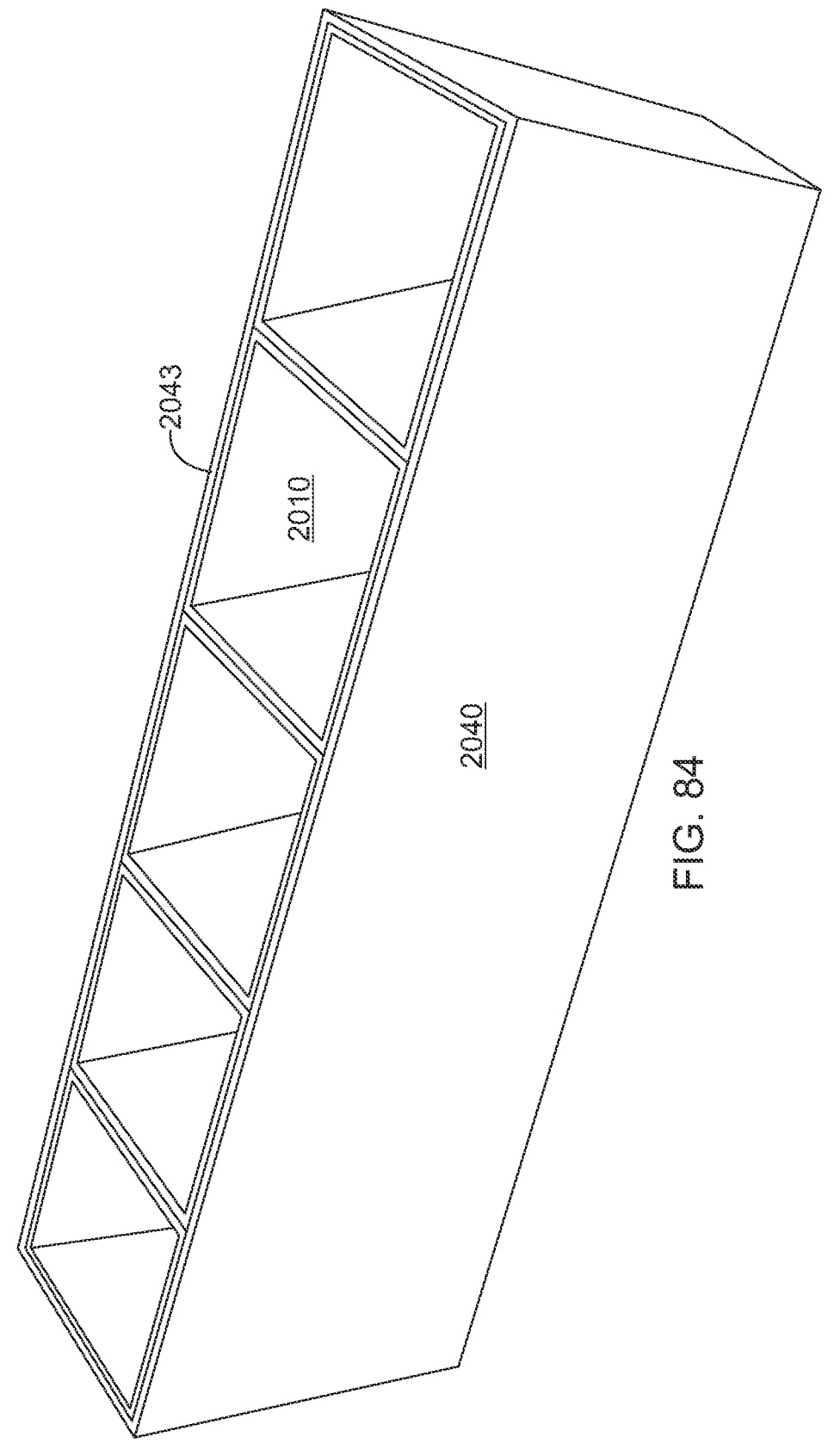
FIG. 84 is a perspective view of a fully assembled primary rectangular unit comprising five small square components and one rectangular component.
Figure 85:
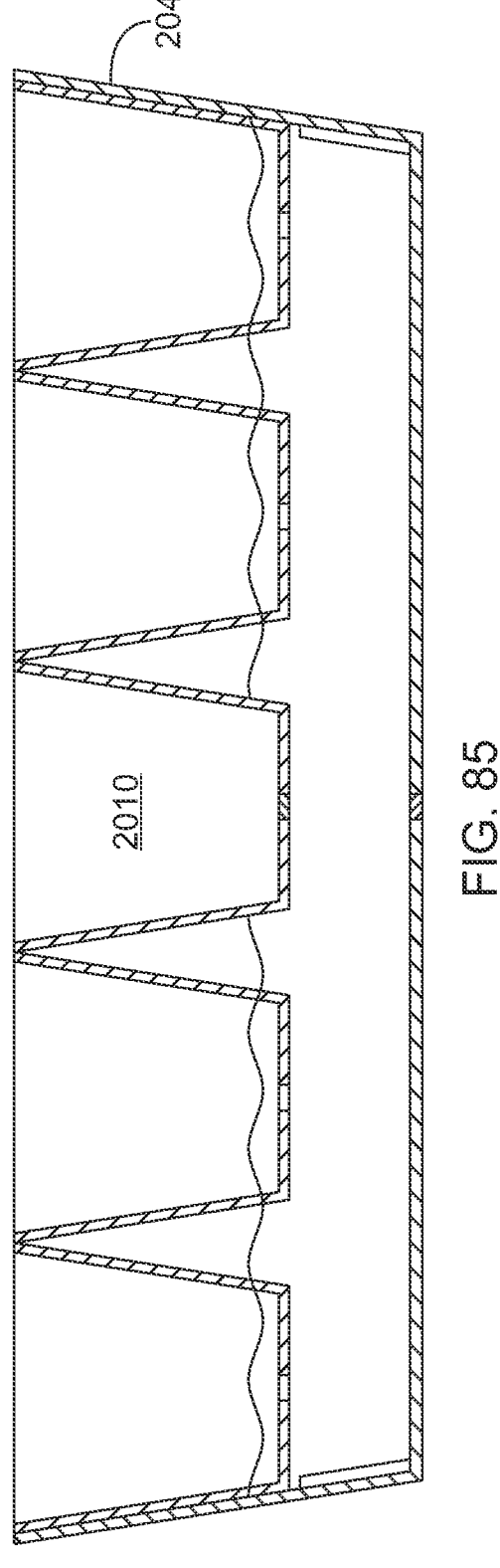
FIG. 85 is a sectional side view of a fully assembled primary rectangular unit in accordance with the exemplary embodiment of the present invention.
Figures 86, 87:
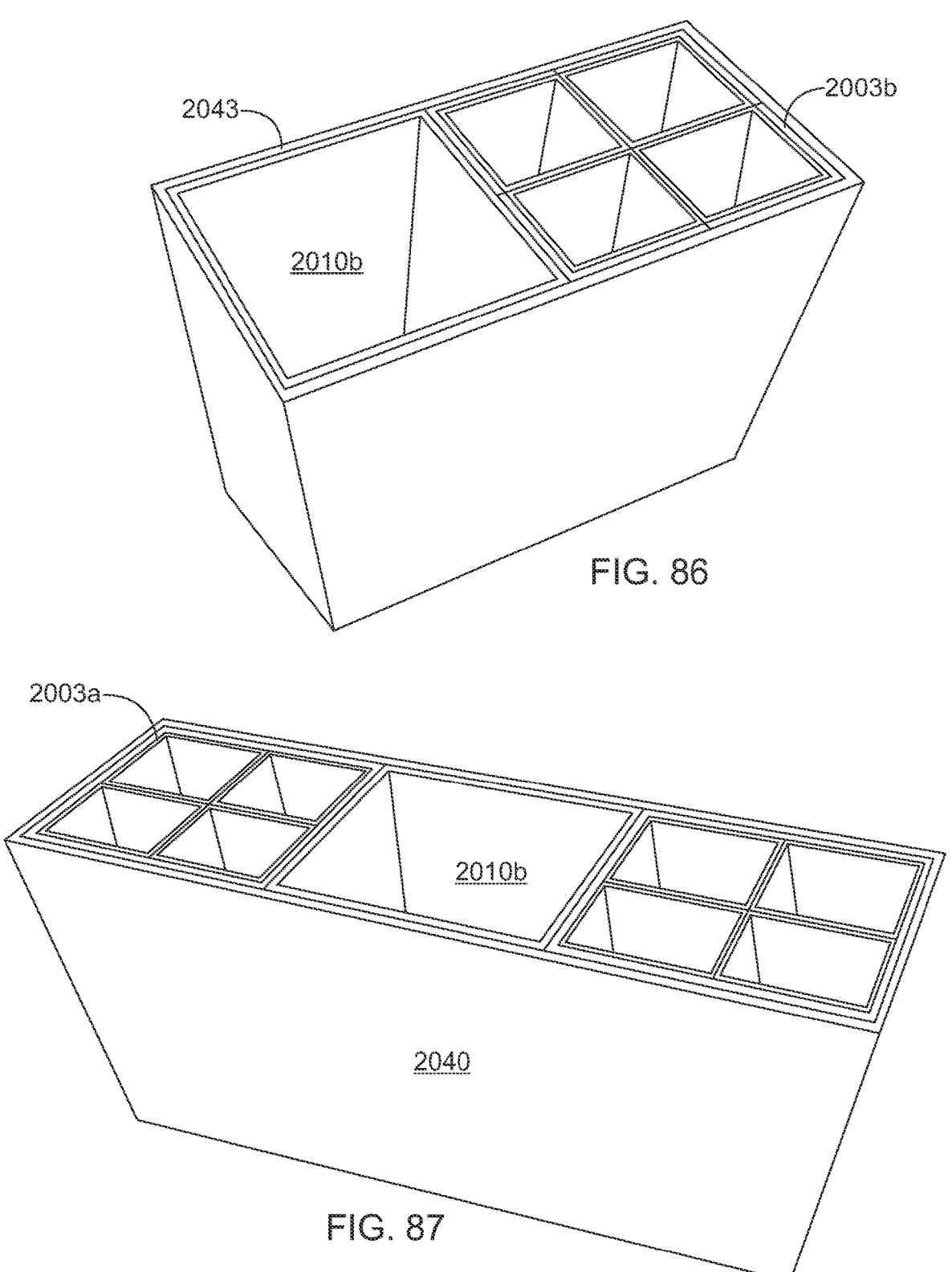
FIG. 86 is a perspective view of a fully assembled secondary rectangular unit comprising four small square components, two medium square components, and one rectangular component.
FIG. 87 is a perspective view of a fully assembled secondary rectangular unit comprising eight small square components, three medium square components, and one rectangular component.
Figure 88:
FIG. 88 is a perspective view of a fully assembled secondary rectangular unit comprising eight small square components, four medium square components, and one rectangular component.
Figure 89:
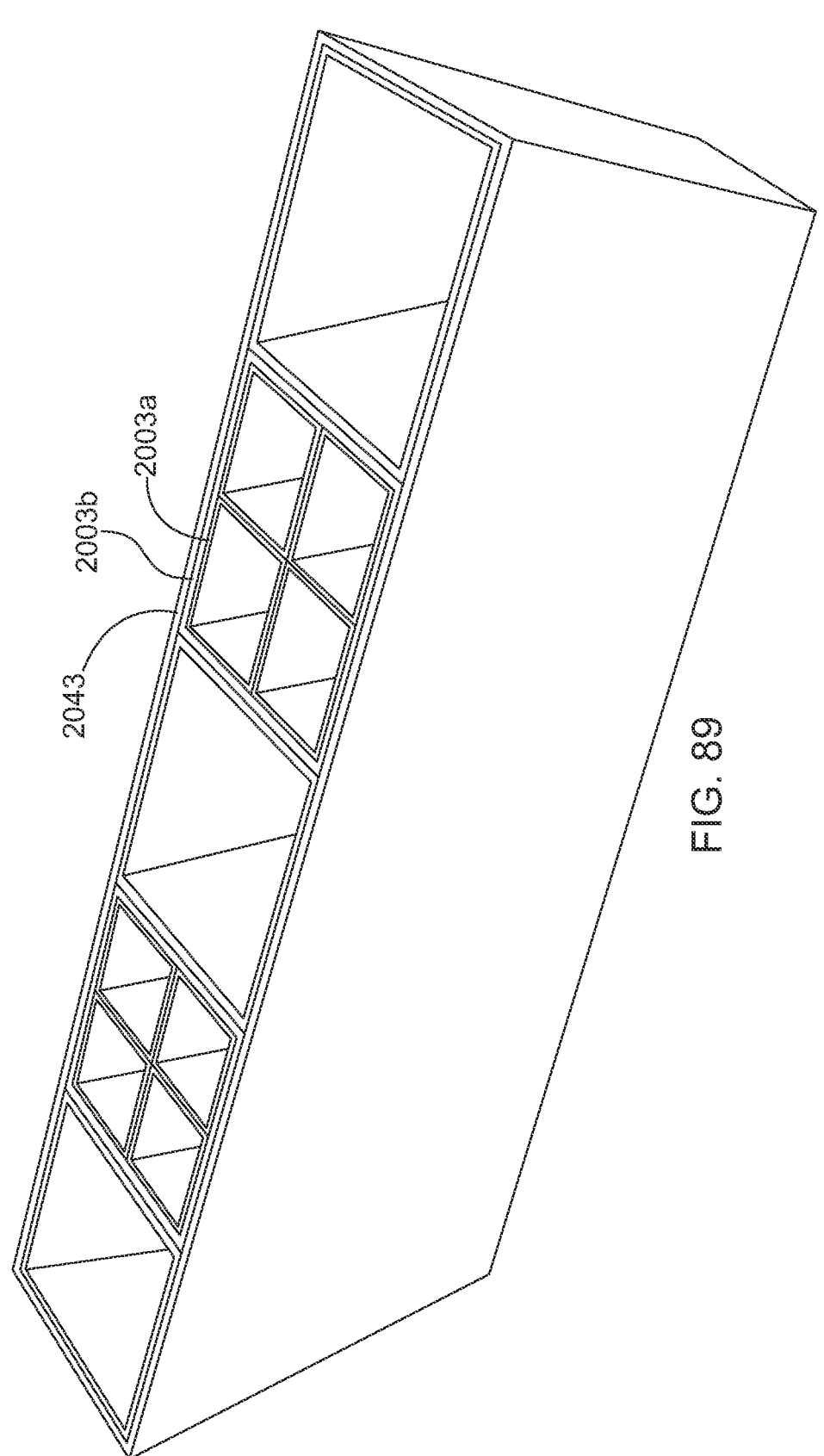
FIG. 89 is a perspective view of a fully assembled secondary rectangular unit comprising eight small square components, five medium square components, and one rectangular component.
Figure 90:
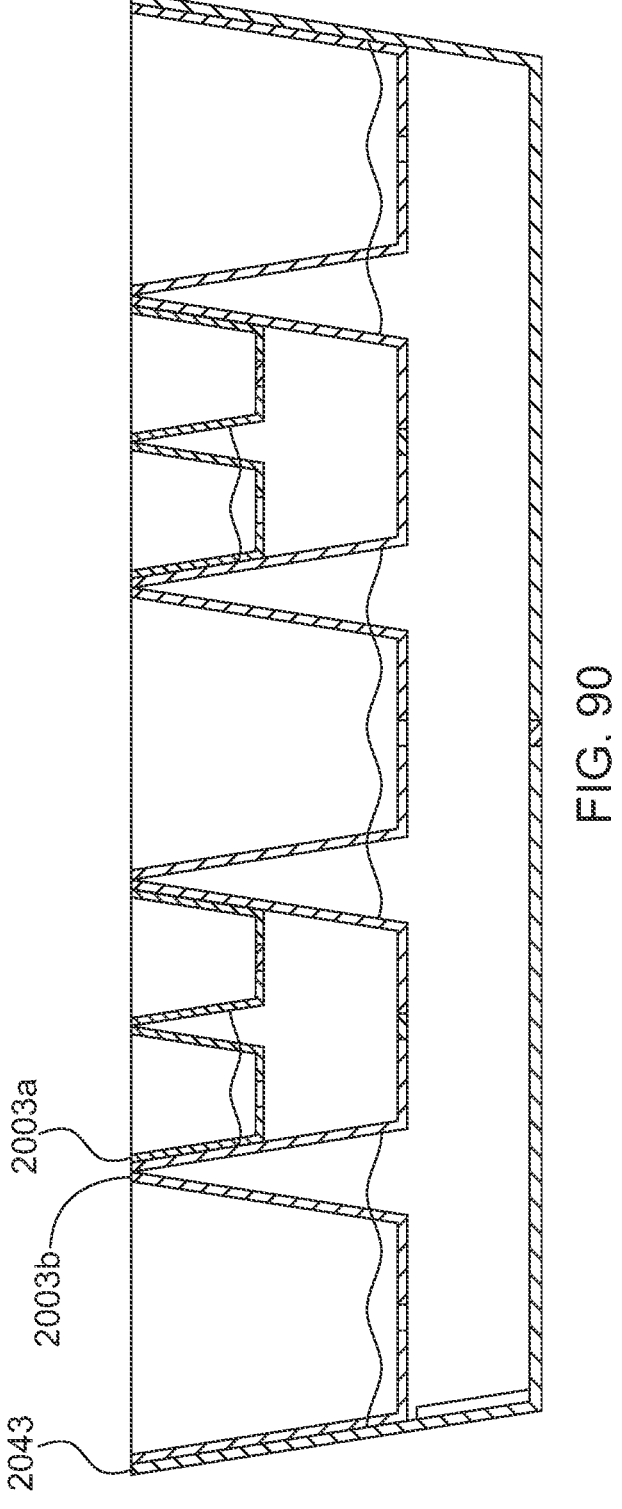
FIG. 90 is a sectional side view of a fully assembled secondary rectangular unit in accordance with the exemplary embodiment of the present invention.
Figure 91:
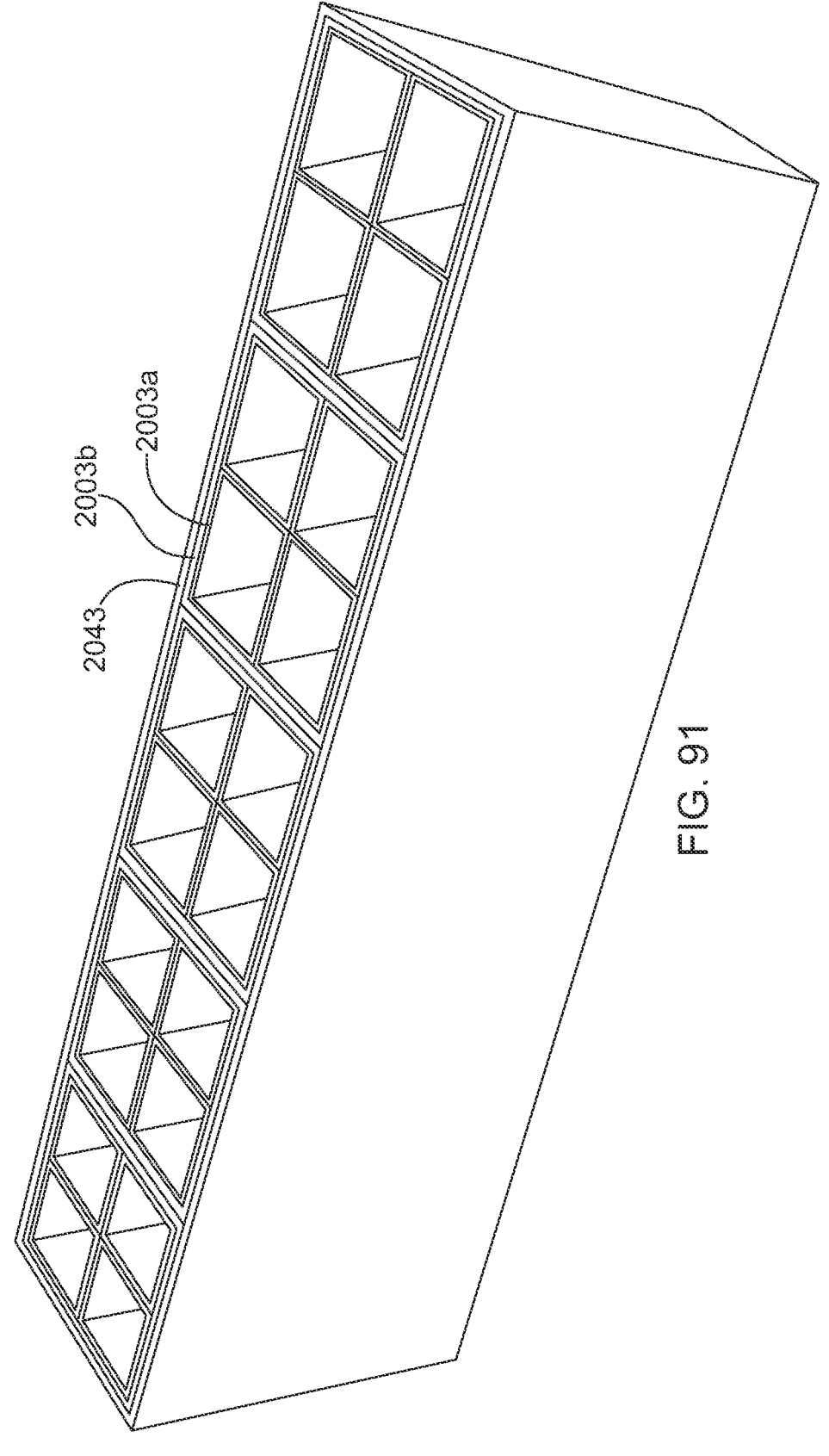
FIG. 91 is a perspective view of a fully assembled secondary rectangular unit comprising twenty small square components, five medium square components, and one rectangular component.
Figure 92:
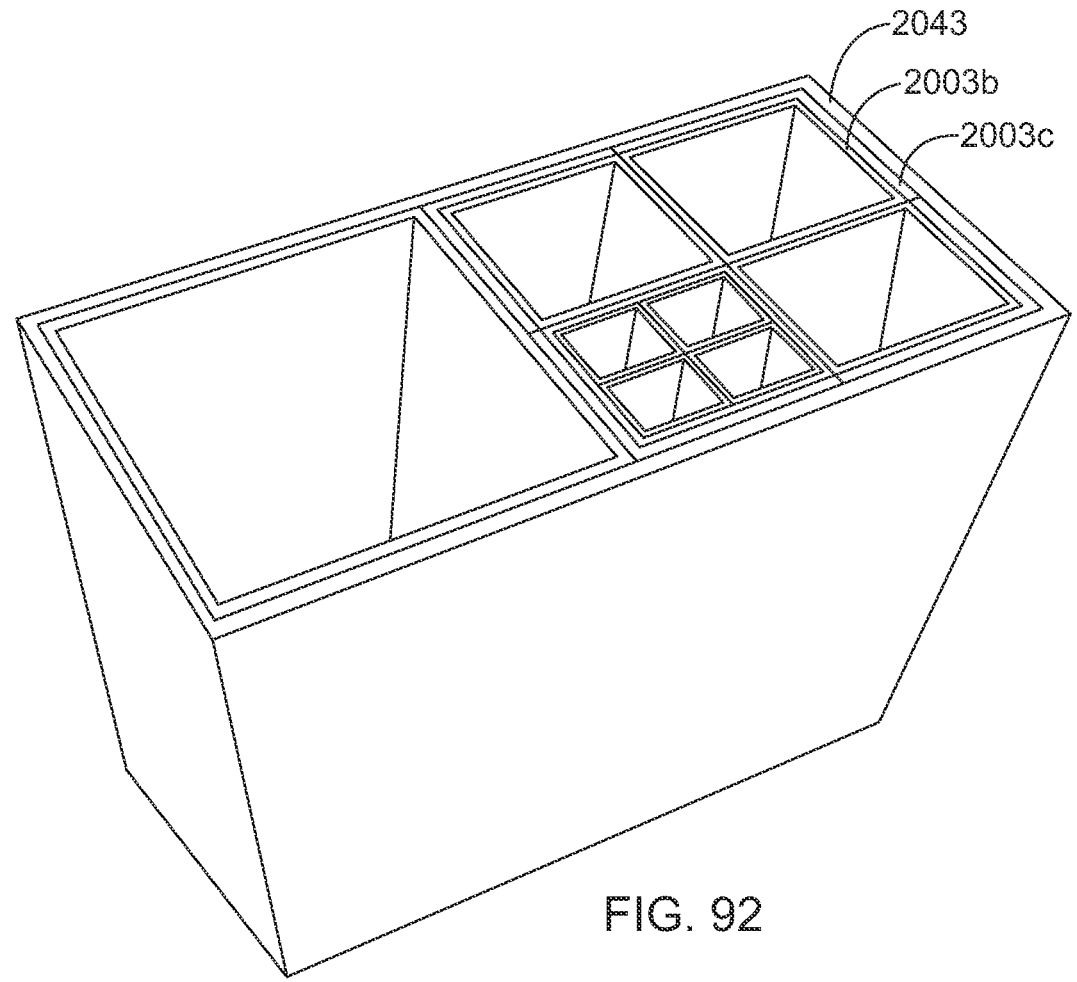
FIG. 92 is a perspective view of a fully assembled tertiary rectangular unit comprising four small square components, four medium square components, two large square components, and one rectangular component.
Figure 93:
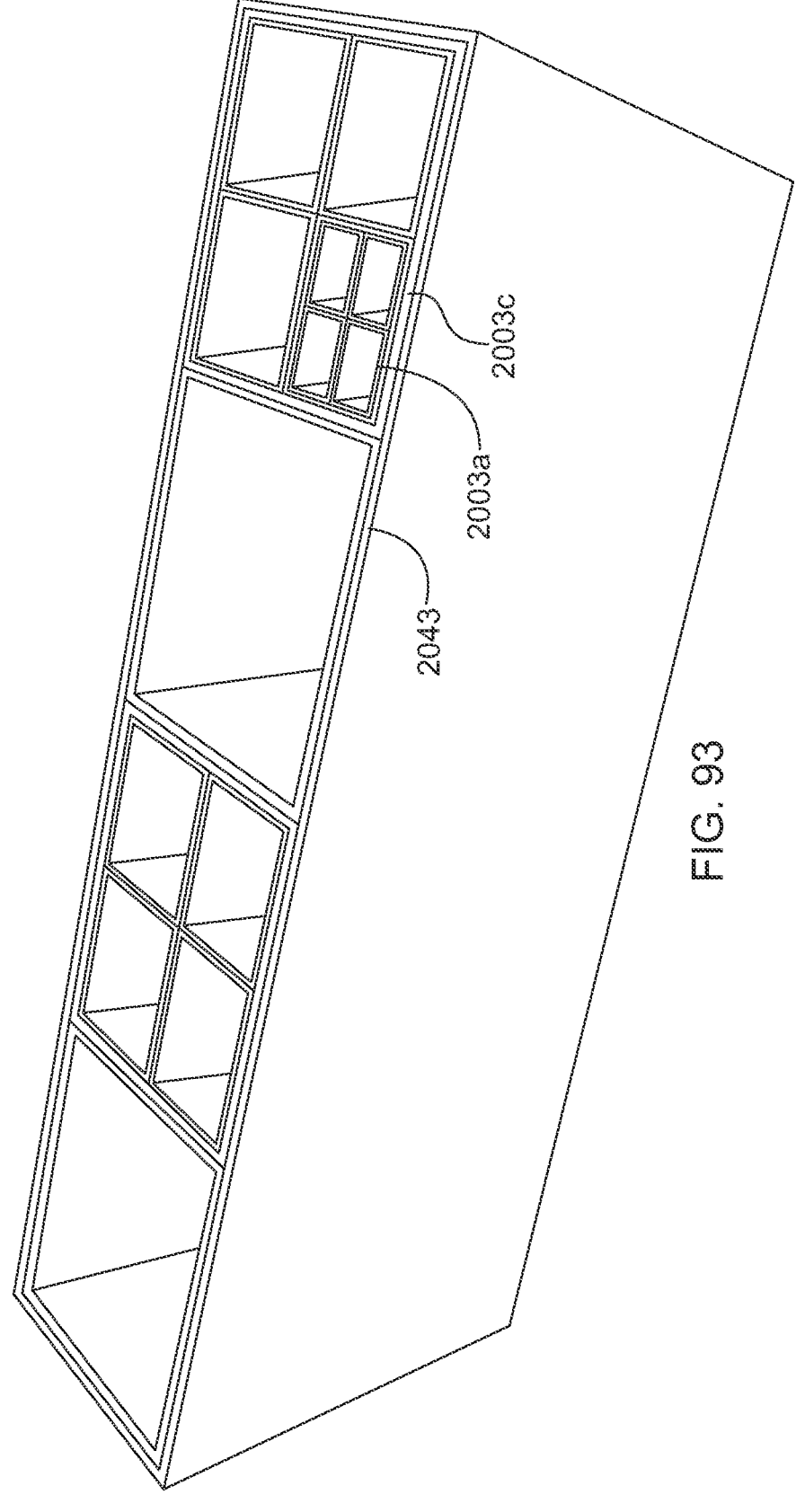
FIG. 93 is a perspective view of a fully assembled tertiary rectangular unit comprising four small square components, eight medium square components, four large square components, and one rectangular component.
Figure 94:
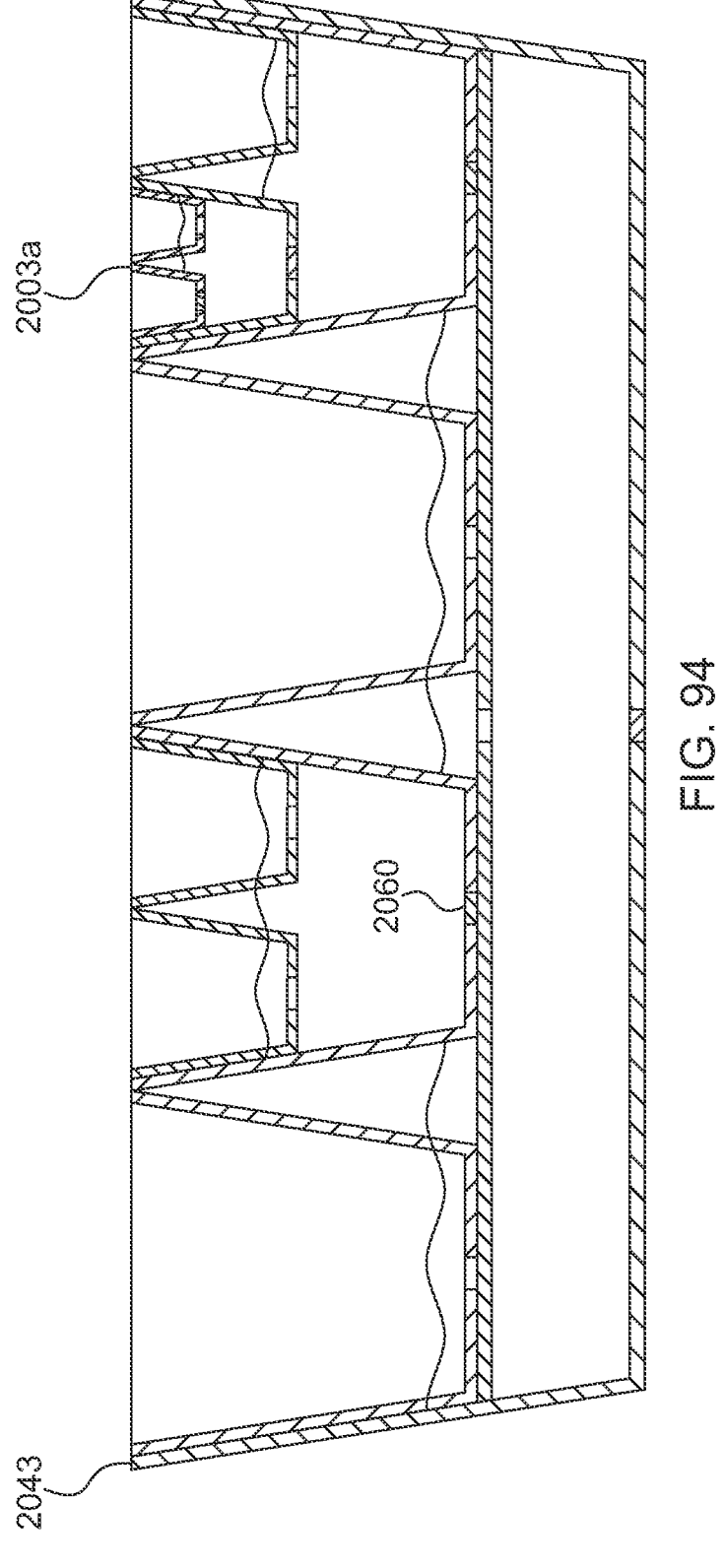
FIG. 94 is a sectional side view of a fully assembled tertiary rectangular unit in accordance with the present embodiment of the present invention.
Figure 95:
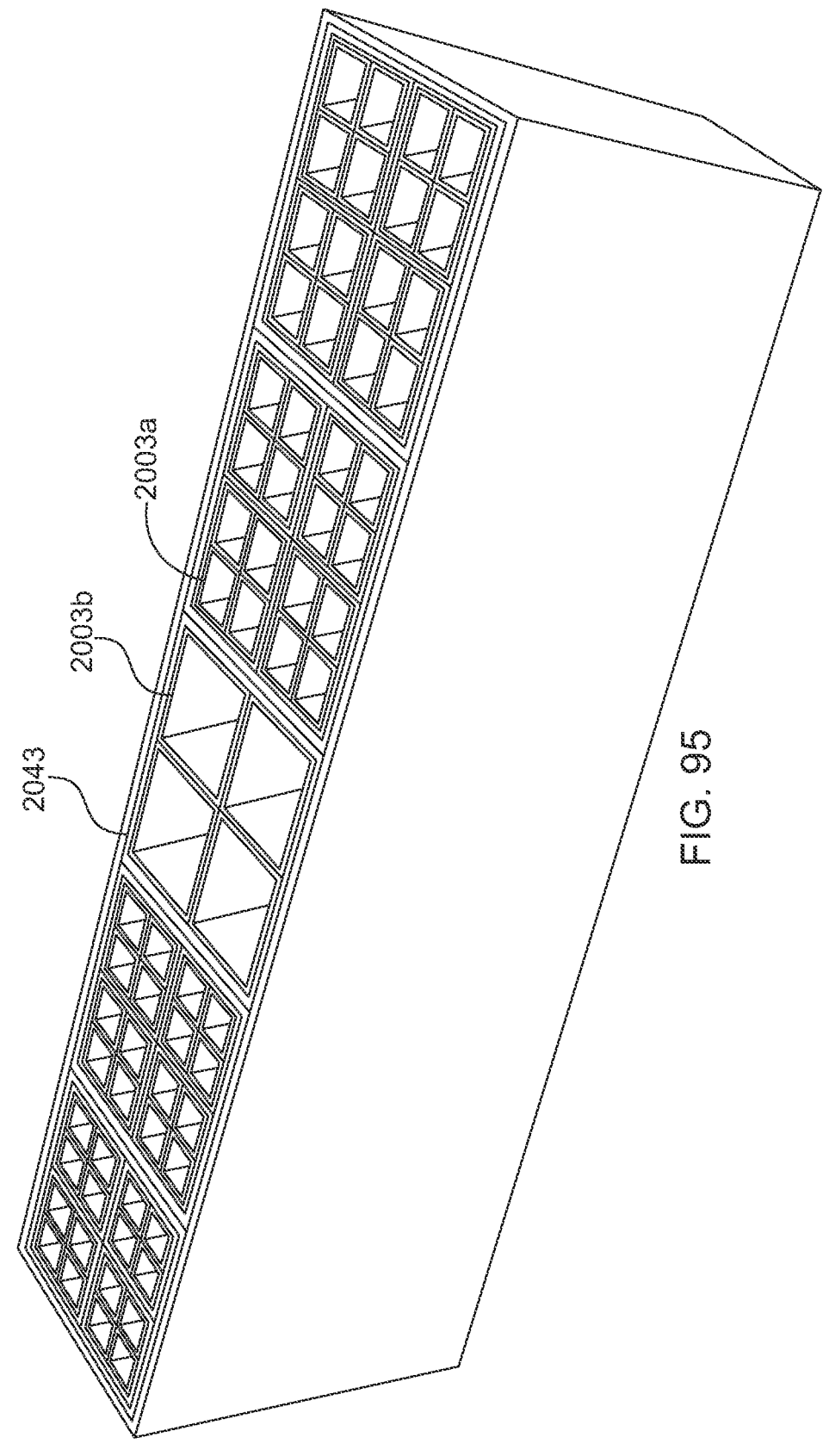
FIG. 95 is a perspective view of a fully assembled tertiary rectangular unit comprising sixty-four small square components, twenty medium square components, five large square components, and one rectangular component.
Figure 96:
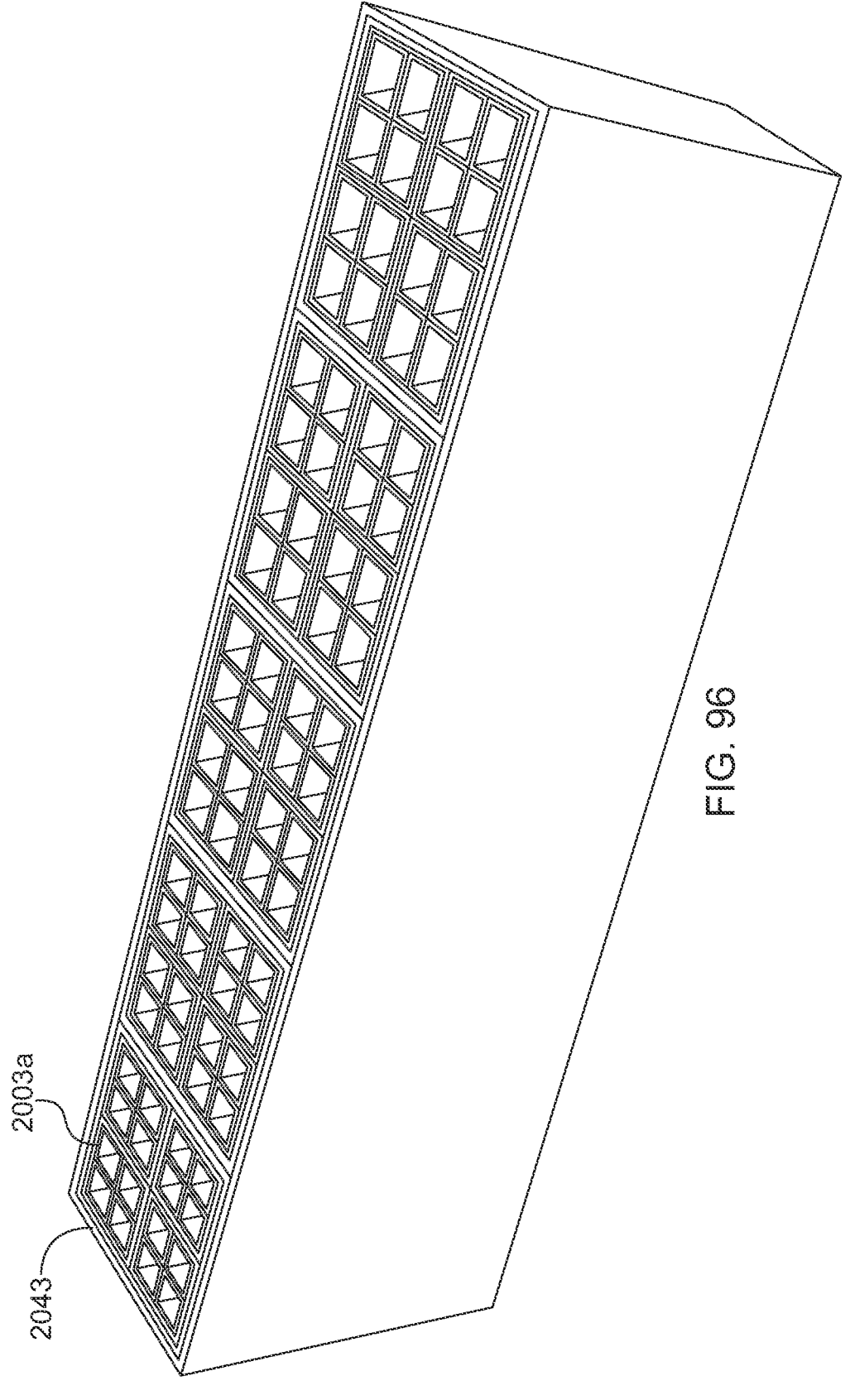
FIG. 96 is a perspective view of a fully assembled tertiary rectangular unit comprising eighty small square components, twenty medium square components, five large square components, and one rectangular component.
Figure 97:
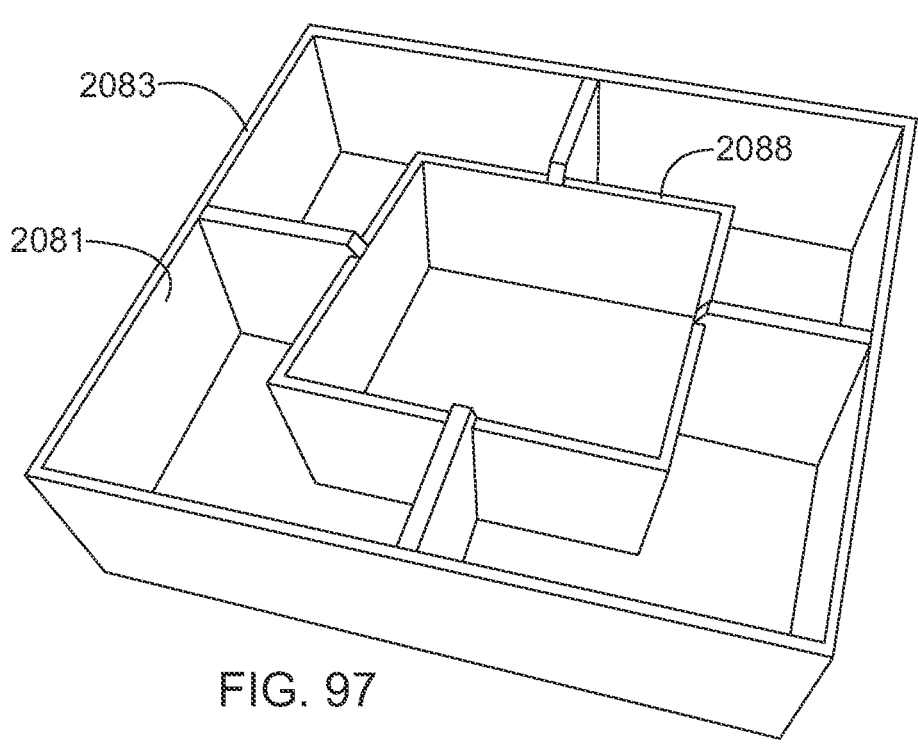
FIG. 97 is a perspective view of a supplemental interengageable container component in accordance with the exemplary embodiment of the present invention.
Figure 98:
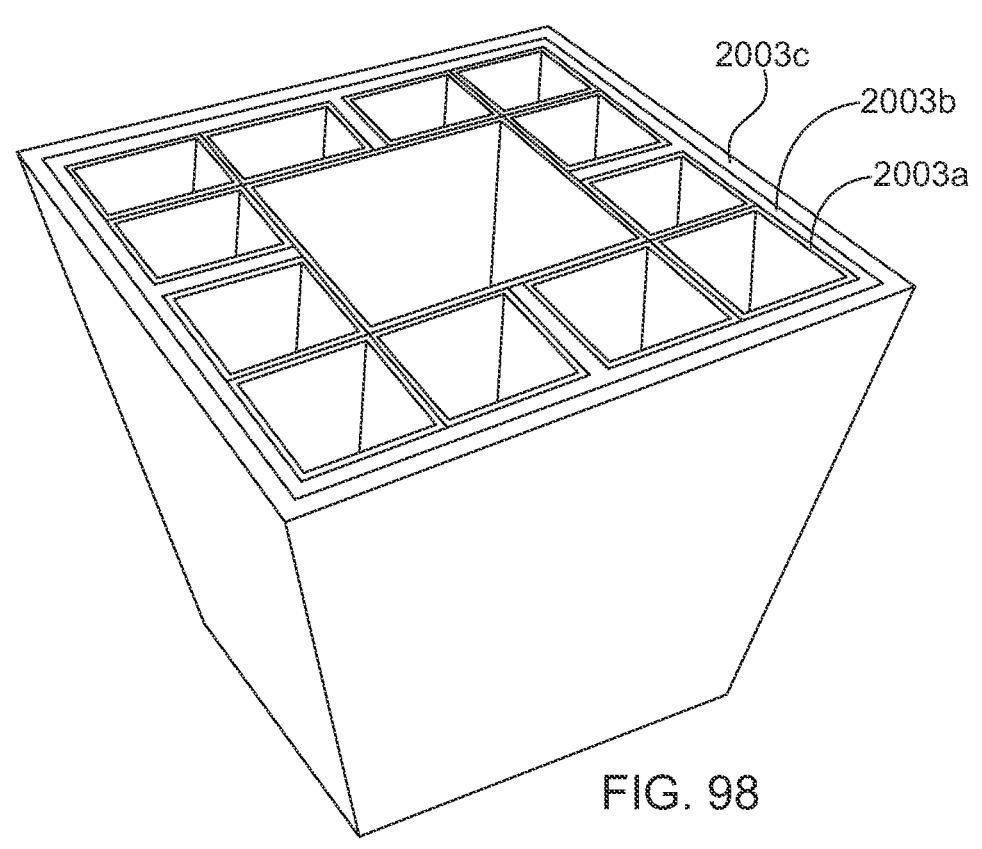
FIG. 98 is a perspective view of a fully assembled alternative secondary square unit in accordance with the exemplary embodiment of the present invention.
Figure 99:
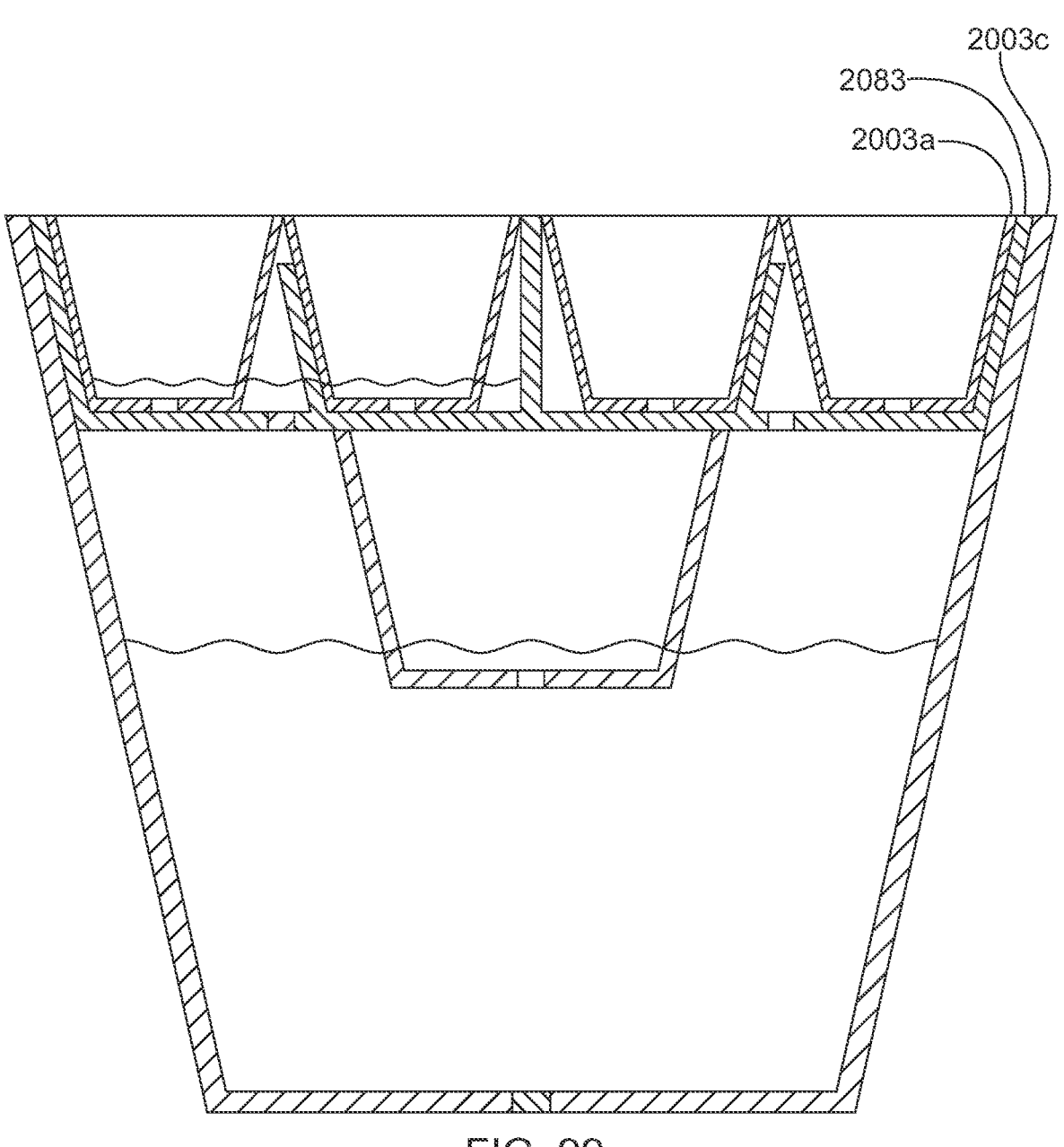
FIG. 99 is a sectional side view of a fully assembled alternative secondary square unit in accordance with the exemplary embodiment of the present invention.
Figure 100:
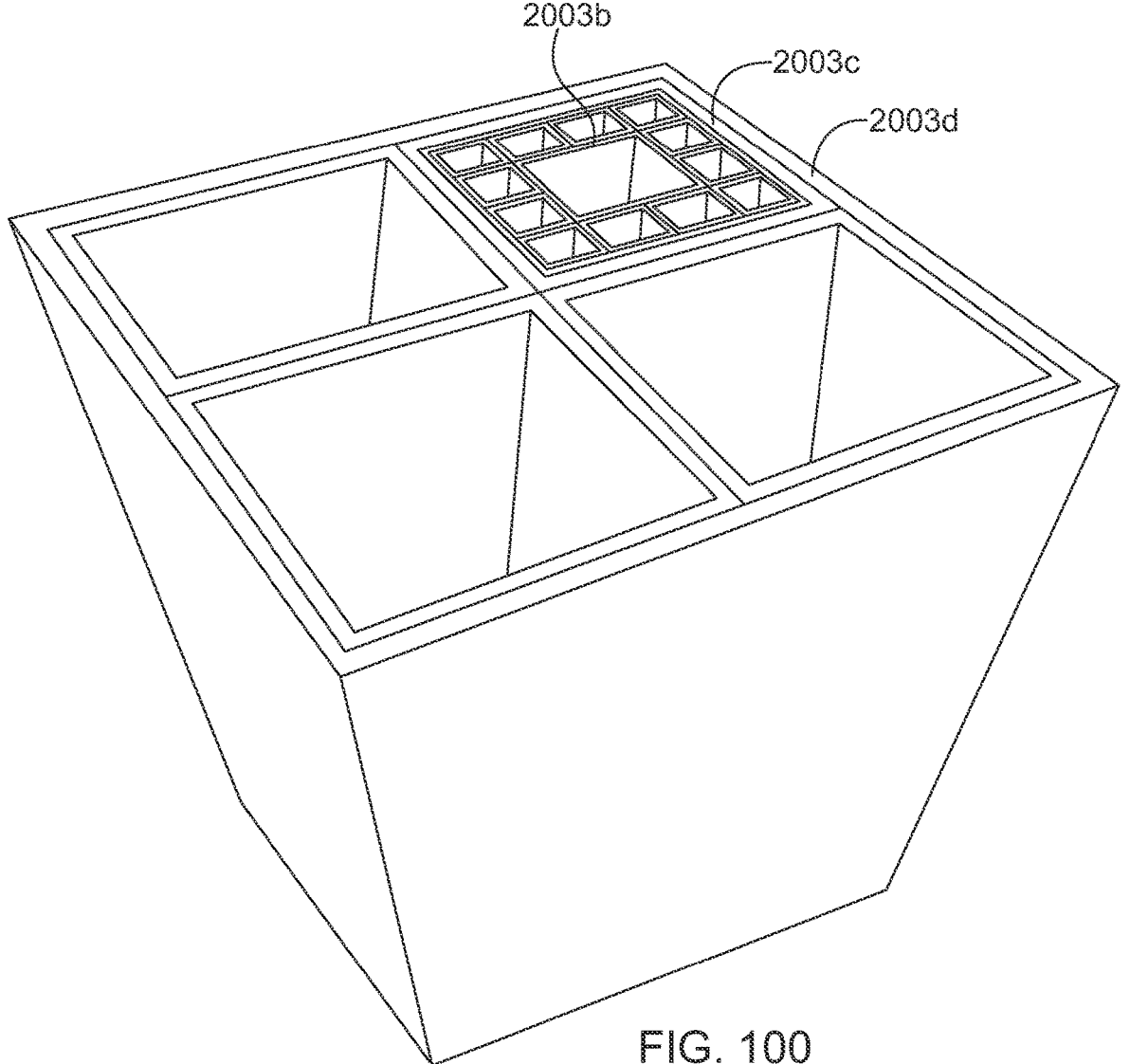
FIG. 100 is a perspective view of a fully assembled alternative tertiary square unit comprising sixteen small square components, one medium square component, four large square components, one extra-large square component, and one supplemental component.
Figure 101:
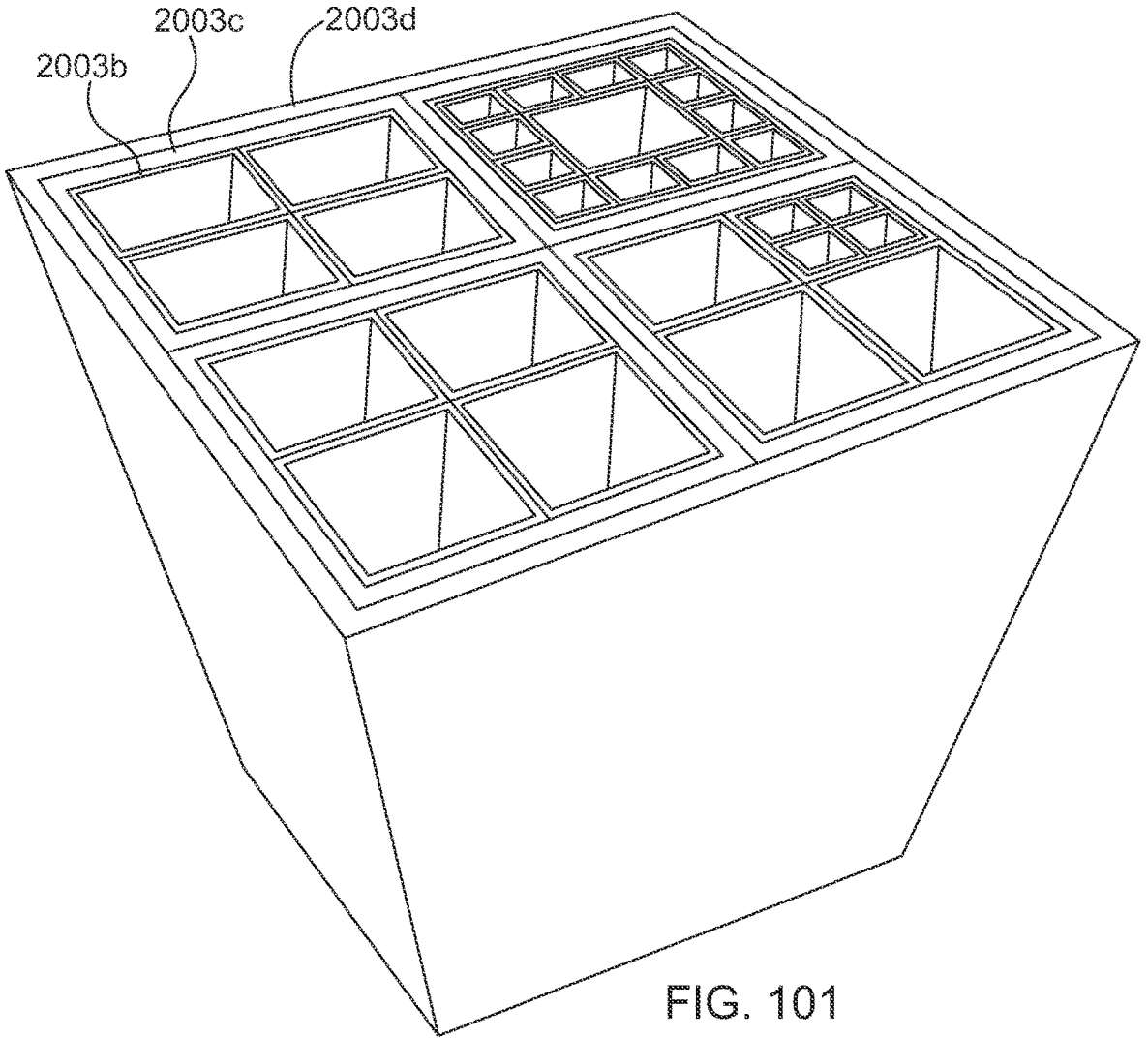
FIG. 101 is a perspective view of a fully assembled alternative tertiary square unit comprising sixteen small square components, thirteen medium square components, four large square components, one extra-large square component, and one supplemental component.
Figure 102:
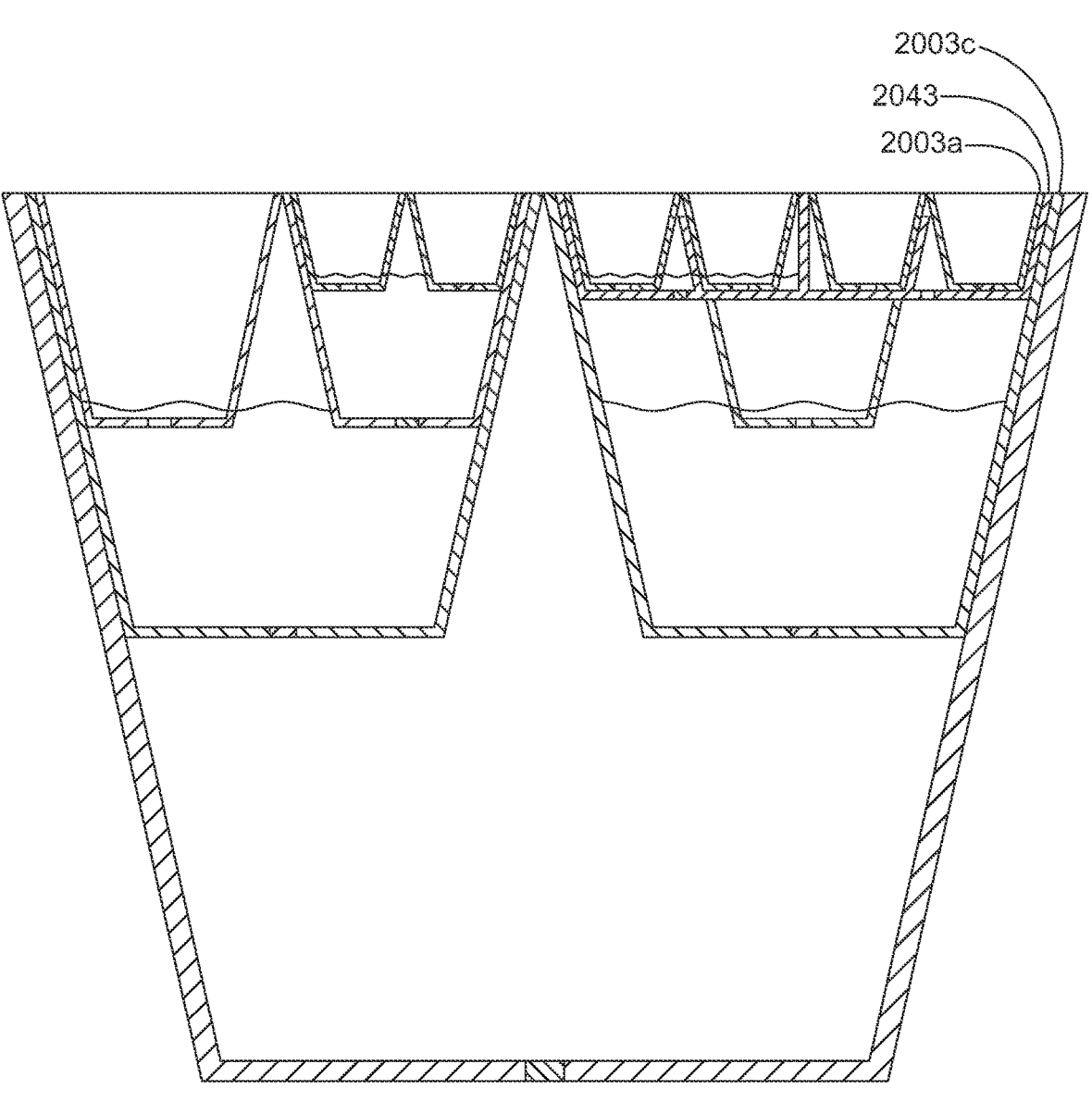
FIG. 102 is a sectional side view of a fully assembled alternative tertiary square unit in accordance with the exemplary embodiment of the present invention.
Figure 103:
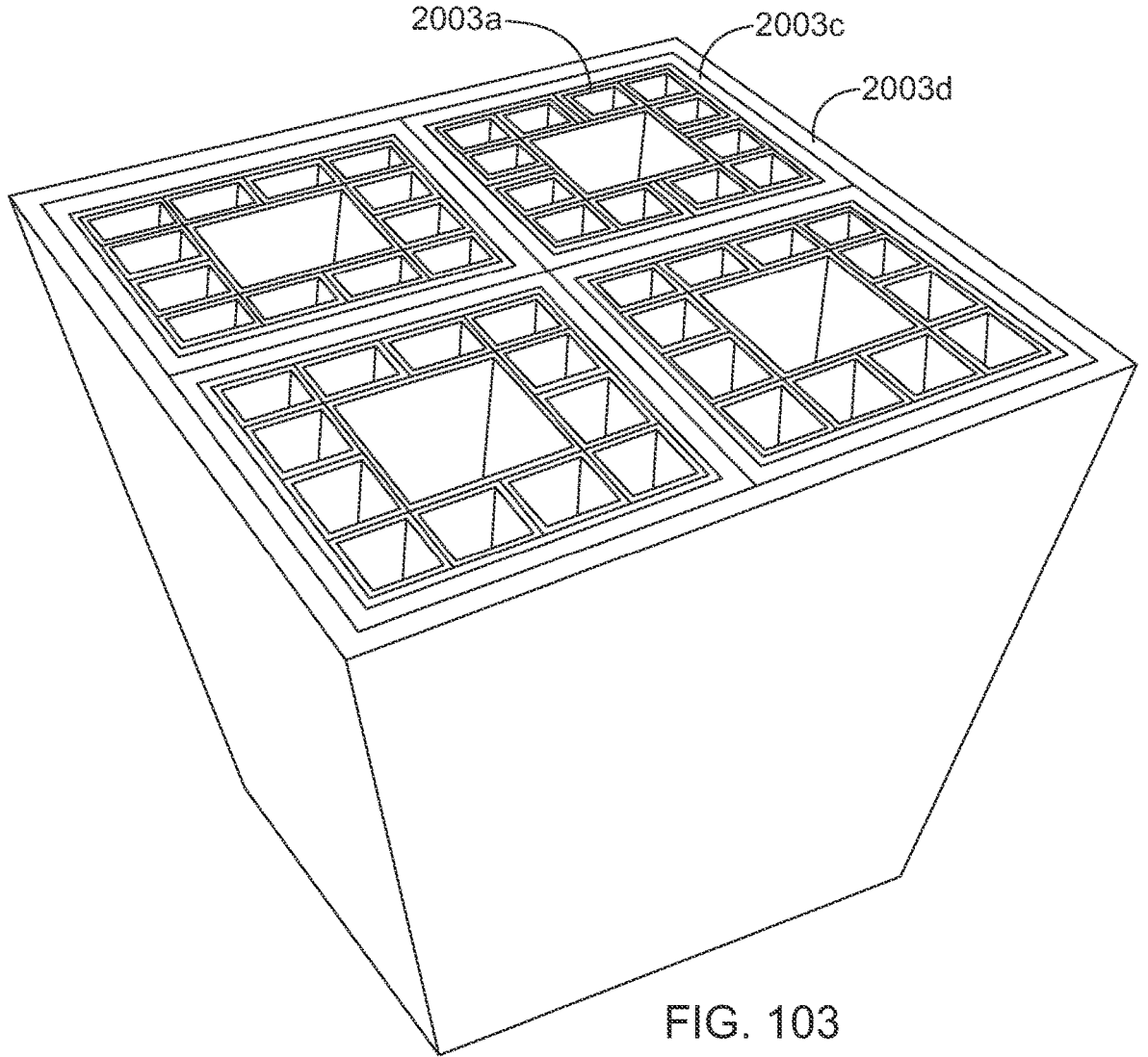
FIG. 103 is a perspective view of a fully assembled alternative tertiary square unit comprising forty-eight small square components, four medium square components, four large square components, one extra-large square component, and four supplemental components.
Figure 104:
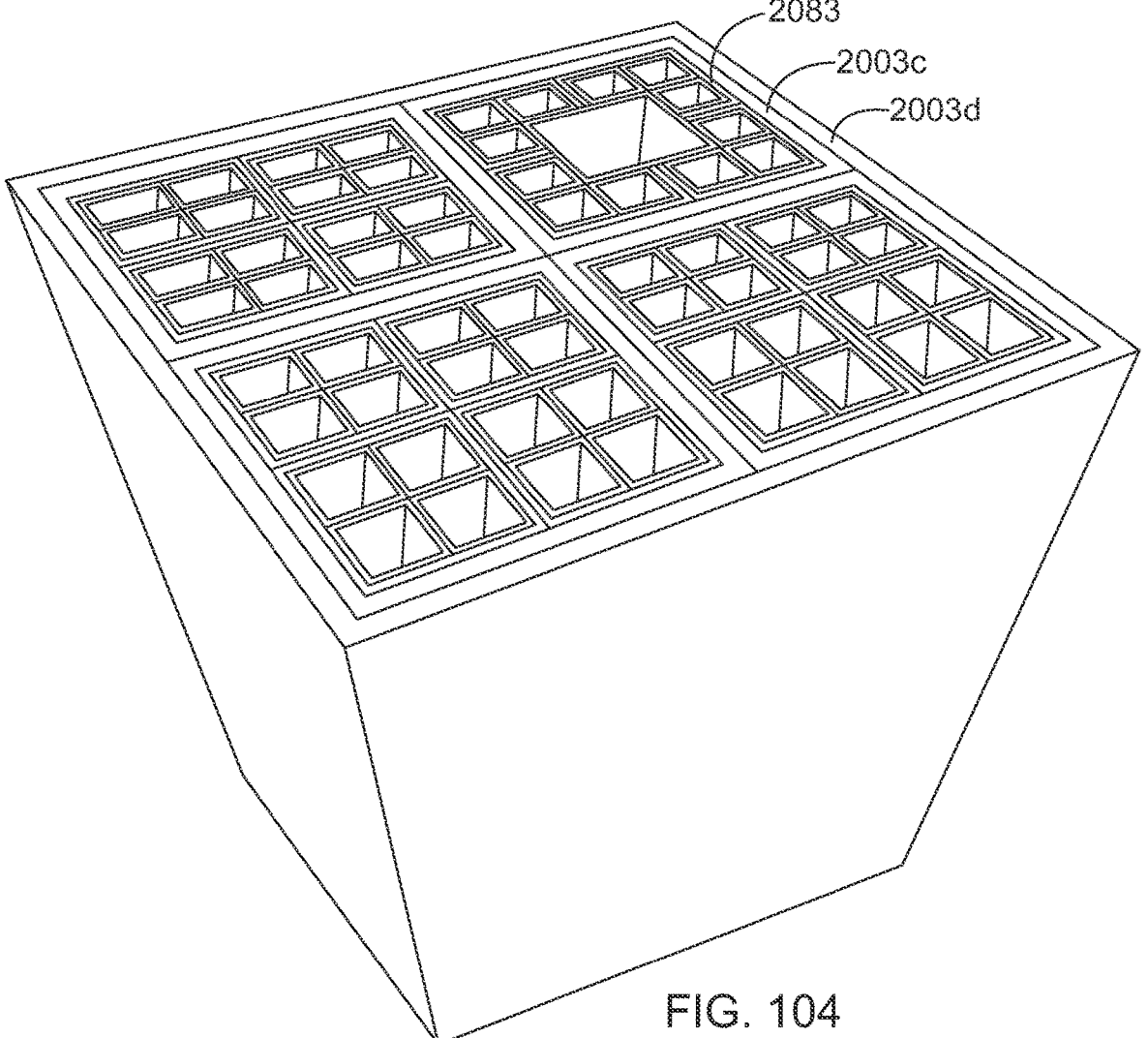
FIG. 104 is a perspective view of a fully assembled alternative tertiary square unit comprising sixty small square components, thirteen medium square components, four large square components, one extra-large square component, and one supplemental component.
Figure 105:
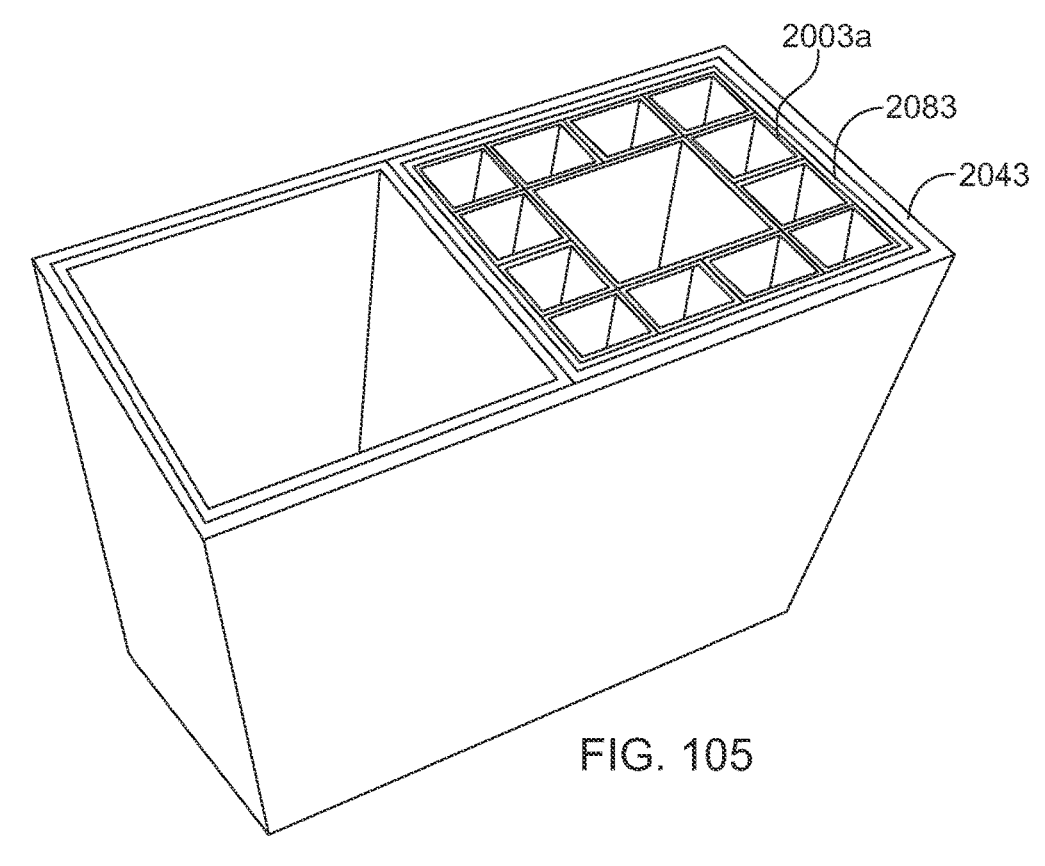
FIG. 105 is a perspective view of a fully assembled alternative tertiary rectangular unit comprising sixteen small square components, one medium component, two large components, one rectangular component, and one supplemental component.
Figure 106:
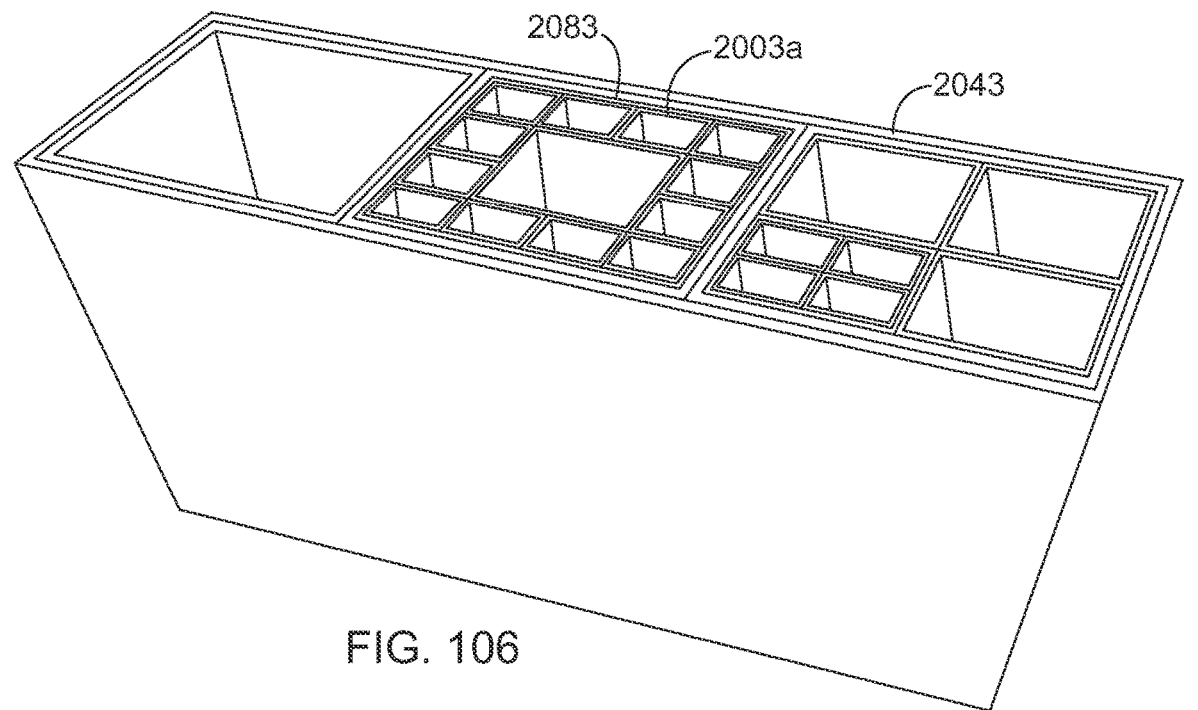
FIG. 106 is a perspective view of a fully assembled alternative tertiary rectangular unit comprising twenty small square components, five medium square components, three large square components, one rectangular component, and one supplemental component.
Figure 107:
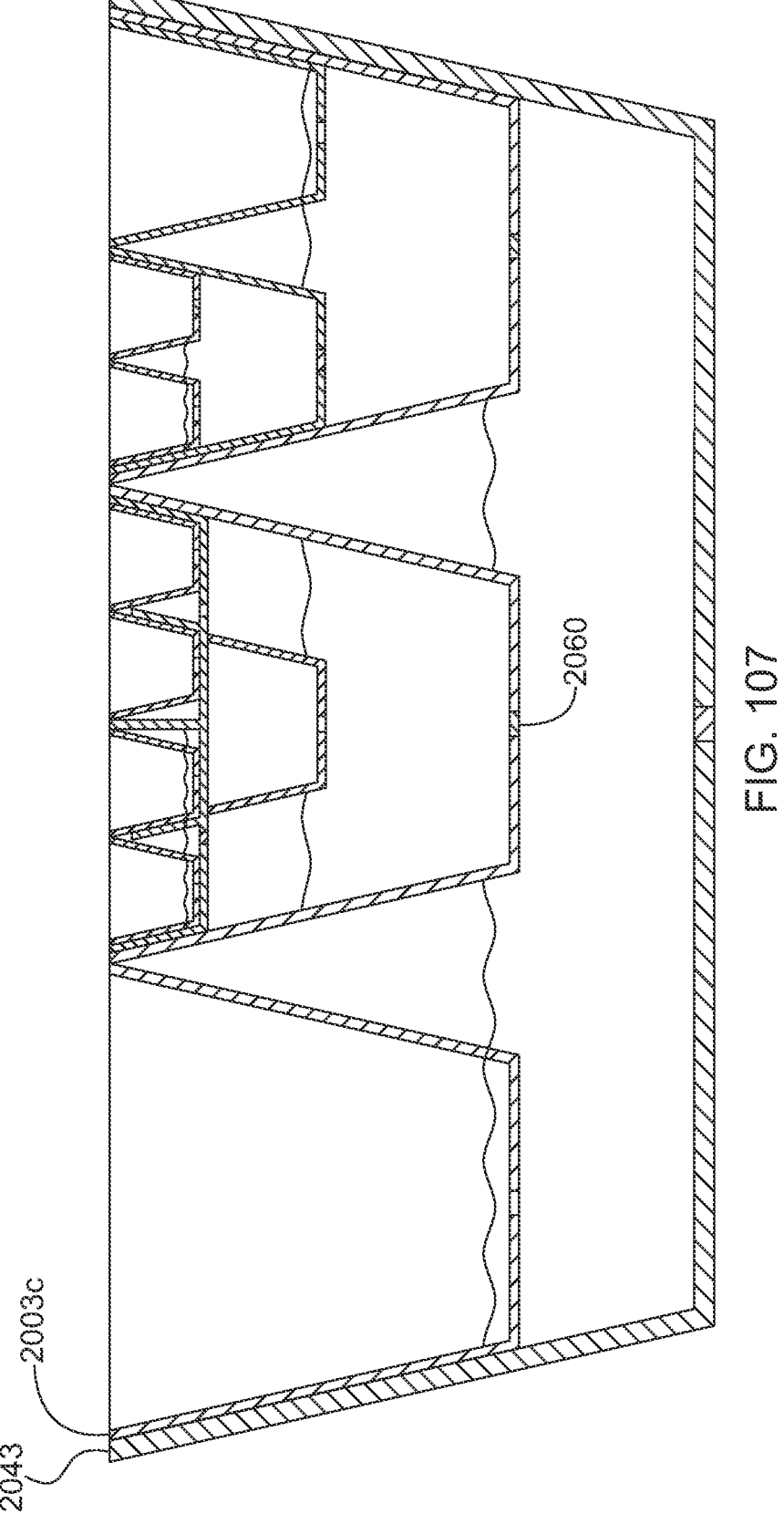
FIG. 107 is a sectional side view of a fully assembled alternative tertiary rectangular unit in accordance with the exemplary embodiment of the present invention.
Figure 108:
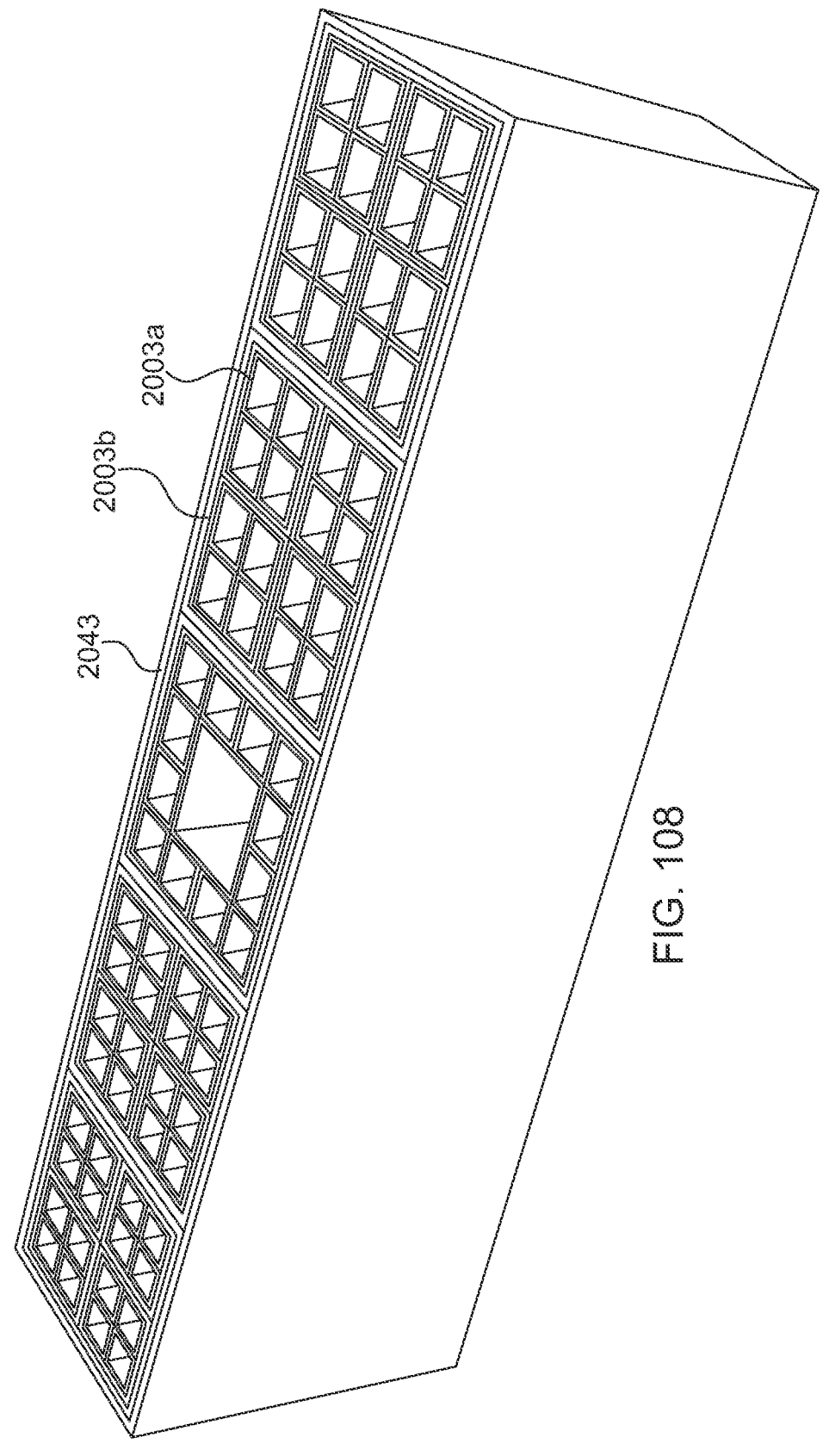
FIG. 108 is a perspective view of a fully assembled alternative tertiary rectangular unit comprising seventy-six small square components, seventeen medium square components, five large square components, one rectangular component, and one supplemental component.

As seen in FIG. 58, the supplemental component 2080 may be assembled with three respective sizes of square components 2010$a$, 2010$b$, 2010$c$ to derive the alternative secondary interengageable container unit 23001. In the assembly, the medium component 2010$b$ is centrally located within the inner cradle 2092 of the supplemental component 2080 and is suspended above the bottom surface 2005$c$ of the large component 2010$c$ by geometric correspondence and mutual lateral support. Twelve small components 2010$a$ may be nested peripherally to the medium component 2010$b$. As more clearly seen in FIG. 59, the inner top edges 2088 sit on a lower plane than the outer top edges 2083 to allow outer top edges 2003$a$, 2003$b$ of the small and medium components 2010$a$, 2010$b$ to contact one another. The four spacing walls 2084 permit the twelve peripheral small components 2010$a$ to fit snugly within the supplemental component 2080. The interior lengths of the outer top edges 2003c of the large square component 2010c are about the same in comparison to the exterior lengths of the outer top edges 2083 of the supplemental component 2080. These measurements, in conjunction with common base angles 2002 between the components 2010c, 2080 allow for the supplementary component 2080 to be suspended above the bottom surface 2005c of the large square component 2010c by mutual lateral support. Four respective reservoirs 2009 may be created within the supplemental component 2102 by inserting a removable plug 2060 in the hole(s) 2006d within the four individual compartments 2030. The four supplemental reservoirs 2033 remain separate from the large reservoir 2013c. Sizing of the interengageable container components 2010a, 2010b, 2010c, 2080 create flush upper edges 2003a, 2003b, 2003c, 2083 and a cohesive assembly of the alternative interengageable container unit 23001. In some embodiments, a square grate 2013b may be added to rest upon the upper terminus(es) 2008c of the support structure(s) 2007c and may contact the lower edge 2004c of the medium square components and/or the lower edge 2004b of the medium square units 2010b and may obviate at least some of the lateral pressure.

As illustrated in FIG. 60-FIG. 64, an alternative secondary unit(s) 23001 may be substituted for a large square component(s) 2010c, a primary square unit(s) 2011, or secondary square units 2101-2104 within large units 21001-21040 to derive the alternative tertiary square units 210001-210034.

As illustrated in FIG. 65-FIG. 68, an alternative square secondary unit(s) 23001 may be substituted for a large square component(s) 2010c, a primary unit(s) 2011, or a secondary unit(s) 2101-2104 within the tertiary rectangular units 22001-22136 to derive the alternative tertiary rectangular units 220001-220174.

Reference is now made of FIGS. 69-108. These figures are similar to the Figures and related descriptions of FIGS. 29-68, with the exception that support structures are not included. In the embodiments illustrated in FIGS. 69-108, the interior containers are suspended by means of mutual lateral support. In many of these embodiments relating to the suspended component, the range of the angle between the base and the shorter end of each isosceles trapezoid sidewall is between about 94 and 139 degrees, as exemplary illustrated in FIGS. 25-28. In some embodiments the angle between the base and the shorter end of each isosceles trapezoid sidewall is about 98.13 degrees. In some embodiments the angle between the base and the shorter end of each isosceles trapezoid sidewall is 98.13 degrees. Preferred materials for containers that are suspended by means of lateral support are plastic, ceramic, clay, glass, rubber, fiberglass, foam, metal and wood.

Reference is now made to FIGS. 109-123.

Figure 109:
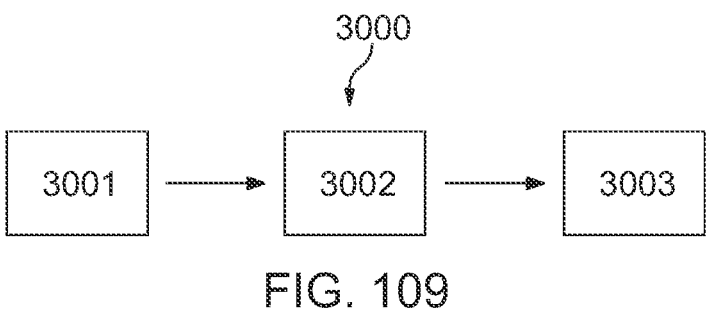
FIG. 109 is a flow chart of a method of the current invention.

Referring to FIG. 109, a method 3000 to create a square interengageable container includes the following: 1) providing a container 3001 constructed of four outer isosceles trapezoidal sidewalls that have a common base angle and a square bottom surface and opposite trapezoidal sidewalls are congruent and mirror one another. In addition, the trapezoids join at the shorter legs to derive the outer trapezoidal sidewalls and the longer base sides of the trapezoids connect perpendicularly to form the outer top edges. As well, the shorter base sides of the trapezoids connect perpendicularly to form the lower edges of the square component, and square bottom surface is joined to the shorter base sides of the trapezoids. Additionally, a hole can be found within the bottom surface and may be removably sealed with a plug to create a reservoir; 2) Making a complex unit 3002 by providing at least two respective sizes of square components that are assembled to derive the primary square interengageable container unit, wherein the interior lengths of the outer top edges of the medium square component are about doubled in comparison to the exterior lengths of the outer top edges of the small square components. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees. 3) Assembling 3003 at least two small square components to be suspended above the bottom surface of the medium square component by mutual lateral support.

Figure 110:
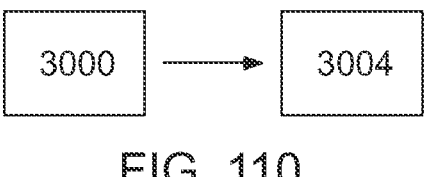
FIG. 110 is a flow chart of a method of the current invention.

In some embodiments, as seen in FIG. 110 at least one support structure can be added 3004 wherein the upper terminus(es) of the support structure(s) within the medium square component may impede the small square component(s) from descending the interior of the outer sidewalls of the medium square component by potentially contacting the lower edge(s) of the small square component(s).

Figure 111:
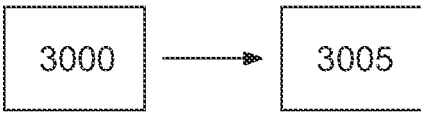
FIG. 111 is a flow chart of a method of the current invention.

In some embodiments, as seen in FIG. 111 a secondary reservoir is created 3005 by inserting a removable plug in the hole of the medium square component that allows fluid to be exchanged between the square interengageable container components through the unplugged holes of the small square components that are suspended above the bottom surface of the medium square component.

In some embodiments, as seen in FIG. 112, the interengageable container components are sized 3006 to create generally flush upper edges and a cohesive assembly of the primary square interengageable container unit.

In some embodiments, as seen in FIG. 113 a square grate is provided and added 3007 upon the upper terminus(es) of the support structure(s) and contact the lower edges of a small square component.

In some embodiments, as seen in FIG. 114 at least one view port is provided and added 3007b to enable viewing of water levels.

Figure 115:
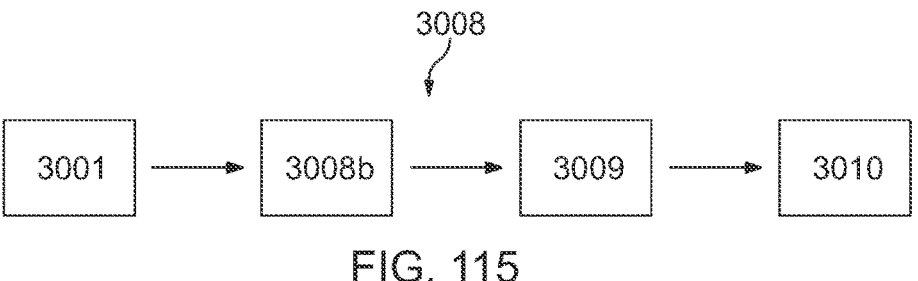
FIG. 115 is a flow chart of a method of the current invention.

Referring to FIG. 115, a method 3008 to create a square interengageable container unit includes the following: 1)) providing a container 3001 constructed of four outer isosceles trapezoidal sidewalls that have a common base angle and a square bottom surface and opposite trapezoidal sidewalls are congruent and mirror one another. In addition, the trapezoids join at the shorter legs to derive the outer trapezoidal sidewalls and the longer base sides of the trapezoids connect perpendicularly to form the outer top edges. As well, the shorter base sides of the trapezoids connect perpendicularly to form the lower edges of the square component, and square bottom surface is joined to the shorter base sides of the trapezoids. Additionally, a hole can be found within the bottom surface and may be removably sealed with a plug to create a reservoir; 2) providing three respective sizes of square components 3008b that are assembled to derive the secondary square interengageable container units; 3) providing a minimum of one primary square unit nested with three small square components held within a large square component (nine components in total) to complete the secondary square unit 3009; 4) nesting a maximum of four primary square units within a large square component (twenty-one components in total) to complete a secondary square interengageable container unit 3010. In these embodiments, the interior lengths of the outer top edges of the large square component are about doubled in comparison to the exterior lengths of the of the outer top edges of the medium square components and/or primary square units. These measurements, in conjunction with common base angles between the square components allow for the medium square components and/or primary square units to be suspended above the bottom surface of the large square component by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees.

Figure 116:
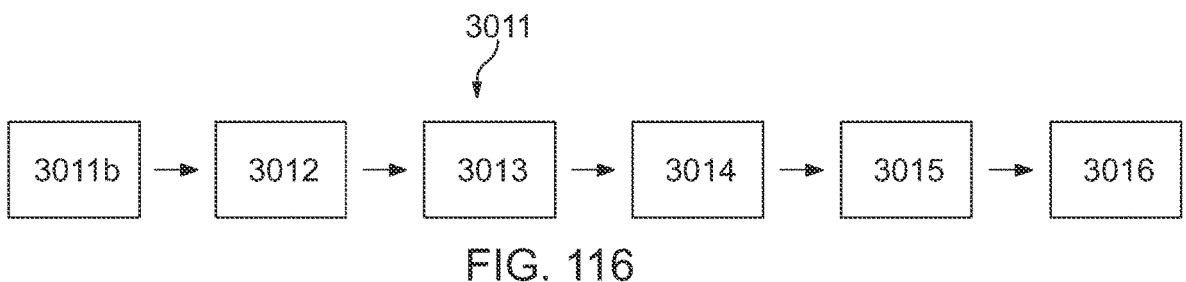
FIG. 116 is a flow chart of a method of the current invention.

Referring to FIG. 116, a method 3011 to create a square interengageable container includes the following: 1) providing a container 3011b constructed of four outer isosceles trapezoidal sidewalls that have a common base angle and a square bottom surface and opposite trapezoidal sidewalls are congruent and mirror one another. In addition, the trapezoids join at the shorter legs to derive the outer trapezoidal sidewalls and the longer base sides of the trapezoids connect perpendicularly to form the outer top edges. As well, the shorter base sides of the trapezoids connect perpendicularly to form the lower edges of the square component, and square bottom surface is joined to the shorter base sides of the trapezoids. Additionally, a hole can be found within the bottom surface and may be removably sealed with a plug to create a reservoir; 2) Making a complex unit 3102 by providing at least one secondary square interengageable container units and combining it with other square interengageable container units and/or square components; 3) assembling 3013 four respective sizes of square components to derive the tertiary square interengageable container unit; 4) nesting 3014 at least one secondary square unit with three large square components held within an extra-large square component; 5) requiring 3015 13 components in total to complete the tertiary square unit assembly; 6) limiting 3016 a maximum of four secondary square units that may be nested within an extra-large square component (eighty-five components in total) to complete a tertiary square interengageable container unit assembly. The interior lengths of the outer top edges of the extra-large square component are about doubled in comparison to the exterior lengths of the of the outer top edges of the large square component(s), the exterior lengths of the outer top edges of the primary square units, and the exterior edges of the outer top edges of the secondary units. These measurements, in conjunction with common base angles between the square components allow for the large square components and the square units and/or the secondary square units to be suspended above the bottom surface of the extra-large square component by mutual lateral support. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees.

Figure 117:
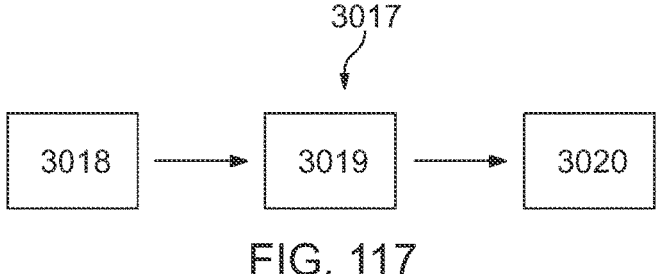
FIG. 117 is a flow chart of a method of the current invention.

Referring now to FIG. 117, a method 3017 to create a rectangular interengageable container component includes the following: 1) providing 3018 a container constructed of four outer isosceles trapezoidal sidewall that have a common base angle and a rectangular bottom surface wherein opposite trapezoidal sidewalls are congruent and mirror one another. The trapezoids join at the legs to derive the outer trapezoidal sidewall and the longer base sides of the trapezoids connect perpendicularly to form outer top edges, and the shorter base sides of the trapezoids connect perpendicularly to form the lower edges of the rectangular component, and the rectangular bottom surface is joined. Additionally, a hole can be found within the bottom surface and may be removably sealed with a plug to create a reservoir. 2) Making a complex unit 3019 by providing at least two square components that are assembled to derive the primary rectangular interengageable container unit, wherein the interior lengths of the outer long top edges of the rectangular container are about doubled in comparison to the exterior lengths of the outer top edges of the small square components. In these embodiments, the range of the angle between the base and the shorter end of each isosceles trapezoid sidewall is between about 94 and 139 degrees. In some embodiments the angle between the base and the shorter end of each isosceles trapezoid sidewall is about 98.13 degrees. In some embodiments the angle between the base and the shorter end of each isosceles trapezoid sidewall is 98.13 degrees. 3) Assembling 3020 at least two small square components to be suspended above the bottom surface of the rectangular container by mutual lateral support.

Figure 118:
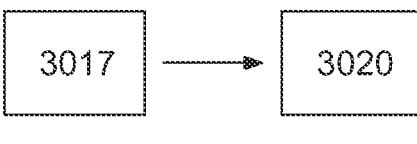
FIG. 118 is a flow chart of a method of the current invention.

In some embodiments, as seen in FIG. 118 at least one support structure can be added 3020 wherein the upper terminus(es) of the support structure(s) within the rectangular component may impede the square component(s) from descending the interior of the outer sidewalls of the rectangular container by potentially contacting the lower edge(s) of the square component(s).

Figure 119:
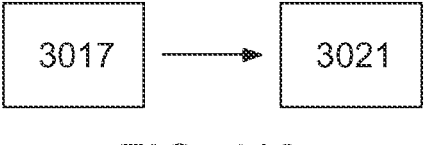

In some embodiments, as seen in FIG. 119 a secondary reservoir is created 3021 by inserting a removable plug in the hole of the rectangular container that allows fluid to be exchanged between the square interengageable container components through the unplugged holes of the square components that are suspended above the bottom surface of the rectangular container.

Figure 120:

In some embodiments, as seen in FIG. 120, the interengageable container components are sized 3022 to create generally flush upper edges and a cohesive assembly of the primary rectangular interengageable container unit.

Figure 121:
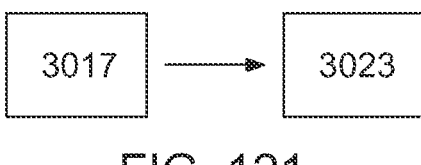

In some embodiments, as seen in FIG. 121 a square grate is provided and added 3023 upon the upper terminus(es) of the support structure(s) and contact the lower edges of the square components.

Figure 122:
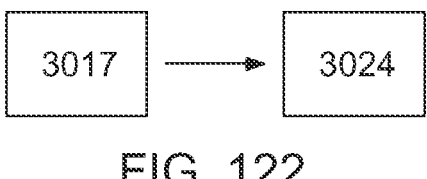

In some embodiments, as seen in FIG. 122 at least one view port is provided and added 3024 to enable viewing of water levels.

Figure 123:
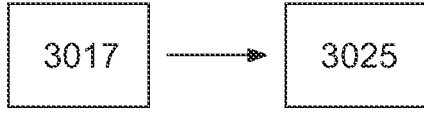

Referring to FIG. 123, the method 3017 described above can further include having 3025 up to five square components suspended in the rectangular container.

While particular embodiments of the present invention have been illustrated and described, it is not intended to limit the invention, and obvious modifications and equivalents are contemplated that fall within the scope of the following claims. The features of the invention expressed in the following claims may be arranged in any combination and in any order within the purview of the following claims.

I claim:

1. An interengageable container comprising:
A) a bottom portion having bottom outer edges;
B) at least four tapered sidewalls having opposed top and bottom edges and opposed side edges, each sidewall attached to, and rising outwards from, a bottom outer edge, each top edge of said sidewalls being parallel to and extending laterally outward of the bottom outer edge to which said sidewall is attached and each side edge of said sidewalls connected to and forming inner corners with an adjacent sidewall;

C) at least one viewing port in at least one of said sidewalls, the viewing port configured to permit an outside observer to view a fluid level in the interengageable container; and D) a support structure on each sidewall spaced below the top edge, each support structure having an upper surface lying within a common plane that is spaced apart from, and parallel to, the bottom portion;

wherein the support structure is a rib structure at each inner corner extending from the bottom portion to an upper surface having a height above the bottom portion.

2. The interengageable container of claim 1 further comprising a drainage hole in the bottom portion.

3. The interengageable container of claim 1 wherein said sidewalls have the shape of an isosceles trapezoid.

4. The interengageable container of claim 1 wherein the lengths of the top and bottom edges of each sidewall have a ratio A/B wherein A is a whole number two or greater and B is one.

5. An interengageable container assembly comprising:

A) a bottom-most interengageable container having a bottom portion defining outer edges, at least four isosceles-trapezoid-shaped tapered side walls, and a support structure on each of said side walls; and B) at least two adjacent upper interengageable containers nested within the bottom-most interengageable container and contacting said support structure, said upper interengageable containers each including i) a bottom portion defining outer edges;

ii) at least four isosceles-trapezoid-shaped tapered sidewalls attached to, and rising outwards of, the bottom portion, each of said sidewalls having (a) an upper interengageable container top edge parallel to, and substantially flush with one another, and extending laterally outward of a respective outer edge of the respective upper interengageable container bottom portion from which they are attached at (c) respective upper interengageable container lower edges, and (b) upper interengageable container inner corners at each intersection of adjacent ones of said sidewalls, wherein adjacent respective top edges of the at least two adjacent upper interengageable containers contact each other along a length of each adjacent respective top edge; and iii) upper interengageable container bottom outer corners at the upper interengageable container bottom portion, wherein at least one of said outer corners is configured to contact one of said support structures.

6. The interengageable container assembly of claim 5 wherein said bottom portion of said bottom-most interengageable container is in the shape of a rectangle.

7. The interengageable container assembly of claim 5 wherein a length of a top edge of each tapered side wall of the at least one upper interengageable container and a length of a top edge of each tapered side wall of the bottom-most interengageable container have a ratio A/B wherein A is a whole number two or greater and B is one.

8. The interengageable container assembly recited in claim 5, wherein each of said bottom-most interengageable container and one of said upper interengageable containers contain a viewing port, wherein said viewing ports align with one another when said upper interengageable container is nested within said bottom-most interengageable container so that the water level within said upper interengageable container is visible through the aligned viewing ports.

9. An interengageable container comprising:

A) a bottom portion having bottom outer edges;

B) at least four tapered sidewalls having opposed top and bottom edges and opposed side edges, each sidewall attached to, and rising outwards from, a bottom outer edge, each top edge of said sidewalls being parallel to and extending laterally outward of the bottom outer edge to which said sidewall is attached, and each side edge of said sidewalls connected to and forming inner corners with an adjacent sidewall;

C) a pair of tab structures on each sidewall spaced below the top edge, each tab structure having an upper surface lying within a common plane that is spaced above and parallel to, the bottom portion, wherein each of said pair of tab structures has one tab positioned on one side and one tab positioned on the other side of a mid-way point between the inner corners of said sidewalls; and D) a plurality of viewing ports on at least one of said sidewalls having a viewing portion located above said tab structures.

10. The interengageable container of claim 9 wherein one of each of the pairs of tab structures is positioned proximate opposite sides of respective inner corners.

11. An interengageable container comprising:

A) a bottom portion having bottom outer edges;

B) at least four tapered sidewalls having opposed top and bottom edges and opposed side edges, each sidewall attached to, and rising outwards from, a bottom outer edge, each top edge of said sidewalls being parallel to and extending laterally outward of the bottom outer edge to which said sidewall is attached and each side edge of said sidewalls connected to and forming inner corners with an adjacent sidewall;

C) a drainage hole in the bottom portion; and,

D) a support structure on each sidewall spaced below the top edge, each support structure having an upper surface lying within a common plane that is spaced apart from, and parallel to, the bottom portion;

wherein the support structure is a rib structure at each inner corner extending above the bottom portion.

12. The interengageable container of claim 11, wherein said sidewalls have the shape of an isosceles trapezoid.

13. The interengageable container of claim 11, wherein the lengths of the top and bottom edges of each sidewall have a ratio A/B wherein A is a whole number two or greater and B is one.

\* \* \* \* \*